(12) United States Patent
Rahman et al.

(10) Patent No.: US 12,149,977 B2
(45) Date of Patent: *Nov. 19, 2024

(54) METHOD AND APPARATUS FOR MULTIPLEXING HIGHER-RESOLUTION CHANNEL STATE INFORMATION (CSI)

(71) Applicant: Samsung Electronics Co., Ltd., Suwon-si (KR)

(72) Inventors: Md. Saifur Rahman, Plano, TX (US); Eko Onggosanusi, Coppell, TX (US); Li Guo, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/063,058

(22) Filed: Dec. 7, 2022

(65) Prior Publication Data

US 2023/0097268 A1 Mar. 30, 2023

Related U.S. Application Data

(63) Continuation of application No. 17/443,320, filed on Jul. 23, 2021, now Pat. No. 11,558,768, which is a
(Continued)

(51) Int. Cl.
*H04W 24/10* (2009.01)
*H04B 7/0456* (2017.01)
(Continued)

(52) U.S. Cl.
CPC .......... *H04W 24/10* (2013.01); *H04B 7/0478* (2013.01); *H04B 7/0695* (2013.01);
(Continued)

(58) Field of Classification Search
CPC ............. H04W 24/10; H04W 72/0413; H04W 72/0446; H04W 72/10; H04W 72/56;
(Continued)

(56) References Cited

U.S. PATENT DOCUMENTS 8,995,373 B2 3/2015 Yang
10,505,618 B2 12/2019 Guo
(Continued)

FOREIGN PATENT DOCUMENTS

CN 103004116 A 3/2013
CN 104734753 A 6/2015
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 14)", 3GPP TS 36.211 V14.2.0, Mar. 2017, 194 pages.
(Continued)

*Primary Examiner* — Mandish K Randhawa

(57) ABSTRACT

A user equipment (UE) for channel state information (CSI) comprises receiving configuration information for K CSI reports, wherein the configuration information includes resource allocation information for an uplink control information (UCI) transmission that includes UCI comprising N UCI parts, calculating the K CSI reports and partitioning the K CSI reports into N parts, determining an available number of information bits (B1) for the UCI transmission according to the resource allocation information, determining a required number of information bits (B2) for the UCI transmission according to the calculated K CSI reports, determining whether the B2 exceeds the B1; and transmitting, to the BS over one slot of an uplink channel, a first part of the N UCI parts including a first of the N parts of the K CSI reports when the B2 exceeds the B1, wherein K and N are positive integers.

20 Claims, 17 Drawing Sheets

Related U.S. Application Data continuation of application No. 16/104,615, filed on Aug. 17, 2018, now abandoned.

(60) Provisional application No. 62/609,931, filed on Dec. 22, 2017, provisional application No. 62/594,886, filed on Dec. 5, 2017, provisional application No. 62/570,293, filed on Oct. 10, 2017, provisional application No. 62/569,765, filed on Oct. 9, 2017, provisional application No. 62/566,916, filed on Oct. 2, 2017, provisional application No. 62/564,612, filed on Sep. 28, 2017, provisional application No. 62/559,961, filed on Sep. 18, 2017, provisional application No. 62/559,322, filed on Sep. 15, 2017, provisional application No. 62/558,120, filed on Sep. 13, 2017, provisional application No. 62/557,320, filed on Sep. 12, 2017, provisional application No. 62/556,771, filed on Sep. 11, 2017, provisional application No. 62/548,222, filed on Aug. 21, 2017.

(51) Int. Cl.
| | | |
|---|---|---|
| *H04B 7/06* | (2006.01) | |
| *H04B 7/08* | (2006.01) | |
| *H04L 1/00* | (2006.01) | |
| *H04L 5/00* | (2006.01) | |
| *H04W 72/0446* | (2023.01) | |
| *H04W 72/21* | (2023.01) | |
| *H04W 72/56* | (2023.01) | |

(52) U.S. Cl.
CPC .............. *H04B 7/088* (2013.01); *H04L 1/00* (2013.01); *H04L 5/0057* (2013.01); *H04W 72/0446* (2013.01); *H04W 72/21* (2023.01); *H04W 72/56* (2023.01)

(58) Field of Classification Search
CPC ... H04W 72/21; H04B 7/0478; H04B 7/0695; H04B 7/088; H04L 1/00; H04L 5/0057; H04L 1/0028; H04L 1/0026
See application file for complete search history.

(56) References Cited

U.S. PATENT DOCUMENTS

| | | | |
|---|---|---|---|
| 10,547,426 B2 | 1/2020 | Papasakellariou | |
| 10,638,462 B2 | 4/2020 | Park | |
| 10,742,290 B2 | 8/2020 | Rahman | |
| 10,812,164 B2 | 10/2020 | Park | |
| 11,558,768 B2 * | 1/2023 | Rahman | H04W 72/21 |
| 2012/0220286 A1 | 8/2012 | Chen | |
| 2014/0003345 A1 | 1/2014 | Chu | |
| 2014/0044083 A1 | 2/2014 | Kim | |
| 2014/0112300 A1 | 4/2014 | Han | |
| 2015/0003347 A1 | 1/2015 | Ko | |
| 2015/0215022 A1 | 7/2015 | Nagata | |
| 2015/0245232 A1 * | 8/2015 | Luo | H04W 72/0453 370/252 |
| 2017/0041923 A1 | 2/2017 | Park | |
| 2018/0076924 A1 | 3/2018 | Lee | |
| 2018/0191476 A1 * | 7/2018 | Lyu | H04L 5/0053 |
| 2018/0198561 A1 * | 7/2018 | Tsai | H04L 27/3488 |
| 2018/0198590 A1 | 7/2018 | Lee | |
| 2018/0220413 A1 | 8/2018 | Yang | |
| 2018/0262251 A1 | 9/2018 | Kim | |
| 2020/0383132 A1 * | 12/2020 | Yang | H04W 74/0808 |
| 2023/0299884 A1 * | 9/2023 | Muharemovic | H04L 1/1671 370/329 |

FOREIGN PATENT DOCUMENTS

| | | |
|---|---|---|
| CN | 105162509 A | 12/2015 |
| KR | 101157301 B1 | 6/2012 |
| KR | 20180116310 A | 10/2018 |
| KR | 20190028351 A | 3/2019 |
| KR | 20190029761 A | 3/2019 |
| KR | 20190130560 A | 11/2019 |
| WO | 2016093600 A1 | 6/2016 |
| WO | 2017043834 A1 | 3/2017 |
| WO | 2017116141 A1 | 7/2017 |

OTHER PUBLICATIONS

"3rd Generation Partnership Project; Technical Specification Group Radio Access Network; Evolved Universal Terrestrial Radio Access (E-UTRA); Multiplexing and channel coding (Release 14)", 3GPP TS 36.212, V14.2.0, Mar. 2017, 197 pages.

"3rd Generation Partnership Project; Technical Specification Group Radio Access Network; Evolved Universal Terrestrial Radio Access (E-UTRA); Physical layer procedures (Release 14)", 3GPP TS 36.213 V14.2.0, Mar. 2017, 454 pages.

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.2.0, Mar. 2017, 106 pages.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.0, Mar. 2017, 721 pages.

"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.

"3rd Generation Partnership Project; Technical Specification Group Radio Access Network; Study on New Radio Access Technology Physical Layer Aspects (Release 14)", 3GPP TR 38.802 V14.2.0, Sep. 2017, 145 pages.

International Search Report and Written Opinion regarding International Application No. PCT/KR2018/009616, dated Nov. 21, 2018, 9 pages.

"3rd Generation Partnership Project; Technical Specification Group Radio Access Network; Evolved Universal Terrestrial Radio Access (E-UTRA); Physical layer procedures (Release 14)", 3GPP TS 36.213 V14.3.0, Jun. 2017, 263 pages.

Samsung, "Support for Increased CSI Feedback Payloads in PUCCH", 3GPP TSG RAN WG1 #61 bis, R1-103642, Jun. 2010, 3 pages.

Communication under Rule 71(3) EPC dated Dec. 9, 2020 in connection with European Patent Application No. 18 849 196.3, 104 pages.

Intellectual Property India, "Examination report under sections 12 13 of the Patents Act, 1970 and the Patents Rules, 2003", dated Mar. 5, 2021, in connection with IN Patent Application No. 201927053391, 4 pages.

Korean Intellectual Property Office, "Office Action", dated Mar. 15, 2021, in connection with KR Patent Application No. 2020-7004071, 149 pages.

China National Intellectual Property Administration , "Office Action" dated Dec. 3, 2021, in connection with Chinese Patent Application No. 201880054576.2, 8 pages.

Ericsson, "On remaining details of CSI reporting", 3GPP TSG RAN WG1 Meeting 90bis, R1-1718432, Oct. 2017, 14 pages.

European Search Report dated Jun. 30, 2021 in connection with European Patent Application No. 21 16 7676, 9 pages.

Grant of Patent dated Jun. 2, 2021 in connection with Korean Patent Application No. 10-2020-7004071, 8 pages.

Extended European Search Report issued Feb. 23, 2023 regarding Application No. 22208816.3, 9 pages.

* cited by examiner

METHOD AND APPARATUS FOR MULTIPLEXING HIGHER-RESOLUTION CHANNEL STATE INFORMATION (CSI)

CROSS-REFERENCE TO RELATED APPLICATIONS AND CLAIM OF PRIORITY

This application is a continuation of U.S. Non-Provisional patent application Ser. No. 17/443,320 filed Jul. 23, 2021, which is a continuation of U.S. Non-Provisional patent application Ser. No. 16/104,615 filed Aug. 17, 2018, and claims priority to: U.S. Provisional Patent Application No. 62/548,222 filed Aug. 21, 2017; U.S. Provisional Patent Application No. 62/556,771 filed Sep. 11, 2017; U.S. Provisional Patent Application No. 62/557,320 filed Sep. 12, 2017; U.S. Provisional Patent Application No. 62/558,120 filed Sep. 13, 2017; U.S. Provisional Patent Application No. 62/559,322 filed Sep. 15, 2017; U.S. Provisional Patent Application No. 62/559,961 filed Sep. 18, 2017; U.S. Provisional Patent Application No. 62/564,612, filed on Sep. 28, 2017; U.S. Provisional Patent Application No. 62/566,916, filed on Oct. 2, 2017; U.S. Provisional Patent Application No. 62/569,765, filed on Oct. 9, 2017; U.S. Provisional Patent Application No. 62/570,293, filed on Oct. 10, 2017; U.S. Provisional Patent Application No. 62/594,886, filed on Dec. 5, 2017; and U.S. Provisional Patent Application No. 62/609,931, filed on Dec. 22, 2017. The content of the above-identified patent documents is incorporated herein by reference.

TECHNICAL FIELD

The present disclosure relates generally to wireless communication systems and, more specifically, to the multiplexing higher-resolution channel state information (CSI) in an advanced wireless communication system.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE. However, with increase in the numbers of antennas and channel paths of wireless communication devices, so too has the amount of feedback increased that may be needed to ideally estimate the channel. This additionally-desired channel feedback may create additional overheads, thus reducing the efficiency of the wireless communication, for example, decrease the data rate.

SUMMARY

Embodiments of the present disclosure provide methods and apparatuses for multiplexing higher-resolution channel state information (CSI) in an advanced wireless communication system.

In one embodiment, a user equipment (UE) for channel state information (CSI) reporting in a wireless communication system is provided. The UE comprises a transceiver configured to receive, from a base station (BS), configuration information for K CSI reports, wherein the configuration information includes resource allocation information for an uplink control information (UCI) transmission that includes UCI comprising N UCI parts. The UE further comprises a processor operably connected to the transceiver, the processor configured to calculate the K CSI reports and partition the K CSI reports into N parts, determine an available number of information bits (B1) for the UCI transmission according to the resource allocation information; determine a required number of information bits (B2) for the UCI transmission according to the calculated K CSI reports; and determine whether the required number of information bits (B2) exceeds the available number of information bits (B1), wherein the transceiver is further configured to transmit, to the BS over one slot of an uplink channel, a first part of the N UCI parts including a first of the N parts of the K CSI reports when the required number of information bits (B2) exceeds the available number of information bits (B1), wherein K and N are positive integers.

In another embodiment, a base station (BS) for channel state information (CSI) reporting in a wireless communication system is provided. The BS comprises a transceiver configured to transmit, to a user equipment (UE), configuration information for K CSI reports, wherein the configuration information includes resource allocation information for an uplink control information (UCI) transmission that includes UCI comprising N UCI parts; and receive, from the UE over one slot of an uplink channel, a first part of the N UCI parts including a first of N parts of K CSI reports when a required number of information bits (B2) exceeds an available number of information bits (B1), wherein K and N are positive integers, and wherein, at the UE: the K CSI reports are calculated and partitioned into N parts; the available number of information bits (B1) for the UCI transmission according to the resource allocation information is determined; the required number of information bits (B2) for the UCI transmission according to the calculated K CSI reports is determined; and whether the required number of information bits (B2) exceeds the available number of information bits (B1) is determined.

In yet another embodiment, a method of user equipment (UE) for channel state information (CSI) reporting in a wireless communication system is provided. The method comprises receiving, from a base station (BS), configuration information for K CSI reports, wherein the configuration information includes resource allocation information for an uplink control information (UCI) transmission that includes UCI comprising N UCI parts; calculating the K CSI reports and partitioning the K CSI reports into N parts; determining an available number of information bits (B1) for the UCI transmission according to the resource allocation information; determining a required number of information bits (B2) for the UCI transmission according to the calculated K CSI reports; determining whether the required number of information bits (B2) exceeds the available number of information bits (B1); and transmitting, to the BS over one slot of an uplink channel, a first part of the N UCI parts including a first of the N parts of the K CSI reports when the required number of information bits (B2) exceeds the available number of information bits (B1), wherein K and N are positive integers.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
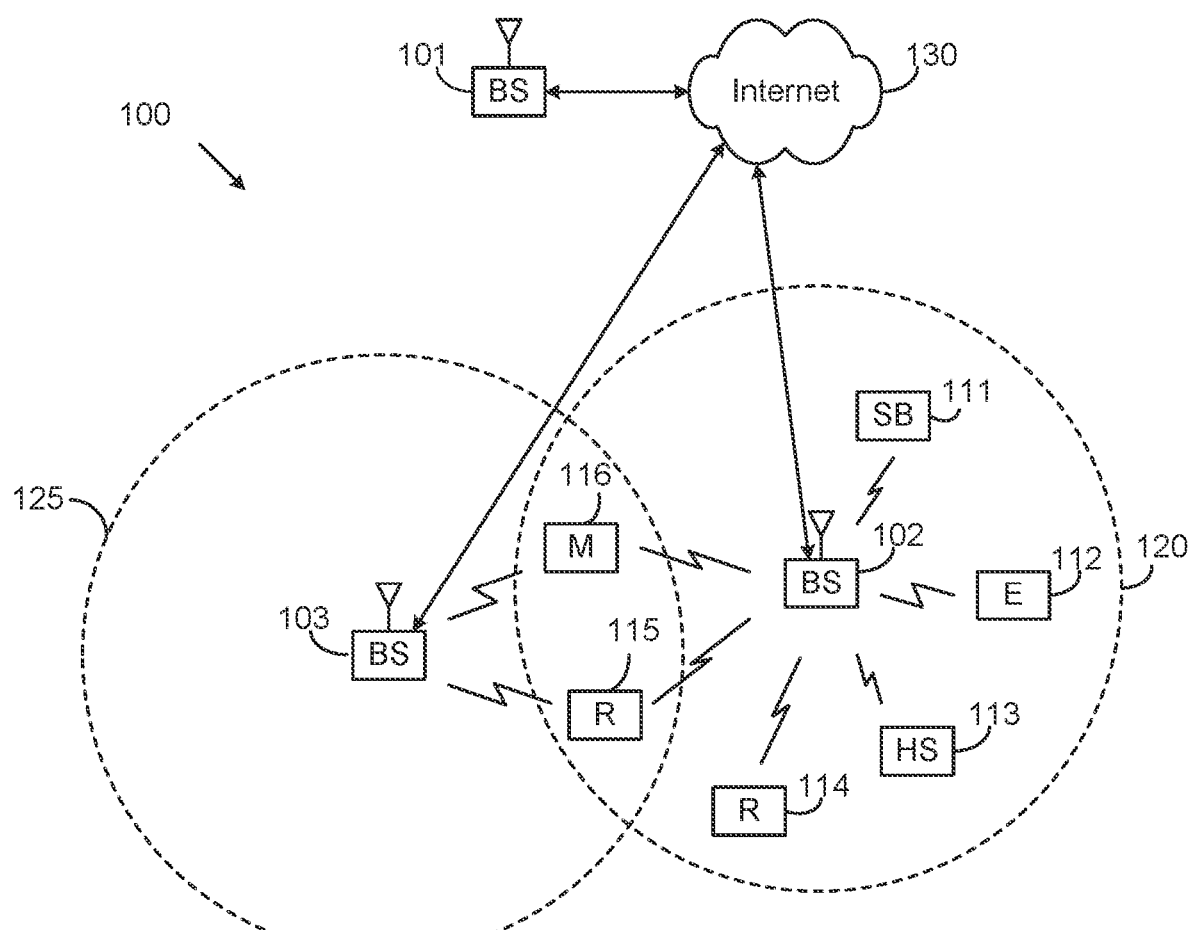
FIG. 1 illustrates an example wireless network according to embodiments of the present disclosure.

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.2.0, "E-UTRA, Physical channels and modulation;" 3GPP TS 36.212 v14.2.0, "E-UTRA, Multiplexing and Channel coding;" 3GPP TS 36.213 v14.2.0 "E-UTRA, Physical Layer Procedures;" 3GPP TS 36.321 v14.2.0, "E-UTRA, Medium Access Control (MAC) protocol specification;" 3GPP TS 36.331 v14.2.0, "E-UTRA, Radio Resource Control (RRC) protocol specification;" 3GPP TR 22.891 v1.2.0, "Feasibility Study on New Services and Markets Technology Enablers;" and 3GPP TR 38.802 v14.2.0, "Study on New Radio Access Technology Physical Layer Aspect."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
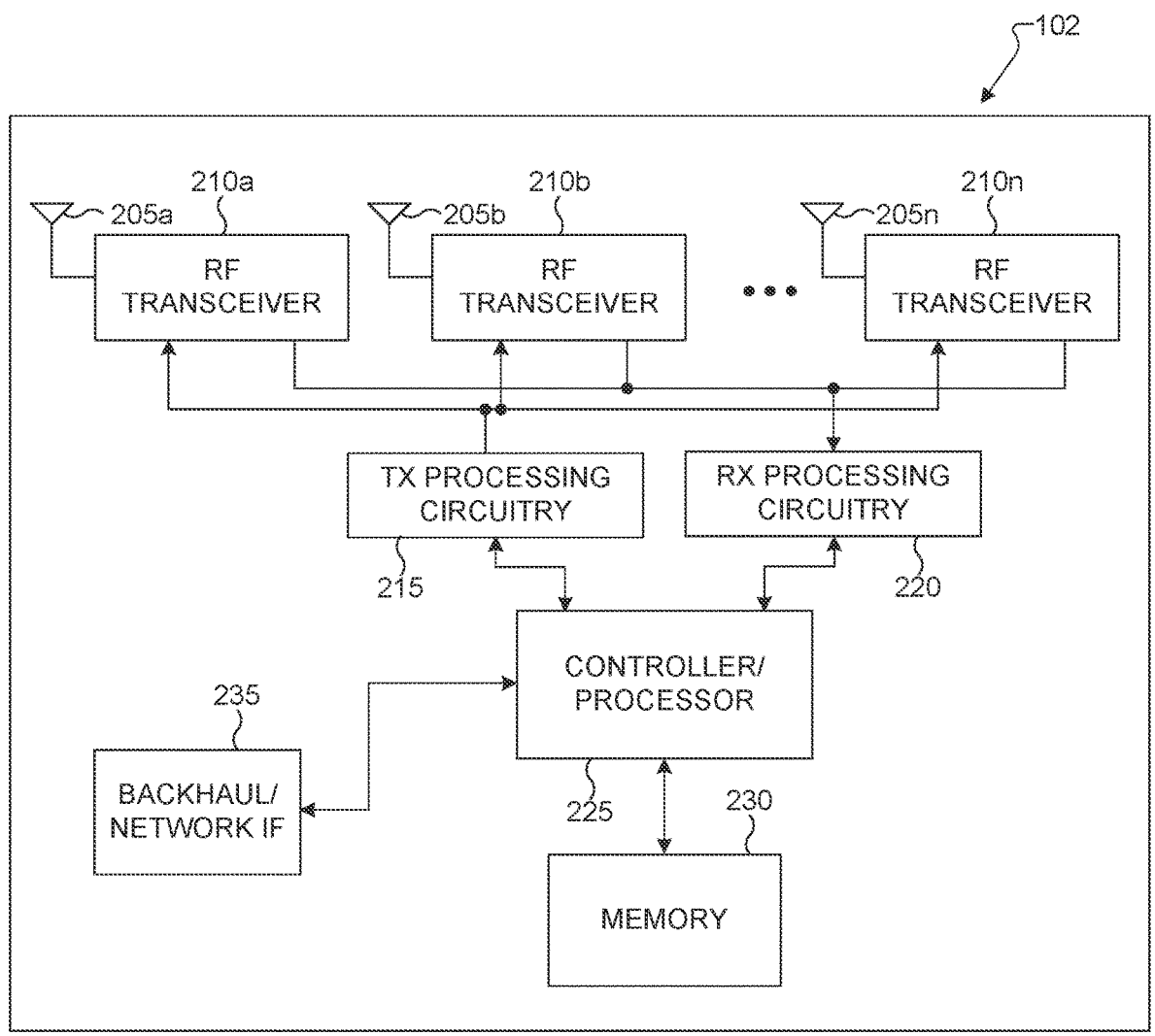
FIG. 2 illustrates an example eNB according to embodiments of the present disclosure.
Figure 3:
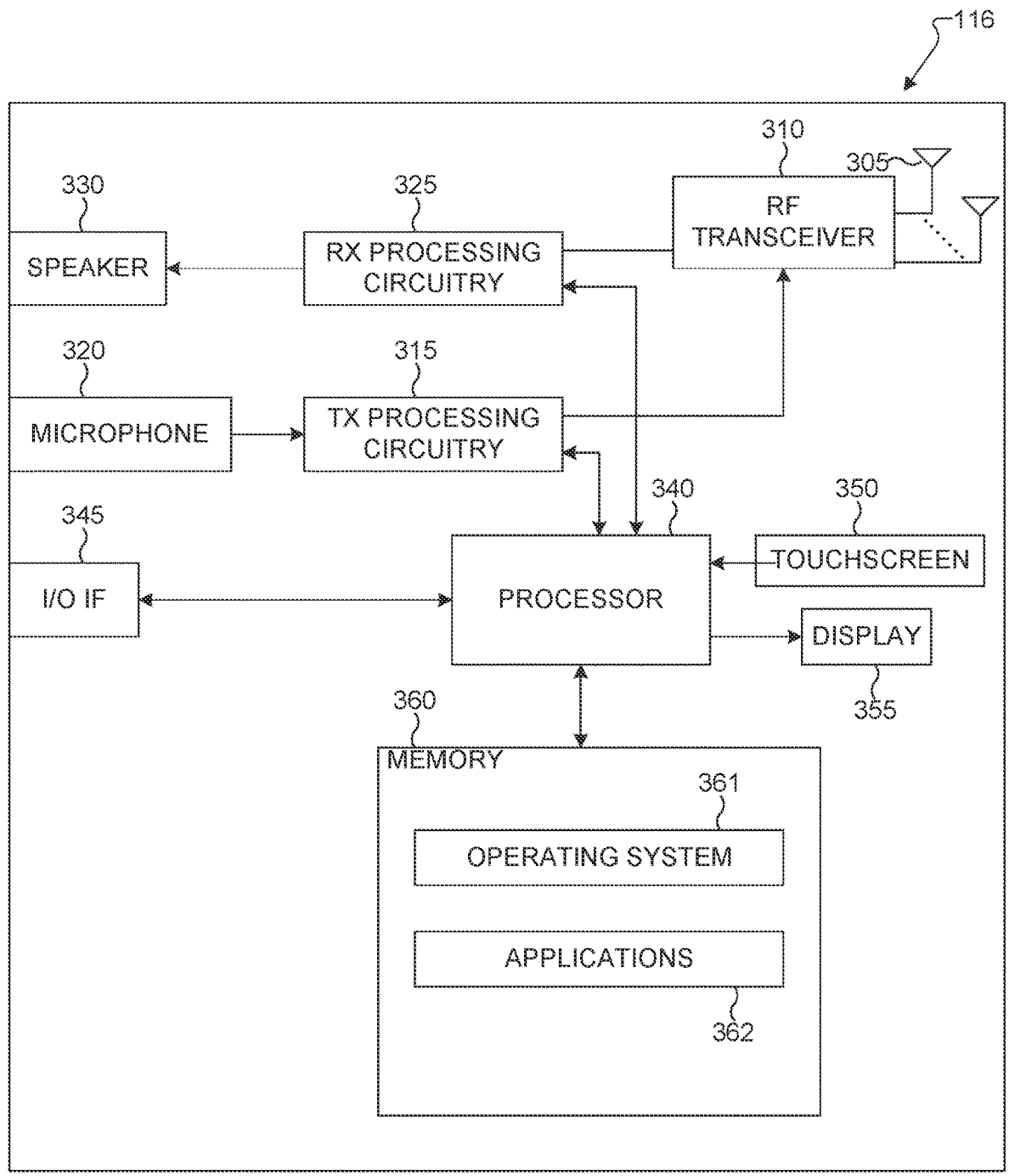
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient multiplexing higher-resolution channel state information (CSI) in an advanced wireless communication system. In certain embodiments, and one or more of the eNBs 101-103 includes circuitry, programming, or a combination thereof, for efficient multiplexing higher-resolution channel state information (CSI) in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
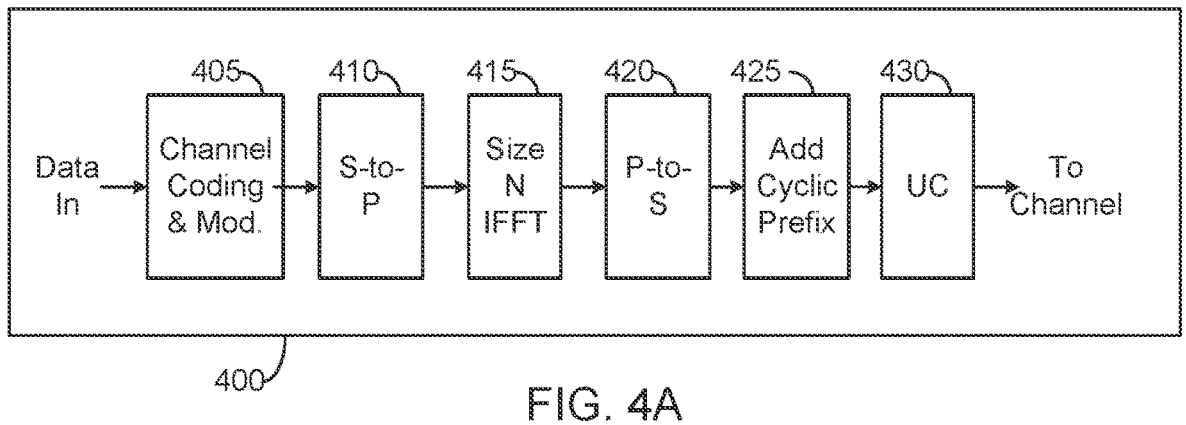
FIG. 4A illustrates a high-level diagram of an orthogonal frequency division multiple access transmit path according to embodiments of the present disclosure.
Figure 4B:
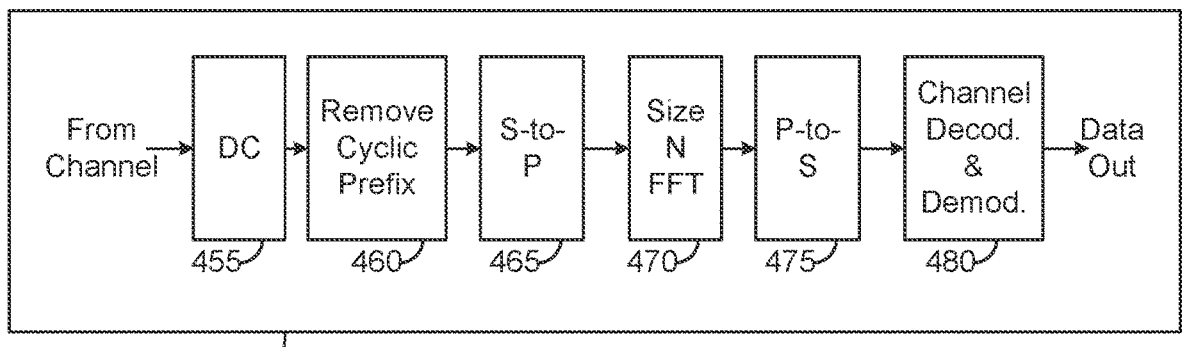
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
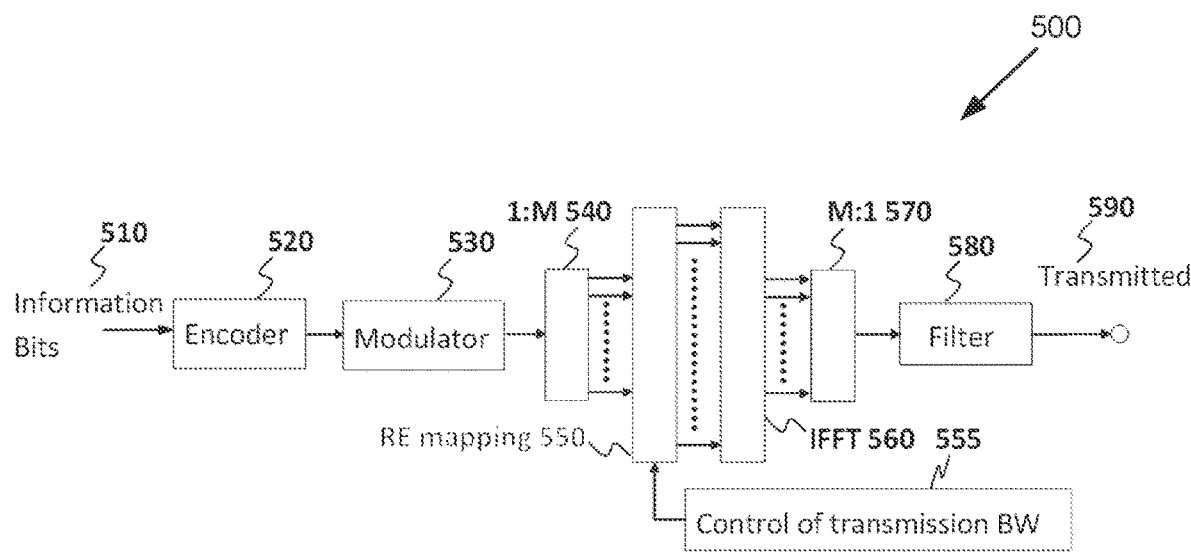
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
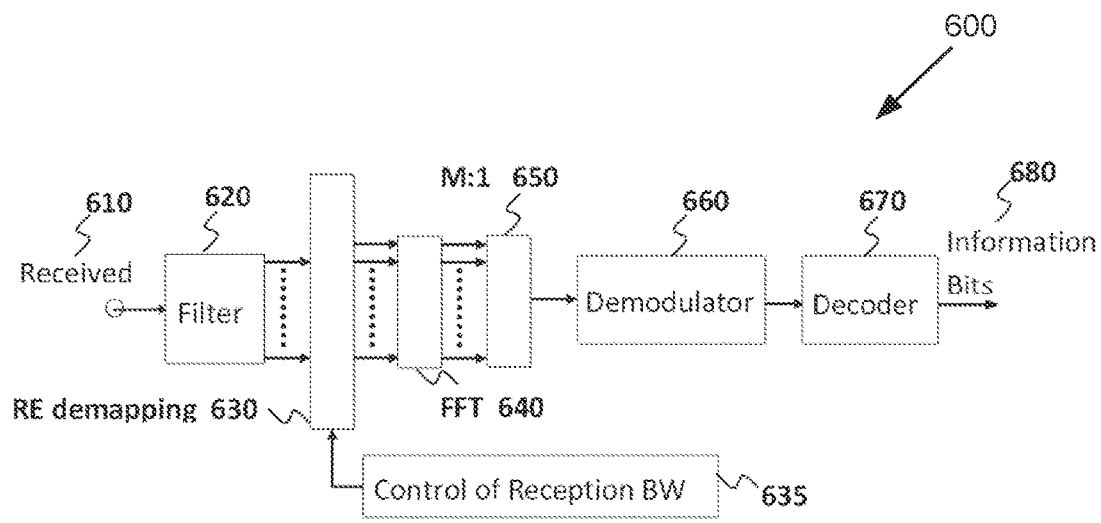
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
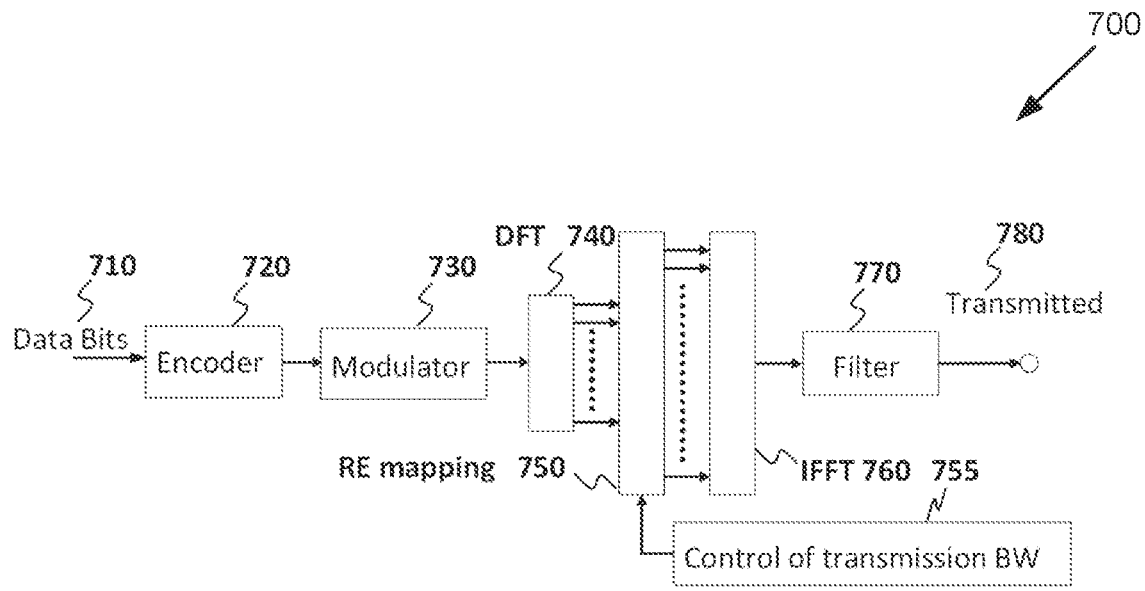
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
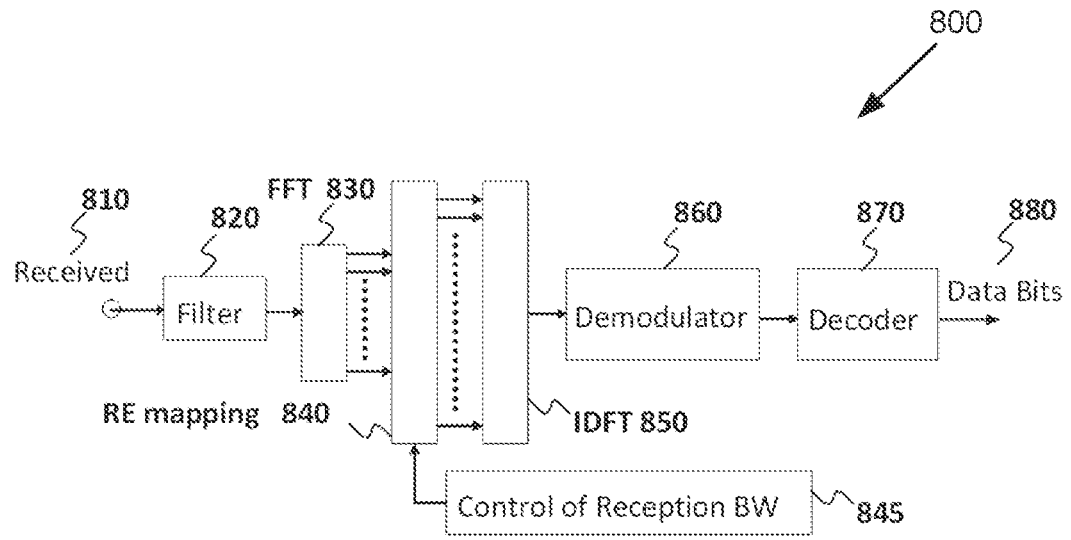
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
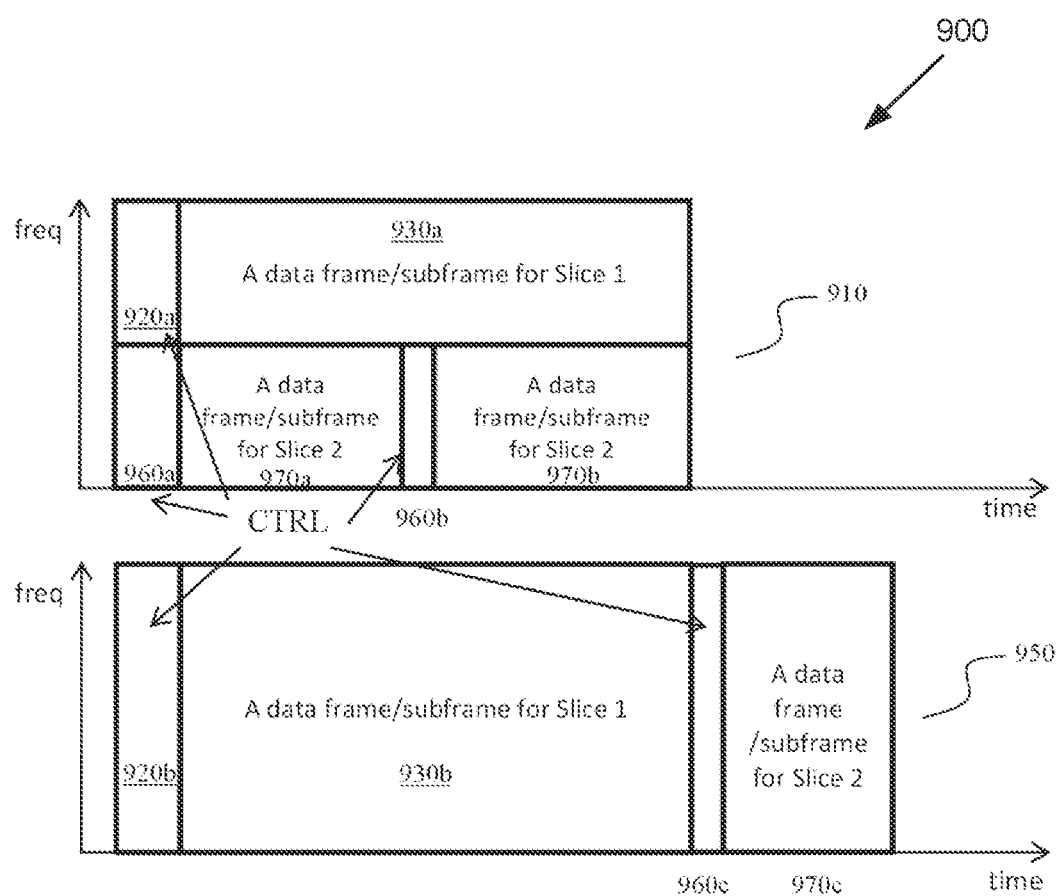
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
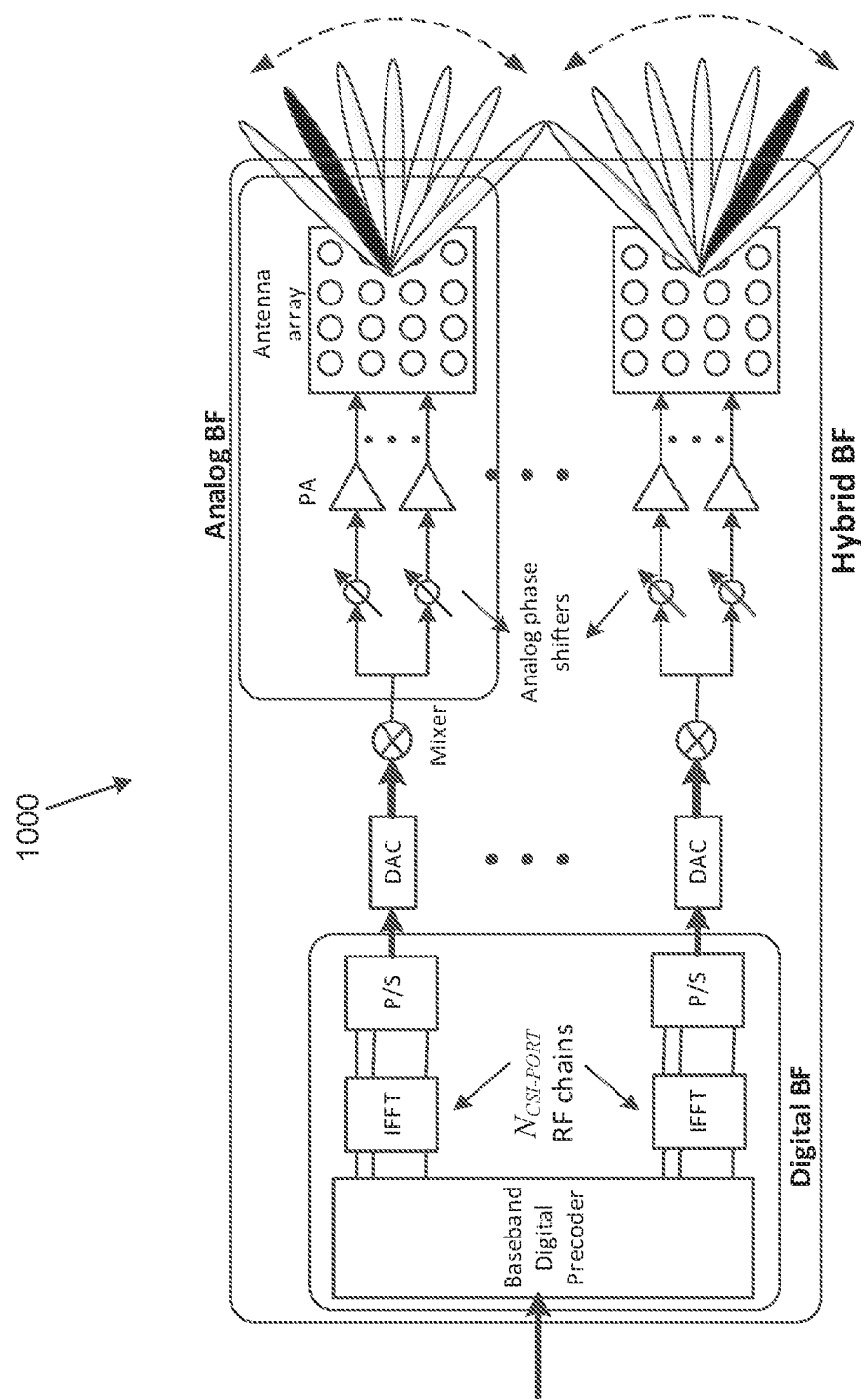
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks. In LTE, depending on the number of transmission layers, a maximum of two codewords are used for DL and UL data transmissions (on DL data channel such as PDSCH or PDCH, and UL data channel such as PUSCH or PUCH, respectively) for spatial multiplexing. For L=1 layer, one codeword is mapped to one layer. For L>1 layers, each of the two codewords is mapped to at least one layer where L layers (rank-L) are divided almost evenly across the two codewords. In addition, one codeword can also be mapped to >1 layers especially when only one of the two codewords is to be retransmitted.

Although beneficial for facilitating modulation-and-coding-scheme (MCS) adaptation per codeword (CW) and MMSE-SIC (MMSE with successive interference cancellation) receiver, it costs some significant overhead over a single CW mapping. DL overhead comes from the additional DCI payload due to 2 fixed MCS fields and 2 fixed NDI-RV (DL HARQ related) fields. UL overhead comes from the need for two CQIs (full 4-bit+delta 3-bit for wideband CQI, and 2× overhead for subband CQI) for rank>1 and two DL HARQ-ACKs for rank>1. Added to that is the complexity of having to accommodate more than one layer mapping schemes in case of retransmission. Furthermore, when distributed MIMO such as non-coherent joint transmission (NC-JT) is incorporated into design requirements for 5G NR, the number of codewords (CWs) used for DL and UL transmissions per UE can increase with the number of TRPs. Therefore, using only one CW per PDSCH/PUSCH assignment per UE is beneficial for NR, at least for up to rank-2 transmission, or up to rank-4 transmission. Else, two-CW per PDSCH/PUSCH assignment per UE can be used for higher ranks. Alternatively, one CW per PDSCH/PUSCH assignment per UE can be used for all ranks.

In addition, periodic CSI (P-CSI) reporting in LTE is reported across multiple slots/Subframe/Slots. This results in complex priority rules (due to dropping) and inter-Subframe/Slot/slot dependencies which is unsuitable for TDD and LAA (since the availability of UL Subframe/Slots/slots is conditional). This mechanism is susceptible to error propagations and stale CSI. The main reasons are: 1) PUCCH format 2 is too small to carry one-shot CSI reporting, 2) RI-dependent CQI payload (due to the use of maximum of 2 CWs), 3) RI-dependent PMI payload.

Yet another drawback of LTE design lies in separately encoding RI (and CRI) from CQI and PMI. This is necessary since the payload for CQI and PMI is rank-dependent. Since the payload for RI is small and RI needs to be protected more compared to CQI and PMI (to ensure correct decoding of CQI and PMI), RI is also mapped differently from CQI and PMI. But even with such a strong protection, there is no mechanism for the gNB to check whether RI (and CRI) decoding is successful or not (due to the absence of CRC).

Therefore, there is a need for a different design for CSI and its associated uplink control information (UCI) multiplexing schemes when a single codeword (CW) is mapped to all the L≥1 transmission layers. The present disclosure includes several components. Here, UCI includes reporting parameters associated with CSI acquisition, such as CQI (channel quality indicator), PMI (precoding matrix index), RI (rank indicator), and CRI (CSI-RS resource index/indicator). Other CSI parameters can also be included. Unless otherwise stated, this UCI does not include HARQ-ACK. In the present disclosure, this UCI can also be referred to as CSI-UCI for illustrative purposes.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one Subframe/Slot (which can consist of one or multiple slots) or one slot.

The aperiodic CSI (A-CSI) accommodates reporting with different frequency granularities (one report for all the $N_{SB}$ subbands in a configured CSI reporting band, or one report per subband in a configured CSI reporting band) for CQI and PMI. RI and CRI (and its associated CSI-RSRP(s)), however, are only reported with one frequency granularity (one report for all the $N_{SB}$ subbands in a configured CSI reporting band).

In addition, if single-CW layer mapping is used, CQI payload is independent of RI value. PMI payload, however, can be dependent on RI value. For example, for Type I (normal) CSI with lower spatial resolution, PMI payload can be made RI-independent or less dependent on RI value. For Type II (enhanced) CSI with higher spatial resolution, PMI payload can be RI-dependent (for instance, PMI payload can be proportional to RI value with per-layer quantization/feedback). The following embodiments, however, can be utilized whether single-CW layer mapping is used or not. For example, they are also applicable for a layer mapping where the maximum of 2 CWs are used (such as that used for LTE).

Component 1—aperiodic CSI (A-CSI) reporting in two parts.

In one embodiment of the present disclosure (Scheme 1), the CSI parameters included in PMI are partitioned into two parts: PMI part I and PMI part II. When a UE is configured with RI reporting, RI, CQI, and PMI part I are jointly encoded to form a codeword segment 1. PMI part II is jointly encoded to form another codeword segment 2.

For aperiodic CSI (A-CSI) reporting, a gNB allocates resource (UL RBs) for UCI transmission (e.g. on PUSCH) without knowing what the UE reports for RI. For Type II, the payload difference between RI=1 and RI=2 is large, i.e., the payload for RI=2 is approximately 2 times of that for RI=1. The resource allocation is according to at least one of the following schemes.

In scheme 1A, the PMI part I and PMI part II correspond to the PMI for layer 1 and layer 2, respectively, and resource allocation for the codeword segment 1 (which includes PMI part I) and codeword segment 2 (which includes PMI part II) are in two different slots (or subframes). When A-CSI reporting is triggered, PUSCH resource is allocated according to RI=1 CSI payload size. Depending on the RI value (included in codeword segment 1) reported in the first CSI reporting instance, gNB determines whether to trigger another A-CSI reporting for codeword segment 2. If triggered, PUSCH resources could be allocated based on the received CSI contents in the first CSI reporting instance.

In a variation of this scheme (1A-1), the resource allocation for the codeword segment 2 (if RI=2 is reported in codeword segment 1) is fixed. So, there is no need for additional signaling for the resource location for codeword segment 2. For example, the resource allocation (UL RBs) can be the same as that for codeword segment 1, i.e. the same UL RBs in a different slot, whose location is fixed with respect to the slot in which codeword segment 1 is configured to be reported.

In another variation of this scheme (1A-2), the resource allocation for the codeword segment 2 (if RI=2 is reported in codeword segment 1) is configured (via DCI triggering or signaling). For example, the resource allocation (UL RBs) can be determined based on the beta offset (in LTE) with respect to the resource allocation for codeword segment 1.

In scheme 1B, the PMI part I and PMI part II are configured to be reported in a single slot or subframe according to at least one of the following variations of scheme 1B. The term "configured RI" or "to configure the value of RI" in these variations of scheme 1B (and elsewhere in the present disclosure) refers to at least one of the two definitions (DEF1 and DEF2).

In some embodiments (DEF1), it means to force (restrict) the UE to report the same RI value as that signaled to the UE. Or, optionally, in this definition, the UE does not report RI since it is the same as the configured RI value. In other embodiments (DEF2), it signifies an assumed value of RI in relation to the indicated resource allocation (RA) for UCI transmission which the UE needs to know—but does not imply that the UE is restricted to report the same RI value as that assumed in relation to the RA (i.e., UE can report a different RI value from the assumed value). Here, UCI includes CSI reporting which includes at least one of the following: CRI, RI, PMI, and CQI.

In both DEF1 and DEF2, the RA for UCI transmission is signaled to the UE in the form of a RA field in an UL-related (or, optionally, DL-related) DCI which includes a CSI request field. The "configured RI" is signaled to the UE via either higher-layer (such as RRC) signaling, L2 signaling (such as MAC CE), or L1 signaling (such as DCI). If signaled via L1 signaling, the "configured RI" (signaled in the form of a DCI field, termed here for illustrative purposes, the DCI field X) is either signaled together in the same UL-related (or, optionally, DL-related) DCI which includes the RA field, or signaled separately in another DCI. If signaled in the same UL-related (or, optionally, DL-related) DCI as the RA field, the DCI field X can be signaled either as a separate field from the RA field or a part of the RA field. If signaled as a part of the RA field, resource allocation definition for UCI transmission is defined to include the "configured RI."

In one embodiment of Scheme 1B-0, the resource allocation (RA) scheme or signaling for UL-related DCI is used for the purpose of UCI transmission assuming a fixed value of RI if Type II CSI reporting is configured regardless of the reported value of RI. For example, the fixed value of RI for RA is RI=2.

In one embodiment of Scheme 1B-1, the resource allocation (RA) scheme or signaling for UL-related DCI is used for the purpose of UCI transmission. UE (and later gNB upon receiving the A-CSI report) interprets the RA field differently depending on the value of RI. The UE assumes a default RA=X PRBs which corresponds to a fixed RI value. For example, when X PRBs correspond to RI=1, then the UE assumes that the number of PRBs=K*X when RI=2, where K is a constant.

In one example of Alt1.1, K is configurable either semi-statically (via RRC, higher layer signaling), or more dynamically (via MAC CE based or DCI signaling).

In one example of Alt1.2, K is pre-defined in the specification, e.g. K=1.5, or 2.

In one example of Alt1.3, K is determined implicitly depending on, e.g. frequency granularity ("wideband, or partial band, or subband" or "one report for all subbands or one report per subband") of CQI and/or PMI. TABLE 1 shows an example.

TABLE 1

| K values | |
|---|---|
| Frequency granularity for PMI | K |
| Wideband | 1 |
| Partial band | 2 |
| Subband | 2 |

In one embodiment of Scheme 1B-2, in addition to the normal bit allocation for UCI transmission, additional bit(s) is (are) added in UL-related DCI to signal RA for both RI=1 and RI=2 if Type II CSI reporting is configured. These additional bit(s) can be a part of at least one of or a combination of RA field or CSI request field, or other fields in the UL-related DCI. With these additional bits, the UL-related DCI signaling is expanded to indicate two hypotheses for two different RI values.

In one embodiment of Scheme 1B-3, the gNB triggers A-CSI for a certain value of RI and configures the value of RI in the UL-related DCI (or DL-related DCI). The RA is according to the CSI (including PMI, CQI, and RI) reporting payload (number of bits) corresponding to the configured value of RI. Note that in this case even when the UE can support RI=2, the gNB may configure only RI=1 CSI. The UE reports RI and remaining CSI (including at least one of CRI, PMI, and CQI) according to at least one of the following three alternatives:

In one example of Alt1.4, a UE does not report RI and reports the CSI (including at least one of CRI, PMI, and CQI) corresponding to the configured value of RI. Here the definition of "configured RI" is assumed to be according to DEF1.

In one example of Alt1.5, a UE reports RI, which can be different from the RI configured by the gNB. For example, if the configured value of RI=2, UE can report RI=1 or RI=2. Here the definition of "configured RI" is assumed to be according to DEF2. At least one of the following sub-alternatives is used for remaining CSI reporting.

In one example of Alt 1.5a, the UE reports the remaining CSI (including at least one of CRI, PMI, and CQI) according to the assumed value of RI in relation to the indicated resource allocation (RA) for UCI transmission.

In one example of Alt1.5b, the UE reports the remaining CSI (including at least one of CRI, PMI, and CQI) according to the reported value of RI.

If RI can take a value from $\{1, 2\}$, then a 1-bit field is used in DCI to configure RI.

If RI can take a value from $\{1, 2, 3, 4\}$, then a 2-bit field is used in DCI to configure RI.

Alternatively, if RI can take a value from $\{1, 2, 3, 4\}$, then a 1-bit field is used in DCI to configure either set S1=$\{1\}$ or set S2=$\{2, 3, 4\}$ for RI for remaining CSI (PMI and CQI) reporting. In this later alternative, the PMI reporting payload (number of bits) for the RI value in set S1 is significantly differently (e.g. 2 times) from that in set S2. The PMI reporting payload (number of bits) for RI values in set S2 is either the same or comparable.

The RA is according to the CSI reporting payload for the configured set S1 or S2 for RI. Also, if the configured value of RI equals set S1, then the UE either does not report RI (Alt 1.4) or reports a 2-bit RI indicating values from $\{1, 2, 3, 4\}$ (Alt 1.5). And if the configured values of RI equals set S2, then the UE reports a 3-bit RI indicating values from S=$\{(1, 2), (1, 3), (1, 4), (2, 2), (3, 3), (4, 4)\}$, where a pair (a, b) in set S indicates reported RI=a and reported remaining CSI (PMI and CQI) corresponding to the configured RI=b.

In a variation of the aforementioned scheme, the value of RI is configured semi-statically via higher layer RRC signaling or more dynamic MAC CE based signaling.

In one embodiment of Scheme 1B-4, the gNB triggers A-CSI for certain layer(s) and configures the value(s) of layer(s) in the UL-related DCI (or DL-related DCI). The RA is according to the CSI (including PMI, CQI, and RI) reporting payload (number of bits) corresponding to the configured value(s) of layer(s). Note that in this case even when the UE can support 2 layers (layer 0 and layer 1), the gNB may configure only one layer (layer 0 or layer 1) CSI. The UE reports RI and remaining CSI (including at least one of CRI, PMI, and CQI) according to at least one of the following three alternatives.

In one example of Alt1.6, a UE does not report RI and reports the CSI (including at least one of CRI, PMI, and CQI) corresponding to the configured value(s) of layer(s). Here the configured number of layers corresponds to "configured RI" and the definition of "configured RI" is assumed to be according to DEF1.

In one example of Alt1.7, a UE reports RI, which can be different from the number of layer(s) configured by the gNB. For example, if the configured value(s) of layer(s) is 2, UE can report RI=1 or RI=2. Here the configured number of layers corresponds to "configured RI" and the definition of "configured RI" is assumed to be according to DEF2. At least one of the following sub-alternatives is used for remaining CSI reporting.

In one example of Alt 1.7a, the UE reports the remaining CSI (including at least one of CRI, PMI, and CQI) according to the assumed value of RI (=configured number of layers) in relation to the indicated resource allocation (RA) for UCI transmission.

In one example of Alt1.7b, the UE reports the remaining CSI (including at least one of CRI, PMI, and CQI) according to the reported value of RI.

If an RI can take a value from {1, 2}, then value(s) of layer(s) is/are configured according to at least one of the following alternatives: (Alt 1.8) a 1-bit field is used in DCI to configure either layer 0 or layer 1; (Alt 1.9) a 1-bit field is used in DCI to configure either layer 0 or both layer 0 and layer 1; and (Alt 1.10) a 2-bit field is used in DCI to configure either layer 0 or layer 1 or both layer 0 and layer 1.

If an RI can take a value from {1, 2, 3, 4}, then value(s) of layer(s) is/are configured according to at least one of the following alternatives: (Alt 1.11) a 1-bit field is used in DCI to configure either layer 0 or {layer 1, layer 2, layer 3}; (Alt 1.12) a 2-bit field is used in DCI to configure either layer 0 or layer 1 or layer 2 or layer 3; (Alt 1.13) a 2-bit field is used in DCI to configure either layer 0 or {layer 0, layer 1} or {layer 0, layer 1, layer 2} or {layer 0, layer 1, layer 2, layer 3}; and (Alt 1.14) a 2-bit field is used in DCI to configure either layer 0 or layer 1 or {layer 0, layer 1} or {layer 2, layer 3}.

Alternatively, if an RI can take a value from {1, 2, 3, 4}, then a 1-bit field is used in DCI to configure either set S1={layer 0} or set S2={layer 1, layer 2, layer 3} for RI for (PMI and CQI). In this later alternative, the PMI reporting payload (number of bits) for the layer value in set S1 is significantly differently (e.g. 2 times) from that in set S2. The PMI reporting payload (number of bits) for layer values in set S2 is either the same or comparable. The RA is according to the CSI reporting payload for the configured set S1 or S2 for RI. Also, if the configured value of layer equals S1, then the UE either does not report RI (Alt 1.6) or reports a 2-bit RI indicating values from {1, 2, 3, 4} (Alt 1.7). And if the configured values of layers equal set S2, then the UE reports a 3-bit RI indicating values from S={(1, 2), (1, 3), (1, 4), (2, 2), (3, 3), (4, 4)}, where a pair (a, b) in set S indicates reported RI=a (indicating layer 0) and reported remaining CSI (PMI and CQI) corresponding to the configured RI=b (indicating layer 1, . . . , layer b-1).

In a variation of the aforementioned scheme, the value(s) of layer(s) is/are configured semi-statically via higher layer RRC signaling or more dynamic MAC CE based signaling.

In one embodiment of Scheme 1B-5, the gNB triggers A-CSI with a certain RA size and configures the value of RA size in the UL-related DCI (or DL-related DCI). The RA for CSI (including PMI, CQI, and RI) reporting is according to the configured value of RA size. Note that the UE can report A-CSI that requires two different RA sizes for RI=1 and RI=2, but the gNB can configure RA size for RI=1 CSI. The UE reports RI and remaining CSI (including at least one of CRI, PMI, and CQI) according to at least one of the following three alternatives.

In one example of Alt1.15, a UE does not report RI and reports the CSI (including at least one of CRI, PMI, and CQI) corresponding to RI associated with the configured value of RA size. Here the configured RA size corresponds to "configured RI" and the definition of "configured RI" is assumed to be according to DEF1.

In one example of Alt1.16, a UE reports RI, which can be different from the RI corresponding to the configured value of RA size by the gNB. For example, if the configured value of RA size correspond to RI=2, UE can report RI=1 or RI=2. Here the configured RA size corresponds to "configured RI" and the definition of "configured RI" is assumed to be according to DEF2. At least one of the following sub-alternatives is used for remaining CSI reporting.

In one example of Alt 1.16a, the UE reports the remaining CSI (including at least one of CRI, PMI, and CQI) according to the assumed value of RI (corresponds to the configured RA size) in relation to the indicated resource allocation (RA) for UCI transmission.

In one example of Alt1.16b, the UE reports the remaining CSI (including at least one of CRI, PMI, and CQI) according to the reported value of RI.

If RA size can take a value from {1, 2} that one-to-one corresponds to RI value in {1, 2}, then a 1-bit field is used in DCI to configure RA size 1 or 2 corresponding to RI=1 or RI=2 respectively.

If RA size can take a value from {1, 2, 3, 4} that one-to-one corresponds to RI value in {1, 2, 3, 4}, then a 2-bit field is used in DCI to configure RA size 1, 2, 3, or 2 corresponding to RI=1, 2, 3, or 4 respectively.

Alternatively, if RA size can take a value from {1, 2} that one-to-one corresponds to RI value in two sets, e.g. S1={1} and S2={2, 3, 4} for RI for remaining CSI (PMI and CQI) reporting, then a 1-bit field is used in DCI to configure RA size 1 or 2 corresponding to RI in set S1 or RI in set S2, respectively. In this later alternative, the PMI reporting payload (number of bits) for the RI value in set S1 is significantly differently (e.g. 2 times) from that in set S2. The PMI reporting payload (number of bits) for RI values in set S2 is either the same or comparable.

The RA is according to the CSI reporting payload for the configured set S1 or S2 for RI. Also, if the configured value of RA size=1 that corresponds to RI=S1, then the UE either does not report RI (Alt 1.15) or reports a 2-bit RI indicating values from {1, 2, 3, 4} (Alt 1.16). And if the configured values of RA size=2 that corresponds to RI=S2, then the UE reports a 3-bit RI indicating values from S={(1, 2), (1, 3), (1, 4), (2, 2), (3, 3), (4, 4)}, where a pair (a, b) in set S indicates reported RI=a and reported remaining CSI (PMI and CQI) corresponding to the configured RI=b.

In a variation of this scheme, the value of RI is configured semi-statically via higher layer RRC signaling or more dynamic MAC CE based signaling.

In one embodiment of Scheme 1B-6, Scheme 1B-4 in which layer numbers layer 0, layers 1 . . . and so on are replaced with their RA size numbers RA size 0, RA size 1 . . . and so on.

In one embodiment of Scheme 1B-7, the UE interprets the modulation and coding scheme (MCS) field in UL-related DCI for the purpose of UCI transmission differently depending on the value of RI reported by the UE. There is no additional gNBsignaling involved, and RA for UCI transmission is fixed regardless of the reported RI value.

The UE interprets the configured MCS field as MCS value=X for one RI value (e.g. RI=1) and as MCS value=Y for another RI value (e.g. RI=2), where the value Y is such that at least one of modulation and coding rate is different from that corresponding to MCS value=X. For example, the MCS value=X corresponds to RI=1, and the MCS value Y=K*X corresponds to RI=2, where K is a constant. At least one of the following alternatives is used for K.

In one example of Alt1.17, K is configurable either semi-statically (via RRC, higher layer signaling), or more dynamically (via MAC CE based or DCI signaling). This configuration is either explicit via a RRC parameter signaling the value of K, or implicit via at least one of the Type II CSI codebook parameters such as parameter to set the value for L, resolution for phase reporting, and SB amplitude reporting.

In one example of Alt1.18, K is pre-defined in the specification, e.g. K=1/2, or 1/3.

In one example of Alt1.19, K is determined implicitly depending on, e.g. frequency granularity ("wideband, or partial band, or subband" or "one report for all subbands or one report per subband") of CQI and/or PMI. TABLE 2 shows an example.

TABLE 2

| K values | |
|---|---|
| Frequency granularity for PMI | K |
| Wideband | 1 |
| Partial band | 1 |
| Subband | ½ |

For example, the MCS value=X corresponds to RI=1, and the MCS value Y=X−K corresponds to RI=2, where K is a constant. At least one of the following alternatives is used for K.

In one example of Alt1.20, K is configurable either semi-statically (via RRC, higher layer signaling), or more dynamically (via MAC CE based or DCI signaling). This configuration is either explicit via a RRC parameter signaling the value of K, or implicit via at least one of the Type II CSI codebook parameters such as parameter to set the value for L, resolution for phase reporting, and SB amplitude reporting.

In one example of Alt1.21, K is pre-defined in the specification, e.g. K=$\lfloor X/2 \rfloor$, or $\lfloor X/3 \rfloor$.

In one example of Alt1.22, K is determined implicitly depending on, e.g. frequency granularity ("wideband, or partial band, or subband" or "one report for all subbands or one report per subband") of CQI and/or PMI. TABLE 3 shows an example.

TABLE 3

| K values | |
|---|---|
| Frequency granularity for PMI | K |
| Wideband | 1 |
| Partial band | 1 |
| Subband | $\lfloor X/2 \rfloor$ |

In one embodiment of Scheme 1B-8, the UE (and later gNB upon receiving the A-CSI report) interprets both MCS field and RA field in UL-related DCI for the purpose of UCI transmission differently depending on the value of RI reported by the UE. There is no additional gNBsignaling involved. The UE interprets the configured MCS field as MCS value=X and RA=M PRBs for one RI value (e.g. RI=1) and as MCS value=Y and RA=N PRBs for another RI value (e.g. RI=2), where the value Y is such that at least one of modulation and coding rate is different from that corresponding to MCS value=X. For example, the MCS value=X and RA=M PRBs correspond to RI=1, and the MCS value Y=K1*X (or =X−K1) and RA=K2*N PRBs correspond to RI=2, where K1 and K2 are constant. The value K1 is according to at least one of alternatives in Scheme 1B-8 and the value K2 is according to at least one of alternatives in Scheme 1B-1.

In one embodiment of Scheme 1B-9, the UE performs rate matching (RM) to the UCI. Based on the indicated RA or/and MCS, RM is performed on the second part if the UCI payload is smaller or exceeds that accommodated by the indicated RA/MCS. Note that in this case, the condition to address different payloads for RI=1 and RI=2 is not based on RI (configured or reported), but based on the total UCI payload. At least one of the following two alternatives for RM is used.

In one example of Alt1.23, RM is performed using typical channel coding procedure (for, e.g. polar code), i.e. puncturing the parity bits first, and if needed, systematic bits later.

In one example of Alt1.24, RM is performed by puncturing some UCI bits based on a certain ordering, e.g. PMI first, then CQI.

Note that the gNB can infer the payload size (hence no blind detection is needed) doe the second part after decoding the first part.

In some embodiments on Type II CSI reporting, the PMI comprises a first (WB) PMI $i_1$ and a second (SB) PMI $i_2$. The first PMI $i_1=[i_{1,1}, i_{1,2}, i_{1,3}, i_{1,4}]$ comprises two layer-common (i.e., reported common for two layers if a UE reports RI=2) components: orthogonal basis set (indicated using index $i_{1,1}$ indicating the rotation factors ($q_1$, $q_2$) where $q_1$, $q_2 \in \{0,1,2, 3\}$); and L beam selection (indicated using index $i_{1,2}$), which is either joint, $\lceil \log_2 \binom{N_1 N_2}{L} \rceil$ bits, or independent per beam, $L \lceil \log_2(N_1 N_2) \rceil$ bits, and two layer-specific (i.e., reported for each of the two layers if UE reports RI=2) components: strongest coefficient (indicated using index $i_{1,3}$) and WB amplitudes $p_{1,i}^{(1)}$ (indicated using index $i_{1,4}$).

The indices $i_{1,3}$ and $i_{1,4}$ can be expressed further as $$i_{1,3} = \begin{cases} [i_{1,3,1}] & RI = 1 \\ [i_{1,3,1}\ i_{1,3,2}] & RI = 2 \end{cases} \text{ and } i_{1,4} = \begin{cases} [i_{1,4,1}] & RI = 1 \\ [i_{1,4,1}\ i_{1,4,2}] & RI = 2 \end{cases}.$$

The second PMI $i_2=[i_{2,1}, i_{2,2}]$ comprises two layer-specific components: SB phase $c_{l,i}$ indicated using index $i_{2,1}$ and SB amplitude $p_{l,i}^{(2)}$ (which can be turned ON or OFF by RRC signaling) indicated using index $i_{2,2}$, which can expressed as $$i_{2,1} = \begin{cases} [i_{2,1,1}] & RI = 1 \\ [i_{2,1,1} \; i_{2,1,2}] & RI = 2 \end{cases} \text{ and } i_{2,2} = \begin{cases} [i_{2,2,1}] & RI = 1 \\ [i_{2,2,1} \; i_{2,2,2}] & RI = 2 \end{cases}.$$

Note that $i_{1,3,2}$, $i_{1,4,2}$, $i_{2,1,2}$, and $i_{2,1,2}$ are reported only when RI=2 is reported. The subscript $l \in \{0,1\}$ is used for layers, and the subscript $i \in \{0,1, \ldots, 2L-1\}$ is used for coefficients. The first PMI is reported in a wideband (WB) manner and the second PMI can be reported in a wideband or subband (SB) manner.

Figure 11:
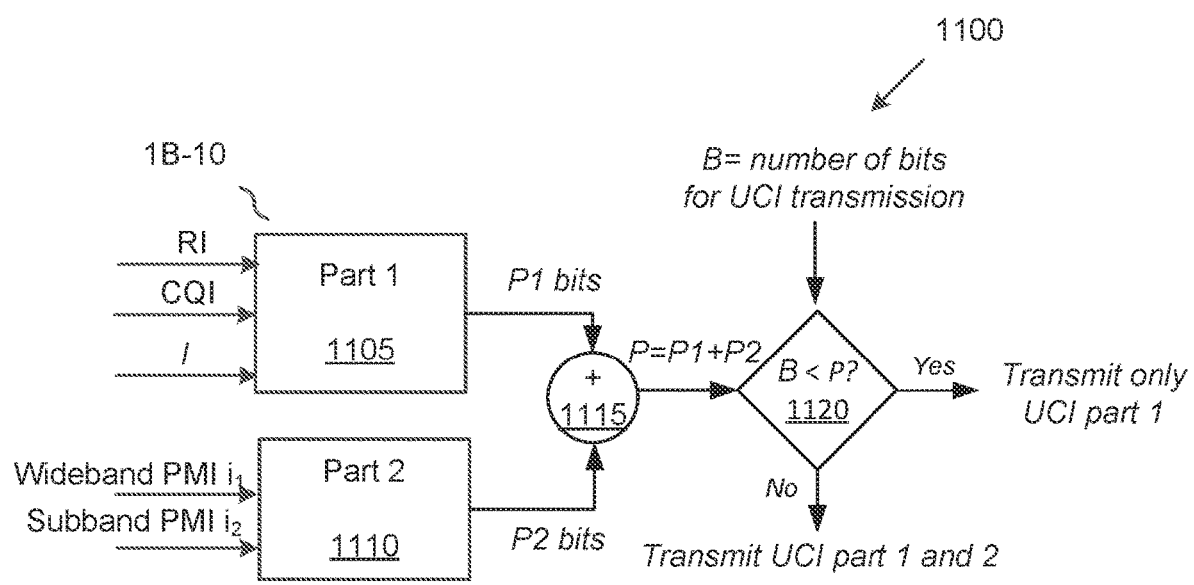
FIG. 11 illustrates an example two-part UCI design according to embodiments of the present disclosure.

FIG. 11 illustrates an example two-part UCI design 1100 according to embodiments of the present disclosure. The embodiment of the two-part UCI design 1100 illustrated in FIG. 11 is for illustration only. FIG. 11 does not limit the scope of this disclosure to any particular implementation. As shown in FIG. 11, RI, CQI, and I are combined as Part 1 (e.g., UCI part 1) in step 1105. Wideband PMI (i1) and subband PMI (i2) are combined as Part 2 (e.g., UCI part 2) in step 1110. In step 1115, the number of bits (P1) in Part 1 and the number of bits (P2) in Part 2 are added to each other. In step 1120, a total number of bits (P=P1+P2) is compared with a number of bits B. If P is greater than B, the UCI part 1 is only transmitted, otherwise, the UCI part 1 and 2 are transmitted.

In one embodiment of scheme 1B-10, an example of which is illustrated in FIG. 11, for the two-part UCI design where the first part includes information such as RI, CQI, and, optionally, an indicator (I) about the WB amplitudes, if the UE finds that the total CSI payload P (the number of UCI information bits associated with the CSI report) exceeds the number of bits (B) that can be accommodated within the PUSCH resources for UCI transmission (either explicitly or implicitly allocated to the UE) or, optionally, exceeds a certain threshold (either fixed or configured), the UE transmits only the first UCI part and not the second UCI part; otherwise the UE transmits both parts. The indicator (I) is according to at least one of the following alternatives:

In one example of Alt 1B-10a, ($N_{0,1}$, $N_{0,2}$), where $N_{0,1}$ and $N_{0,2}$ respectively indicate the number of reported WB amplitudes that are zero for layer 1 and layer 2 respectively, i.e., $p_{l,i}^{(1)}=0$; if RI=1, $N_{0,2}$ is set to fixed value (e.g. 0 or 2L), since PMI for layer 2 is not reported.

In one example of Alt 1B-10b, ($N_{0,1}$, $N_{0,2}$), where $N_{0,1}$ and $N_{0,2}$ respectively indicate the number of reported WB amplitudes that are non-zero for layer 1 and layer 2 respectively, i.e., $p_{l,i}^{(1)} \neq 0$; if RI=1, $N_{0,2}$ is set to fixed value (e.g. 0 or 2L), since PMI for layer 2 is not reported.

In one example of Alt 1B-10c, $N_0$ to indicate the total (sum) number of reported WB amplitudes that are zero, where the total or sum is across all layers.

In one example of Alt 1B-10d, $N_0$ to indicate the total (sum) number of reported WB amplitudes that are non-zero, where the total or sum is across all layers.

In one example of Alt 1B-10e, $B=B_0 B_1$ or $B_1 B_0$, where each of bitmap $B_0 = b_{0,0} b_{0,1} \ldots b_{0,2L-1}$ and bitmap $B_1 = b_{1,0} b_{1,1} \ldots, b_{1,2L-1}$ is of length 2L. If a bit $b_{i,j}=0$, then the corresponding WB amplitude is zero, and if a bit $b_{i,j}=1$, then the corresponding WB amplitude is non-zero. Alternatively, if a bit $b_{i,j}=0$, then the corresponding WB amplitude is non-zero, and if a bit $b_{i,j}=1$, then the corresponding WB amplitude is zero; if RI=1, $B_1$ is fixed (e.g. 00 ... 0), since PMI for layer 2 is not reported.

In a variation of scheme 1B-10, the first part does not include RI, and comprises CQI and the indicator I. RI is not reported explicitly, but derived using the indicator I.

Figure 12A:
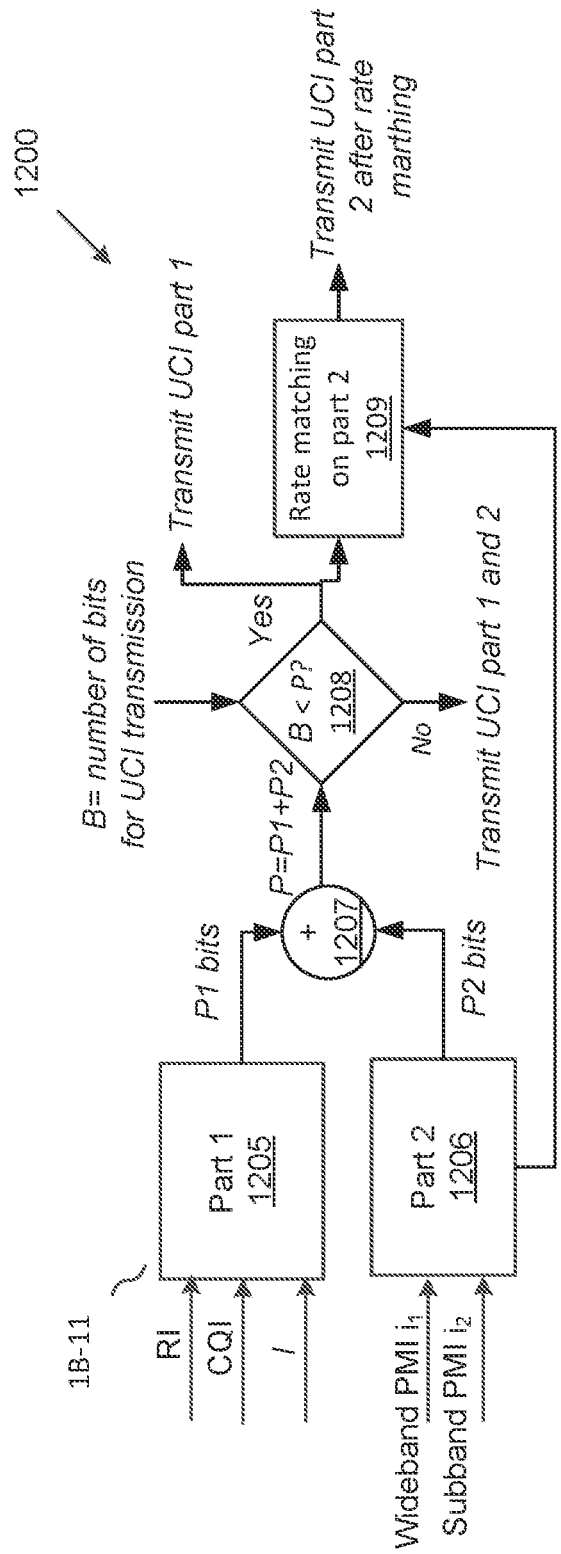
FIG. 12A illustrates another example two-part UCI design according to embodiments of the present disclosure.

FIG. 12A illustrates another example two-part UCI design 1200 according to embodiments of the present disclosure. The embodiment of the two-part UCI design 1200 illustrated in FIG. 12A is for illustration only. FIG. 12A does not limit the scope of this disclosure to any particular implementation. As shown in FIG. 12A, RI, CQI, and I are combined as Part 1 (e.g., UCI part 1) in step 1205. Wideband PMI (i1) and subband PMI (i2) are combined as Part 2 (e.g., UCI part 2) in step 1206. In step 1207, the number of bits (P1) in Part 1 and the number of bits (P2) in Part 2 are added to each other. In step 1208, a total number of bits (P=P1+P2) is compared with a number of bits B. If P is greater than B, the UCI part 1 and a UCI part 2 after rate matching are transmitted, otherwise, the UCI part 1 and 2 are transmitted. In step 1209, a rate matching operation is performed for the UCI part 2 based on information from the UCI part 2 in step 1206.

In one embodiment of scheme 1B-11, an example of which is illustrated in FIG. 8, for two-part UCI design where the first part includes information such as RI, CQI, and, optionally, an indicator (I), if the UE finds that the total CSI payload (the number of UCI information bits associated with the CSI report) exceeds the number of bits that can be accommodated within the PUSCH resources for UCI transmission (either explicitly or implicitly allocated to the UE) or, optionally, exceeds a certain threshold (either fixed or configured), the UE transmits the first UCI part as is.

In addition, the UE performs rate matching to the second UCI part. This can be done, for instance, by increasing the channel coding rate, or partially puncturing or selecting the output of the channel encoder (e.g. Polar encoder), or by adjusting the modulation-coding-scheme (MCS) and/or beta offset factor used by the second UCI part. This rate matching can include no transmission (complete puncturing) as a special case, if the payload associated with the second UCI part is too large compared to a certain threshold. The indicator (I) is according to at least one of the alternatives in the aforementioned Scheme 1B-10.

In a variation of scheme 1B-11, the first part does not include RI, and comprises CQI and the indicator I. RI is not reported explicitly, but derived using the indicator I.

In one embodiment of scheme 1B-12, an A-CSI report is encoded separately into multiple encoded parts in a single-slot and the transmission priority of each encoded part is different.

In one example, the encoded parts that are used to identify the number of information bits in other encoded parts of the report have higher transmission priority.

In one example, the higher priority parts are first included in a transmission in their entirety before the lower priority parts are included.

In one example, the information bits and/or channel coded bits (with or without rate matching as explained in Scheme 1B-11) of a lower priority part is partially transmitted or not transmitted if the payload (the number bits associated with the lower priority part) exceeds the number of bits that can be accommodated (after the payload for the higher priority parts is subtracted out from the maximum that UCI can accommodate) within the PUSCH resources for UCI transmission (either explicitly or implicitly allocated to the UE). If the lower priority part is partially transmitted, then at least one of the following alternatives is used.

In one example of Alt 1B-12a, the CSI components or parameters corresponding to at least one subband (SB) is dropped (not transmitted) for the lower priority parts. The CSI for all SBs can be dropped as a special case. At least one of the following methods is used.

In one instance of Method 0, a decimation ratio (r) is used; starting from SB number 0, the CSI components or parameters corresponding to SB number r, SB number 2r, and so on are reported for the lower priority parts. The decimation factor is either fixed (e.g. 2), or configured (via RRC or MAC CE based or dynamic DCI based signaling).

In one instance of Method 1, a priority pattern is used to order SB CSI for lower priority parts. The pattern is either fixed (e.g. 2), or configured (via RRC or MAC CE based or dynamic DCI based signaling).

In one instance of Method 2, a UE reports the set (indices) of SBs for which the CSI is reported for the lower priority parts, and this reporting is either in the higher priority parts or in the lower priority parts. To report the SB indices, the combinatorial numbering as provided in 2017.08.003.SR0 can be used where the reported SB combination index is given by $$i = \sum_{j=0}^{M-1} \binom{K-1-k_j}{M-j},$$

where K is the total number of SBs for which the UE is configured to report CSI, M is the number of SBs for which lower priority parts are transmitted partially, and $k_0, k_1, \ldots, k_{M-1}$ are the indices of M selected SBs sorted in increasing order of i.

Alternatively, the SB indices are reported using a bitmap $B = b_0, b_1, \ldots, b_{K-1}$, where $b_i = 0$ indicates that the SB i is not selected for partial CSI reporting, and $b_i = 1$ indicates that the SB i is selected for partial CSI reporting, or, $b_i = 1$ indicates that the SB i is not selected for partial CSI reporting, and $b_i = 0$ indicates that the SB i is selected for partial CSI reporting. In this bitmap, $b_0$ corresponds to the least significant bit (LSB) and $b_{K-1}$ corresponds to the most significant bit (MSB). Alternatively, $b_0$ corresponds to the MSB and $b_{K-1}$ corresponds to the LSB.

In one example of Alt 1B-12b, a subset of CSI components or parameters is dropped (not reported) for all SBs for which the UE is configured to report the lower priority parts. The subset is either fixed or configured (via RRC or MAC CE based or dynamic DCI based signaling) or reported by the UE (e.g. in the higher priority parts).

In one example of Alt 1B-12c, a combination of Alt 1B-12a and Alt 1B-12b, wherein a subset of CSI components or parameters is dropped (not reported) for at least one SB for which the UE is configured to report the lower priority parts. The subset or/and the at least one SB is/are either fixed or configured (via RRC or MAC CE based or dynamic DCI based signaling).

In one example of Alt 1B-12d, the CSI reported in the higher priority parts is used to determine the partial transmission of the lower priority parts.

In one instance, if the higher priority part includes CQI, then the indices of the SBs for which the UE is configured to report CSI are sorted in the decreasing (or increasing) order of the CQIs, and the lower priority parts are transmitted only for the best M SBs which correspond to the M largest CQI values that are reported in the higher priority parts. The value M is either fixed (e.g. $M = \lfloor K/2 \rfloor$ or $\lceil K/2 \rceil$ where K is the total number of SBs for which the UE is configured to report CSI) or configured (e.g. via higher layer RRC signaling) or is determined based on the UCI related information such as RA or/and MCS.

When the CQIs, $CQI_x$ and $CQI_y$, of the two SBs, x and y are identical ($CQI_x = CQI_y$), then the SB with index min(x, y) or max(x, y) is prioritized to be included in the set of the best M SBs.

In another instance, if the higher priority part includes $(N_{0,1}, N_{0,2})$, where $N_{0,1}$ and $N_{0,2}$ as defined in Alt 1B-10b, respectively indicate the number of reported WB amplitudes that are non-zero for layer 1 and layer 2 respectively, and gNB configures RA for UCI transmission assuming RI=1, which corresponds to M coefficients (SB phase and if configured SB amplitude) reporting in each SB, but the UE wants to report RI=2, then the UE reports M strongest coefficients from the total coefficients across both layers and drops (does not report) the remaining weak coefficients (where the strongest coefficients are determined based on the reported WB amplitude values for both layers). The number M is divided into two numbers (positive integers), $M_1$ for layer 1 and $M_2$ for layer 2 such that $M_1 + M_2 = M$. If $N_{0,1}$ and $N_{0,2}$ do not include the strongest coefficients (which are 1) for layer 1 and layer 2, and $N_{0,1} + N_{0,2} > M$, then the weak coefficients are dropped as follows: Layer 1: $K_1 = M - N_{0,2}$; report max($M_1, K_1$) strongest coefficients and drop the rest; and Layer 2: $K_2 = M - N_{0,1}$; report max($M_2, K_2$) strongest coefficients and drop the rest If $N_{0,1}$ and $N_{0,2}$ include the strongest coefficients (which are always 1) for layer 1 and layer 2, and $N_{0,1} + N_{0,2} - 2 > M$, then the weak coefficients are dropped as follows: Layer 1: $K_1 = M - N_{0,2} + 1$; report max($M_1, K_1$) strongest coefficients and drop the rest; and Layer 2: $K_2 = M - N_{0,1} + 1$; report max($M_2, K_2$) strongest coefficients and drop the rest.

In an example, $M = 2L - 1$, and either $M_1 = L$ and $M_2 = L - 1$, or, $M_1 = L - 1$ and $M_2 = L$. This example can be extended to other alternatives, e.g. Alt 1B-10a, Alt 1B-10c, Alt 1B-10d, and Alt 1B-10e.

In another example, which is an extension of the previous example, if the higher priority part includes $(N_{0,1}, N_{0,2})$, and gNB configures RA for UCI transmission assuming RI=1, which corresponds to M coefficients (SB phase and if configured SB amplitude) reporting in each SB, but the UE wants to report RI=2, then the UE reports M strongest coefficients from the total coefficients across both layers and drops (does not report) the remaining weak coefficients (where the strongest coefficients are determined based on the reported WB amplitude values across both layers). The information about the M out of all coefficients for both layers is signaled either implicitly based on the reported WB amplitude values for two layers, or explicitly in the higher priority parts.

Figure 12B:
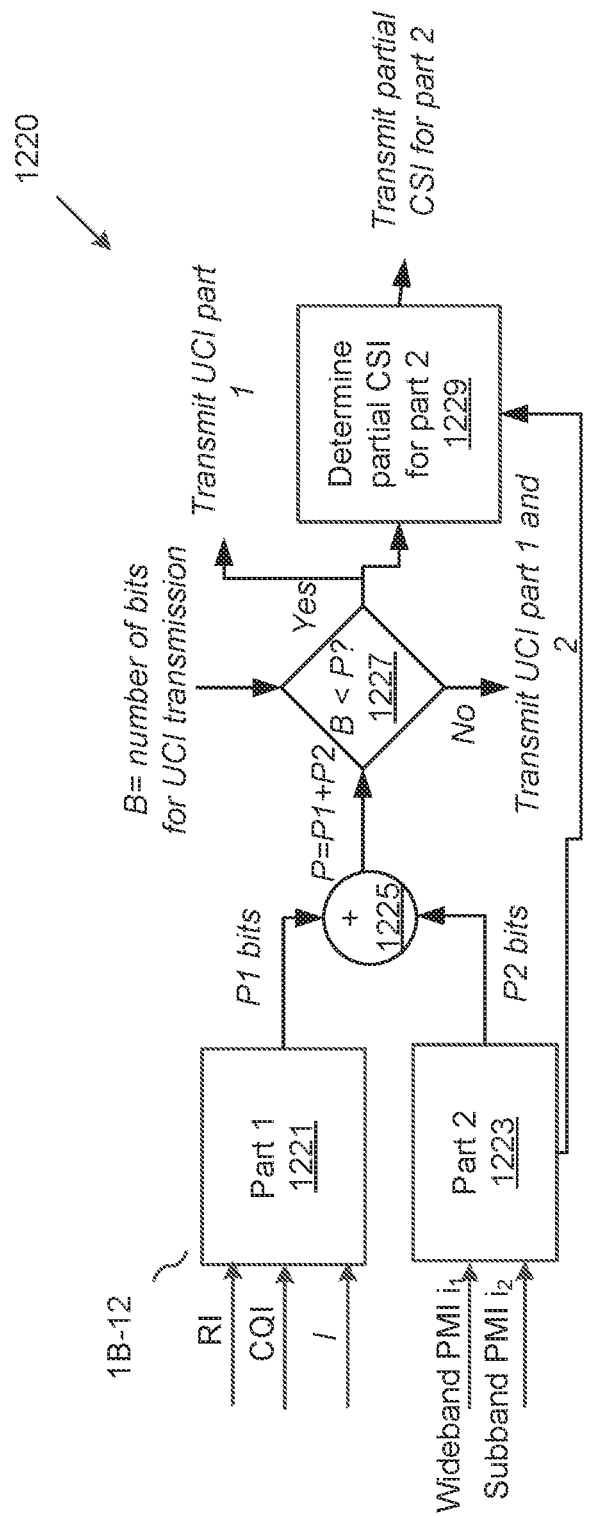
FIG. 12B illustrates yet another example two-part UCI design according to embodiments of the present disclosure.

FIG. 12B illustrates yet another example two-part UCI design 1220 according to embodiments of the present disclosure. The embodiment of the two-part UCI design 1220 illustrated in FIG. 12B is for illustration only. FIG. 12B does not limit the scope of this disclosure to any particular implementation. As shown in FIG. 12B, RI, CQI, and I are combined as Part 1 (e.g., UCI part 1) in step 1221. Wideband PMI (i1) and subband PMI (i2) are combined as Part 2 (e.g., UCI part 2) in step 1223. In step 1225, the number of bits (P1) in Part 1 and the number of bits (P2) in Part 2 are added to each other. In step 1227, a total number of bits (P=P1+P2) is compared with a number of bits B. If P is greater than B, the UCI part 1 and a partial CSI for the UCI Part 2 are transmitted, otherwise, the UCI part 1 and 2 are transmitted. In step 1209, the partial CSI for the UCI part 2 is determined based on information from the UCI part 2 in step 1223.

As an example, as shown in FIG. 12B, the multiple encoded parts correspond to two parts, part 1 and part 2 (or first part or second part) where part 1 corresponds to the higher priority part and part 2 corresponds to the lower priority part. The CSI content of two parts is according to Scheme 1B-10 or 1B-11, including the variation wherein the first part does not include RI, and comprises CQI and the indicator I; RI is not reported explicitly, but derived using the indicator I. The lower priority part (part 2) is transmitted in full (i.e. all CSI components are transmitted for all SBs) when RI=1 is transmitted in the higher priority part (part 1), and can be transmitted partially (according to at least one of Alt 1B-12a, 12b, 12c, or 12d) or not transmitted when RI=2 is transmitted in the higher priority part (part 1).

The CQI reporting in the higher priority part (part 1) is according to at least one of the following alternatives.

In one example of Alt 1B-12X, the CQI transmission is unaffected (independent) by whether the lower priority part (part 2) is transmitted in full or partially or not transmitted.

In one example of Alt 1B-12Y, the CQI transmission depends on the lower priority part (part 2). For example, when the part 2 is transmitted partially (according to at least one of Alt 1B-12a, 12b, 12c, or 12d), the CQI is also transmitted partially depending on the alternative for partial part 2 transmission. In such example, when Alt 1B-12a is used for partial part 2 transmission, the CQI is transmitted only for the SBs for which part 2 CSI is transmitted. In such example, when Alt 1B-12b is used for partial part 2 transmission, the CQI is transmitted for all SBs according to the set of part 2 CSI parameters/components that are transmitted.

The information whether the lower priority parts (e.g. part 2) are reported (A) fully for all SBs or (B) partially for a subset of SBs or (C) dropped (not reported) for all SBs is determined according to at least one of the following alternatives.

In one alternative, the information whether the lower priority parts (e.g. part 2) are reported according to (A), or (B), or (C) is determined based on a predefined condition, and hence does not require any additional configuration/reporting.

In one example, the predefined condition can be based on the UCI related information (e.g. RA or/and MCS) in the DL-related DCI (or UL-relayed DCI). For instance, if RA assumes RI=1, then if the UE wants to report RI=1, then the lower priority parts are reported fully, and if the UE wants to report RI=2, then the lower priority parts are reported partially or dropped.

In another example, if the number of UCI symbols exceeds the number of available symbols given in the RA (or exceeds a particular fraction of the number of available symbols given in the RA), then (B) partial transmission is performed, otherwise (A) full transmission is performed.

In such example, the fraction can be fixed (predefined) or configured (from a set of values) via either higher layer RRC or dynamic DCI based signaling.

In such example, the number of UCI symbols is determined from the MCS (indicated in the UL-related DCI) and beta offset (either indicated in the UL-related DCI or configured via higher-layer signaling). For example, at least when CSI is multiplexed with UL-SCH on PUSCH: lower priority (part 2) information bits are transmitted fully (A) if UCI code rate is below threshold $c_T$; lower priority (part 2) information bits are transmitted partially (e.g. lower priority bits are omitted for a subset of SB s as explained in some embodiments of the present disclosure) until UCI code rate is below $c_T$; and an example of threshold is $$c_T = \frac{c_{MCS}}{\beta_{offset}^{CSI-2}},$$

where $c_{MCS}$ is the code rate for PUSCH given from the MCS field for CSI part 2, and $\beta_{offset}^{CSI-2}$ is the associated beta offset for CSI part 2.

In another example, if the number of UCI symbols exceeds the number of available symbols given in the RA (or exceeds a particular fraction of the number of available symbols given in the RA), then (C) the lower priority parts are dropped, otherwise (A) full transmission is performed.

In another alternative, the information whether the lower priority parts (e.g. part 2) are reported according to (A), or (B), or (C) is indicated/configured via DL-related DCI (or UL-relayed DCI).

In one example, this indication is based on a 1-bit DCI field which indicates (A) full reporting or (B) partial reporting.

In another example, this indication is based on a 1-bit DCI field which indicates (A) full reporting or (C) dropping.

In yet another example, this indication is based on a 1-bit DCI field which indicates (B) partial reporting or (C) dropping In yet another example, this indication is based on a 2-bit DCI field which indicates (A) full reporting or (B) partial reporting or (C) dropping.

In yet another example, this indication is based on a 2-bit DCI field which indicates (A) full reporting or (B1) partial reporting 1 or (B2) partial reporting 2 or (C) dropping, where (B1) partial reporting 1 corresponds to the case in which the lower priority parts are reported partially for a subset S1 of SBs, and where (B2) partial reporting 2 corresponds to the case in which the lower priority parts are reported partially for a subset S2 of SBs, and S1 and S2 differ in at least one SB.

In another alternative, the information whether the lower priority parts (e.g. part 2) are reported according to (A), or (B), or (C) is reported by the UE as a part of the CSI report. For example, the higher priority parts (e.g. part 1) can include a 1 or 2-bit indication, and once gNB decodes the higher priority parts (e.g. part 1), the gNB knows about the information about transmission of the lower priority parts (e.g. part 2).

In one example, this indication in the higher priority parts (e.g. part 1) is 1-bit which indicates (A) full reporting or (B) partial reporting.

In another example, this indication in the higher priority parts (e.g. part 1) is 1-bit which indicates (A) full reporting or (C) dropping.

In yet another example, this indication in the higher priority parts (e.g. part 1) is 1-bit which indicates (B) partial reporting or (C) dropping In yet another example, this indication in the higher priority parts (e.g. part 1) is 2-bit which indicates (A) full reporting or (B) partial reporting or (C) dropping.

In yet another example, this indication in the higher priority parts (e.g. part 1) is 2-bit which indicates (A) full reporting or (B1) partial reporting 1 or (B2) partial reporting 2 or (C) dropping, where (B1) partial reporting 1 corresponds to the case in which the lower priority parts are reported partially for a subset S1 of SB s, and where (B2) partial reporting 2 corresponds to the case in which the lower priority parts are reported partially for a subset S2 of SBs, and S1 and S2 differ in at least one SB.

In one embodiment 1X, scheme 1B-10 of embodiment 1 is extended to general two-part UCI design including the cases of single component carrier (CC) or multiple CCs when carrier aggregation (CA) is configured. In particular, the UCI comprises two parts, a first UCI part for a first CSI part and a second UCI parts for a second CSI parts, where CSI corresponds to one CC or multiple CCs. If the UE finds that the total CSI payload P (the number of UCI information bits associated with the CSI report) exceeds the number of bits (B) that can be accommodated within the PUSCH resources for UCI transmission (either explicitly or implicitly allocated to the UE) or, optionally, exceeds a certain threshold (either fixed or configured), the UE transmits only the first UCI part and not the second UCI part; otherwise the UE transmits both parts.

In one embodiment 1Y, scheme 1B-11 of embodiment 1 is extended to general two-part UCI design including the cases of single component carrier (CC) or multiple CCs when carrier aggregation (CA) is configured. In particular, the UCI comprises two parts, a first UCI part for a first CSI part and a second UCI parts for a second CSI parts, where CSI corresponds to one CC or multiple CCs.

If the UE finds that the total CSI payload (the number of UCI information bits associated with the CSI report) exceeds the number of bits that can be accommodated within the PUSCH resources for UCI transmission (either explicitly or implicitly allocated to the UE) or, optionally, exceeds a certain threshold (either fixed or configured), the UE transmits the first UCI part as is. In addition, the UE performs rate matching to the second UCI part. This can be done, for instance, by increasing the channel coding rate, or partially puncturing or selecting the output of the channel encoder (e.g. Polar encoder), or by adjusting the modulation-coding-scheme (MCS) and/or beta offset factor used by the second UCI part. This rate matching can include no transmission (complete puncturing) as a special case, if the payload associated with the second UCI part is too large compared to a certain threshold.

In one embodiment 1Z, scheme 1B-12 of embodiment 1 is extended to general two-part UCI design including the cases of single component carrier (CC) or multiple CCs when carrier aggregation (CA) is configured. In particular, the UCI comprises two parts, a first UCI part for a first CSI part and a second UCI parts for a second CSI parts, where CSI corresponds to one CC or multiple CCs. If the UE finds that the total CSI payload (the number of UCI information bits associated with the CSI report) exceeds the number of bits that can be accommodated within the PUSCH resources for UCI transmission (either explicitly or implicitly allocated to the UE) or, optionally, exceeds a certain threshold (either fixed or configured), the UE transmits the first UCI part as is.

In addition, the UE either transmits the second UCI part partially (based on at least one of the alternatives in scheme 1B-12) or drops the second UCI part (hence does not report the second UCI part). The information whether the second UCI part is reported (A) fully for all SBs or (B) partially for a subset of SBs or (C) dropped (not reported) for all SBs is determined according to at least one of the alternatives in scheme 1B-12.

Figure 12C:
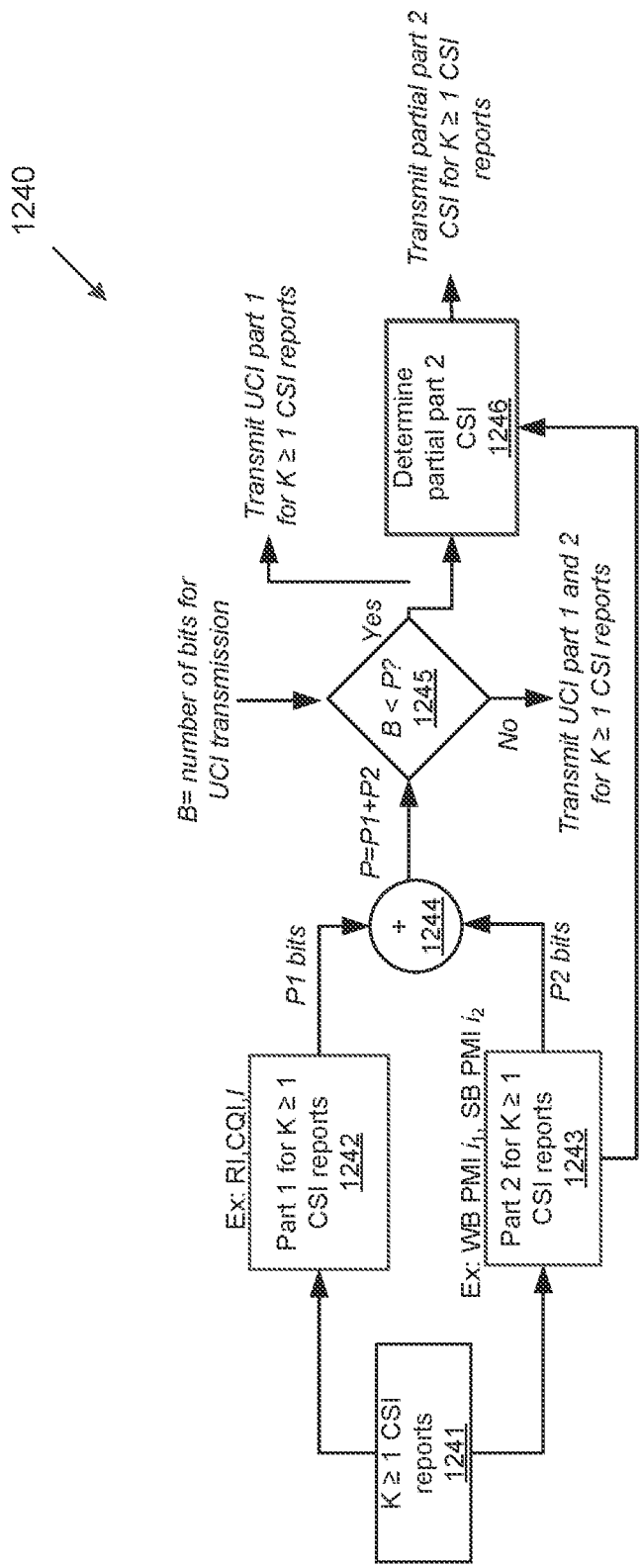
FIG. 12C illustrates yet another example two-part UCI design according to embodiments of the present disclosure.

FIG. 12C illustrates yet another example two-part UCI design 1240 according to embodiments of the present disclosure. The embodiment of the two-part UCI design 1240 illustrated in FIG. 12C is for illustration only. FIG. 12C does not limit the scope of this disclosure to any particular implementation. As shown in FIG. 12C, K≥1 reports in step 1241 is partitioned and transmitted to step 1242 and step 1243. In step 1242, for example RI, CQI, and I are combined, and wideband PMI (i1) and subband PMI (i2) are combined in step 1243. In step 1244, the number of bits (P1) in Part 1 and the number of bits (P2) in Part 2 are added to each other. In step 1245, a total number of bits (P=P1+P2) is compared with a number of bits B. If P is greater than B, the UCI part 1 and a partial CSI for the UCI part 2 are transmitted, otherwise, the UCI part 1 and 2 are transmitted. In step 1246, the partial CSI for the UCI part 2 is determined based on information from the UCI part 2 in step 1223.

The information whether the second UCI part is reported (A) fully for all SBs or (B) partially for a subset of SBs or (C) dropped (not reported) for all SBs is determined according to at least one of the alternatives in scheme 1B-12.

In a variation of embodiment 1Z, as shown in FIG. 12C, the two-part UCI design for K≥1 CSI reports (e.g. CSI reports for K CCs or cells) is as follows. The UCI for CSI report i ∈{0,1, ... , K−1} comprises two parts, a UCI part 1 ($U_{i,1}$) for a CSI part 1 (comprising for example RI, CQI, and indicator I) and a UCI part 2 ($U_{i,2}$) for a CSI part 2 (comprising for example, WB PMI $i_1$ and SB PMI $i_2$).

If the UE finds that the total CSI payload, i.e., the number of UCI information bits associated with the K CSI reports (e.g. CSI reports for K CCs or cells), $P_1+P_2=\Sigma_{i=0}^{K-1}(U_{i,1}+U_{i,2})$, exceeds the number of bits (B) that can be accommodated within the PUSCH resources for UCI transmission (either explicitly or implicitly allocated to the UE, e.g., based on the MCS, beta offsets, and RA) or, optionally, exceeds a certain threshold (either fixed or configured), the UE transmits the UCI part 1 for K CSI reports (e.g. CSI reports for K CCs or cells) as is, which consumes $P_1=\Sigma_{i=0}^{K-1}U_{i,1}$ bits. In addition, the UE transmits the UCI part 2 for K CSI reports (e.g. CSI reports for K CCs or cells) partially.

Figure 13:
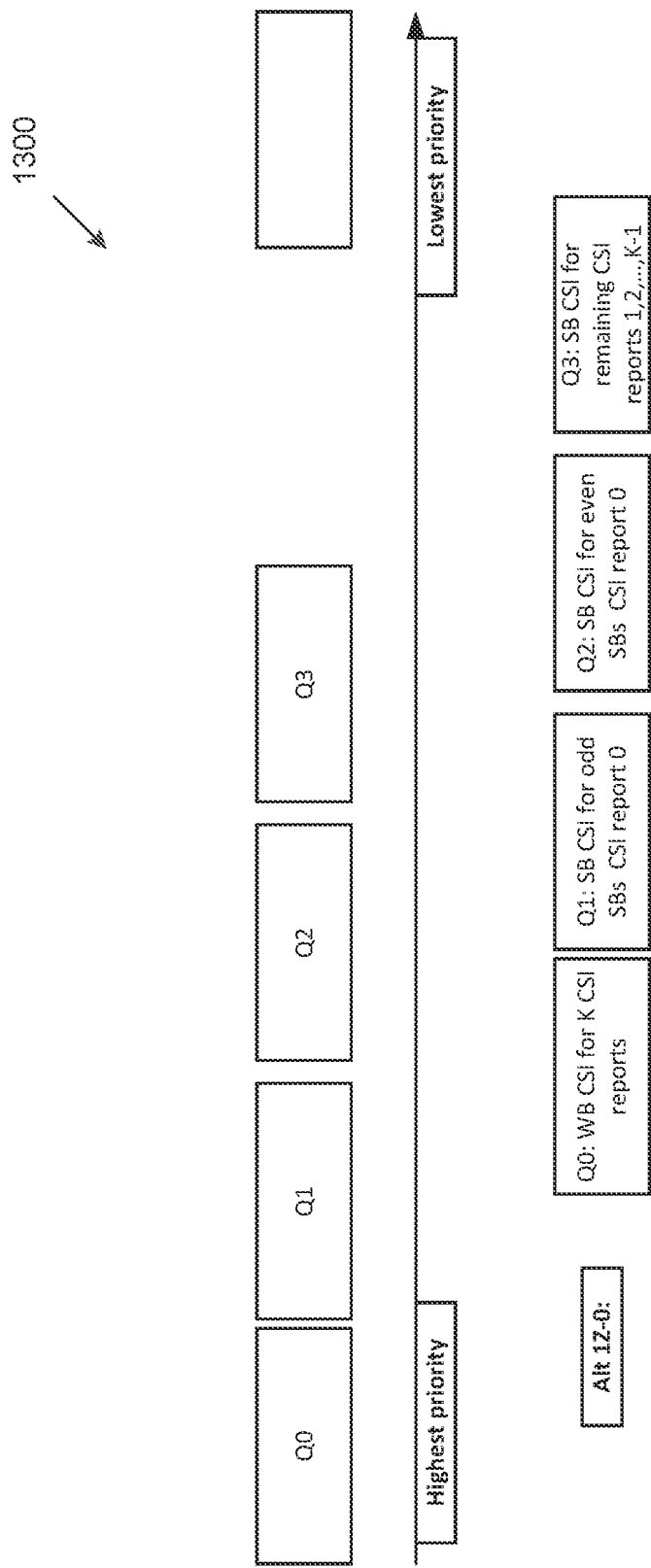
FIG. 13 illustrates an example transmission priority according to embodiments of the present disclosure.

FIG. 13 illustrates an example transmission priority 1300 according to embodiments of the present disclosure. The embodiment of the transmission priority 1300 illustrated in FIG. 13 is for illustration only. FIG. 13 does not limit the scope of this disclosure to any particular implementation.

An example of partial UCI part 2 transmission is shown in FIG. 13 wherein the entire UCI part 2 bits (e.g. information bits or channel coding bits) are partitioned into several parts $Q_0, Q_1, Q_2, \ldots$, and the priority for UCI transmission is according to the index i of the UCI part $Q_i$. For example, as shown, the UCI part $Q_0$ has the highest priority for transmission, and the priority decreases as the index i increases. An example (Alt 1Z-0) is also shown in FIG. 13, which is explained later.

If the UCI part 2 comprises both WB and SB CSI components, then at least one of the following alternatives is used for the partial transmission of the UCI part 2 for K CSI reports. In these alternatives, it is assumed that SBs are indexed as 0, 1, and 2 and so on.

In one embodiment of Alt 1Z-0, the UCI part 2 bits (e.g. CSI bits or information bits or channel coding bits) are partitioned into four parts, $Q_0, Q_1, Q_2, Q_3$, where $Q_0$ corresponds to the most-significant (MSB) bits and $Q_3$ corresponds to the least significant (LSB) bits, or $Q_0$ corresponds to LSB bits and $Q_3$ corresponds to the MSB bits. In one example, $Q_0$ comprises WB CSI for all K CSI reports (e.g. CSI reports for K CCs or cells). In one example, $Q_1$ comprises SB CSI for all odd-numbered SBs (1, 3, ... ) for the first (i=0) CSI report. In one example, $Q_2$ comprises SB CSI for all even-numbered SBs (0, 2, ... ) for the first (i=0) CSI report. In one example, $Q_3$ comprises SB CSI for all SBs for remaining, i=1,2 ... , K−1, CSI reports (e.g. CSI reports for K−1 CCs or cells).

The priority rule or order for the transmission of these parts is according to the increasing order of the index i of these parts, i.e., $Q_0 \to Q_1 \to Q_2 \to Q_3$, where $Q_0$ has the highest priority for UCI transmission, $Q_1$ is next in priority for UCI transmission, followed by $Q_2$, and $Q_3$ has the least priority. In other words, if $P_2 = \Sigma_{i=0}^{3} Q_i$ exceeds B–$P_1$, then, $Q_3$ is dropped (not transmitted) first, and if the remaining UCI bits $P_2 - Q_3 = \Sigma_{i=0}^{2} Q_i$ still exceeds B–$P_1$, then $Q_2$ and $Q_3$ are dropped (not transmitted), and the dropping in this order continues. Note that if B–$P_1$<$Q_0$, then the entire UCI part 2 is not transmitted, otherwise at least $Q_0$ is transmitted.

In a variation of this alternative (Alt 1Z-0), the priority order of odd-numbered SBs and even-numbered SBs is reversed, i.e., In one example, $Q_1$ comprises SB CSI for all even-numbered SBs (0, 2, . . . ) for the first (i=0) CSI report. In one example, $Q_2$ comprises SB CSI for all odd-numbered SBs (1, 3, . . . ) for the first (i=0) CSI report.

In one embodiment of Alt 1Z-1, the UCI part 2 bits (e.g. CSI bits or information bits or channel coding bits) are partitioned into three parts, $Q_0$, $Q_1$, $Q_2$, where $Q_0$ corresponds to the most-significant (MSB) bits and $Q_2$ corresponds to the least significant (LSB) bits, or $Q_0$ corresponds to LSB bits and $Q_2$ corresponds to the MSB bits. In one example, $Q_0$ comprises the following two sub-parts: WB CSI for the first (i=0) CSI report; and SB CSI for all odd-numbered SBs (1, 3, . . . ) for the first (i=0) CSI report. In one example, $Q_1$ comprises SB CSI for all even-numbered SBs (0, 2, . . . ) for the first (i=0) CSI report. In one example, $Q_2$ comprises the following two sub-parts: WB CSI for remaining, i=1,2 . . . , K–1, CSI reports (e.g. CSI reports for K–1 CCs or cells); and SB CSI for all SBs for remaining, i=1,2 . . . , K–1, CSI reports (e.g. CSI reports for K–1 CCs or cells).

The priority rule or order for the transmission of these parts is according to the increasing order of the index i of these parts, i.e., $Q_0 \to Q_1 \to Q_2$, where $Q_0$ has the highest priority for UCI transmission, $Q_1$ is next in priority for UCI transmission, and $Q_2$ has the least priority. In other words, if $P_2 = \Sigma_{i=0}^{2} Q_i$ exceeds B–$P_1$, then, $Q_2$ is dropped (not transmitted) first, and if the remaining UCI bits $P_2 - Q_2 = \Sigma_{i=0}^{1} Q_i$ still exceeds B–$P_1$, then $Q_1$ and $Q_2$ are dropped (not transmitted), and the dropping in this order continues. Note that if B–$P_1$<$Q_0$, then the entire UCI part 2 is not transmitted, otherwise at least $Q_0$ is transmitted.

In a variation of this alternative (Alt 1Z-1), the priority order of odd-numbered SBs and even-numbered SBs for the first CSI report (i=0) is reversed, i.e., in one example, $Q_0$ comprises the following two sub-parts comprises: WB CSI for the first (i=0) CSI report; and SB CSI for all even-numbered SBs (0, 2, . . . ) for the first (i=0) CSI report. In one example, $Q_1$ comprises SB CSI for all odd-numbered SBs (1, 3, . . . ) for the first (i=0) CSI report.

In one embodiment of Alt 1Z-2, the UCI part 2 bits (e.g. CSI bits or information bits or channel coding bits) are partitioned into four parts, $Q_0$, $Q_1$, $Q_2$, $Q_3$, where $Q_0$ corresponds to the most-significant (MSB) bits and $Q_3$ corresponds to the least significant (LSB) bits, or $Q_0$ corresponds to LSB bits and $Q_3$ corresponds to the MSB bits.

In one example, $Q_0$ comprises the following two sub-parts: WB CSI for all K CSI reports (e.g. CSI reports for K CCs or cells); and SB CSI for one SB (e.g. SB index 0) and for all K CSI reports (e.g. CSI reports for K CCs or cells). In one example, $Q_1$ comprises SB CSI for all odd-numbered SBs (1, 3, . . . ) for the first (i=0) CSI report. In one example, $Q_2$ comprises SB CSI for all remaining even-numbered SBs (2, 4, . . . ) for the first (i=0) CSI report. In one example, $Q_3$ comprises SB CSI for remaining SBs (1, 2, . . . ) and for remaining, i=1,2 . . . , K–1, CSI reports (e.g. CSI reports for K–1 CCs or cells).

The priority rule or order for the transmission of these parts is as explained in Alt 1Z-0.

In a variation of this alternative (Alt 1Z-2), the priority order of odd-numbered SBs and even-numbered SBs is reversed, i.e., In one example $Q_1$ comprises SB CSI for all even-numbered SBs (2, 4, . . . ) for the first (i=0) CSI report. In one example, $Q_2$ comprises SB CSI for all odd-numbered SBs (1, 3, . . . ) for the first (i=0) CSI report.

In one embodiment of Alt 1Z-3, the UCI part 2 bits (e.g. CSI bits or information bits or channel coding bits) are partitioned into three parts, $Q_0$, $Q_1$, $Q_2$, where $Q_0$ corresponds to the most-significant (MSB) bits and $Q_2$ corresponds to the least significant (LSB) bits, or $Q_0$ corresponds to LSB bits and $Q_2$ corresponds to the MSB bits.

In one example, $Q_0$ comprises the following two sub-parts: WB CSI for all K CSI reports (e.g. CSI reports for K CCs r cells); and SB CSI for all odd-numbered SBs (1, 3, . . . ) and for all K CSI reports (e.g. CSI reports for K CCs or cells).

In one example, $Q_1$ comprises SB CSI for all even-numbered SBs (0, 2, . . . ) for the first (i=0) CSI report. In one example, $Q_2$ comprises SB CSI for all even-numbered SBs (0, 2, . . . ) for remaining, i=1,2 . . . , K–1, CSI reports (e.g. CSI reports for K–1 CCs or cells).

The priority rule or order for the transmission of these parts is as explained in Alt 1Z-1.

In a variation of this alternative (Alt 1Z-3), the priority order of odd-numbered SBs and even-numbered SBs is reversed, i.e., In one example, $Q_0$ comprises the following two sub-parts: WB CSI for all K CSI reports (e.g. CSI reports for K CCs or cells); and SB CSI for all even-numbered SBs (0, 2, . . . ) and for all K CSI reports (e.g. CSI reports for K CCs or cells). In one example, $Q_1$ comprises SB CSI for all odd-numbered SBs (1, 3, . . . ) for the first (i=0) CSI report. In one example, $Q_2$ comprises SB CSI for all odd-numbered SBs (1, 3, . . . ) for remaining, i=1, 2 . . . , K–1, CSI reports (e.g. CSI reports for K–1 CCs or cells).

In one embodiment of Alt 1Z-4, the UCI part 2 bits (e.g. CSI bits or information bits or channel coding bits) are partitioned into 2K+1 parts, $Q_0, Q_1, Q_2, \ldots, Q_{2K}$, where $Q_0$ corresponds to the most-significant (MSB) bits and $Q_{2K}$ corresponds to the least significant (LSB) bits, or $Q_0$ corresponds to LSB bits and $Q_{2K}$ corresponds to the MSB bits.

In one example, $Q_0$ comprises WB CSI for all K CSI reports (e.g. CSI reports for K CCs or cells). For each CSI report, i=0,1, . . . K–1, $Q_{2i+1}$ comprises SB CSI for all odd-numbered SBs (1, 3, . . . ) for the i-th CSI report: and $Q_{2(i+1)}$ comprises SB CSI for all even-numbered SBs (0, 2, . . . ) for the i-th CSI report.

The priority rule or order for the transmission of these parts is according to the increasing order of the index i of these parts, i.e., $Q_0 \to Q_1 \to \ldots \to Q_{2K}$, where $Q_0$ has the highest priority for UCI transmission, $Q_1$ is next in priority for UCI transmission, . . . , and $Q_{2K}$ has the least priority. In other words, if $P_2 = \Sigma_{i=0}^{2K} Q_i$ exceeds B–$P_1$, then, $Q_{2K}$ is dropped (not transmitted) first, and if the remaining UCI bits $P_2 - Q_{2K} = \Sigma_{i=0}^{2K-1} Q_i$ still exceeds B–P, then $Q_{2K-1}$ and $Q_{2K}$ are dropped (not transmitted), and the dropping in this order continues. Note that if B–$P_1$<$Q_0$, then the entire UCI part 2 is not transmitted, otherwise at least $Q_0$ is transmitted.

In a variation of this alternative (Alt 1Z-4), the priority order of odd-numbered SBs and even-numbered SBs is reversed, i.e. In one example, $Q_{2i+1}$ comprises SB CSI for all even-numbered SBs (0, 2, . . . ) for the i-th CSI report. In one example, $Q_{2(i+1)}$ comprises SB CSI for all odd-numbered SBs (1, 3, ...) for the i-th CSI report.

In one embodiment of Alt 1Z-5, the UCI part 2 bits (e.g. CSI bits or information bits or channel coding bits) are partitioned into 2K parts, $Q_0, Q_1, \ldots, Q_{2K-1}$, where $Q_0$ corresponds to the most-significant (MSB) bits and $Q_{2K-1}$ corresponds to the least significant (LSB) bits, or $Q_0$ corresponds to LSB bits and $Q_{2K-1}$ corresponds to the MSB bits.

For each CSI report, i=0,1, ... K−1: $Q_{2i}$ comprises the following two sub-parts WB CSI for the i-th CSI report and SB CSI for all odd-numbered SBs (1, 3, ...) for the i-th CSI report; and $Q_{2i+1}$ comprises SB CSI for all even-numbered SBs (0, 2, ... or) for the i-th CSI report.

The priority rule or order for the transmission of these parts is according to the increasing order of the index i of these parts, i.e., $Q_0 \rightarrow Q_1 \rightarrow \ldots, \rightarrow Q_{2K-1}$, where $Q_0$ has the highest priority for UCI transmission, $Q_1$ is next in priority for UCI transmission, and $Q_{2K-1}$ has the least priority. In other words, if $P_2 = \Sigma_{i=0}^{2K-1} Q_i$ exceeds $B-P_1$, then, $Q_{2K-1}$ is dropped (not transmitted) first, and if the remaining UCI bits $P_2 - Q_{2K-1} = \Sigma_{i=0}^{2K-2} Q_i$ still exceeds $B-P_1$, then $Q_{2K-2}$ and $Q_{2K-1}$ are dropped (not transmitted), and the dropping in this order continues. Note that if $B-P_1 < Q_0$, then the entire UCI part 2 is not transmitted, otherwise at least $Q_0$ is transmitted.

In a variation of this alternative (Alt 1Z-5), the priority order of odd-numbered SBs and even-numbered SBs for the first CSI report (i=0) is reversed, i.e., For each CSI report, i=0,1, ... K−1: $Q_{2i}$ comprises the following two sub-parts WB CSI for the i-th CSI report and SB CSI for all even-numbered SBs (0, 2, ...) for the i-th CSI report; and $Q_{2i+1}$ comprises SB CSI for all odd-numbered SBs (1, 3, ...) for the i-th CSI report.

In one embodiment of Alt 1Z-6, the UCI part 2 bits (e.g. CSI bits or information bits or channel coding bits) are partitioned 2K+1 parts, $Q_0, Q_1, \ldots, Q_{2K}$, where $Q_0$ corresponds to the most-significant (MSB) bits and $Q_{2K}$ corresponds to the least significant (LSB) bits, or $Q_0$ corresponds to LSB bits and $Q_{2K}$ corresponds to the MSB bits. In one example, $Q_0$ comprises the following two sub-parts: WB CSI for all K CSI reports (e.g. CSI reports for K CCs or cells); and SB CSI for one SB (e.g. SB index 0) and for all K CSI reports (e.g. CSI reports for K CCs or cells).

For each CSI report, i=0,1, ... K−1, $Q_{2i+1}$ comprises SB CSI for all odd-numbered SBs (1, 3, ...) for the i-th CSI report; and $Q_{2(i+1)}$ comprises SB CSI for remaining even-numbered SBs (2,4, ...) for the i-th CSI report.

The priority rule or order for the transmission of these parts is as explained in Alt 1Z-4.

In a variation of this alternative (Alt 1Z-6), the priority order of odd-numbered SBs and even-numbered SBs is reversed, i.e. In one example, $Q_{2i+1}$ comprises SB CSI for remaining even-numbered SBs (2, 4, ...) for the i-th CSI report. In one example, $Q_{2(i+1)}$ comprises SB CSI for all odd-numbered SBs (1, 3, ...) for the i-th CSI report.

In on embodiment of Alt 1Z-7, the UCI part 2 bits (e.g. CSI bits or information bits or channel coding bits) are partitioned into K parts, $Q_0, Q_1, \ldots, Q_{2K-1}$, where $Q_0$ corresponds to the most-significant (MSB) bits and $Q_{K-1}$ corresponds to the least significant (LSB) bits, or $Q_0$ corresponds to LSB bits and $Q_{K-1}$ corresponds to the MSB bits. In one example, $Q_0$ comprises the following two sub-parts: WB CSI for all K CSI reports (e.g. CSI reports for K CCs or cells); and SB CSI for all odd-numbered SBs (1, 3, ...) and for all K CSI reports (e.g. CSI reports for K CCs or cells).

For each CSI report, i=0,1, ... K−1, $Q_{i+1}$ comprises SB CSI for all even-numbered SBs (0, 2, ... or) for the i-th CSI report.

The priority rule or order for the transmission of these parts is as explained in Alt 1Z-1.

In a variation of this alternative (Alt 1Z-7), the priority order of odd-numbered SBs and even-numbered SBs is reversed, i.e., in one example, $Q_0$ comprises the following two sub-parts: WB CSI for all K CSI reports (e.g. CSI reports for K CCs or cells); and SB CSI for all even-numbered SBs and for all K CSI reports (e.g. CSI reports for K CCs or cells).

For each CSI report, i=0,1, ... K−1, $Q_{i+1}$ comprises SB CSI for all odd-numbered SBs for the i-th CSI report.

In one embodiment of Alt 1Z-8, the UCI part 2 bits (e.g. CSI bits or information bits or channel coding bits) are partitioned into two parts, $Q_0, Q_1$, where $Q_0$ corresponds to the most-significant (MSB) bits and $Q_1$ corresponds to the least significant (LSB) bits, or $Q_0$ corresponds to LSB bits and $Q_1$ corresponds to the MSB bits. In one example, $Q_0$ comprises WB CSI for all K CSI reports (e.g. CSI reports for K CCs or cells). In one example, $Q_1$ comprises SB CSI for all SBs and for all K CSI reports.

The priority rule or order for the transmission of these parts is as explained in earlier alternatives. i.e., $Q_0$ has higher priority for UCI transmission compared to $Q_1$. In other words, if $P_2 = \Sigma_{i=0}^{1} Q_i$ exceeds $B-P_1$, then, $Q_1$ is dropped (not transmitted) first, and if the remaining UCI bits $P_2 - Q_1 = Q_0$ still exceeds $B-P_1$, then both $Q_0$ and $Q_1$ are dropped (not transmitted), hence the entire UCI part 2 is not transmitted.

In one embodiment of Alt 1Z-9, the UCI part 2 bits (e.g. CSI bits or information bits or channel coding bits) are partitioned into three parts, $Q_0, Q_1, Q_2$, where $Q_0$ corresponds to the most-significant (MSB) bits and $Q_2$ corresponds to the least significant (LSB) bits, or $Q_0$ corresponds to LSB bits and $Q_2$ corresponds to the MSB bits. In one example, $Q_0$ comprises WB CSI for all K CSI reports (e.g. CSI reports for K CCs or cells). In one example, $Q_1$ comprises SB CSI for a subset of SB indices S and for all K CSI reports where the set S is fixed. In one example, $Q_2$ comprises SB CSI for remaining SBs (all SBs except those in the set S) and for all K CSI reports.

Two examples of the set S are S={0} and S={1}. The priority rule or order for the transmission of these parts is as explained in earlier alternatives.

In one embodiment of Alt 1Z-10, the UCI part 2 bits (e.g. CSI bits or information bits or channel coding bits) are partitioned into M+1 parts, $Q_0, Q_1, \ldots, Q_M$, where M is the number of SBs, $Q_0$ corresponds to the most-significant (MSB) bits and $Q_M$ corresponds to the least significant (LSB) bits, or $Q_0$ corresponds to LSB bits and $Q_M$ corresponds to the MSB bits. In one example, $Q_0$ comprises WB CSI for all K CSI reports (e.g. CSI reports for K CCs or cells).

For each SB index, j=0,1, ... M−1, $Q_{j+1}$ comprises SB CSI for SB index j and for all K CSI reports.

The priority rule or order for the transmission of these parts is as explained in earlier alternatives. Note that in this alternative, it is assumed that the number of SBs for all CSI reports is the same. If it is different for different CSI reports, then M is maximum of the number of SBs for all CSI reports, and for a SB index j ∈{0,1, ..., M−1}, and a CSI report index i ∈{0,1, ..., K−1}, there is no CSI to report, then the corresponding report is skipped (not reported) in that part $Q_{j+1}$.

In one embodiment of Alt 1Z-11, the UCI part 2 bits (e.g. CSI bits or information bits or channel coding bits) are partitioned into M+1 parts, $Q_0, Q_1, \ldots, Q_M$, where M is the number of SBs, $Q_0$ corresponds to the most-significant (MSB) bits and $Q_M$ corresponds to the least significant (LSB) bits, or $Q_0$ corresponds to LSB bits and $Q_M$ corresponds to the MSB bits. In one example, $Q_0$ comprises WB CSI for all K CSI reports (e.g. CSI reports for K CCs or cells).

For each even-numbered SB index, j=0, 2, . . . : $Q_{j/2+1}$ comprises SB CSI for even-numbered SB index j and for all K CSI reports. For each odd-numbered SB index, $$j = 1, 3, \ldots, Q_{\lfloor \frac{M}{2} \rfloor + \frac{j}{2} + 1}$$

comprises SB CSI for odd-numbered SB index j and for all K CSI reports. The rest of details are the same as in Alt 1Z-10.

In one embodiment of Alt 1Z-12, the UCI part 2 bits (e.g. CSI bits or information bits or channel coding bits) are partitioned into M+1 parts, $Q_0, Q_1, \ldots, Q_M$, where M is the number of SBs, $Q_0$ corresponds to the most-significant (MSB) bits and $Q_M$ corresponds to the least significant (LSB) bits, or $Q_0$ corresponds to LSB bits and $Q_M$ corresponds to the MSB bits. In one example, $Q_0$ comprises WB CSI for all K CSI reports (e.g. CSI reports for K CCs or cells).

For each odd-numbered SB index, $$j = 1, 3, \ldots, Q_{\frac{j+1}{2}}$$

comprises SB CSI for odd-numbered SB index j and for all K CSI reports. For each even-numbered SB index, $$j = 0, 2, \ldots, Q_{\lfloor \frac{M}{2} \rfloor + \frac{j}{2} + 1}$$

comprises SB CSI for even-numbered SB index j and for all K CSI reports. The rest of details are the same as in Alt 1Z-10.

In one embodiment of Alt 1Z-13, the UCI part 2 bits (e.g. CSI bits or information bits or channel coding bits) are partitioned into M+1 parts, $Q_0, Q_1, \ldots, Q_M$, where M is the number of SBs, $Q_0$ corresponds to the most-significant (MSB) bits and $Q_M$ corresponds to the least significant (LSB) bits, or $Q_0$ corresponds to LSB bits and $Q_M$ corresponds to the MSB bits. In one example, $Q_0$ comprises WB CSI for all K CSI reports (e.g. CSI reports for K CCs or cells). For index, j=0, 2, . . . , $Q_j$ comprises SB CSI for odd-numbered SB index j+1 and for all K CSI reports; and $Q_{j+1}$ comprises SB CSI for even-numbered SB index j and for all K CSI reports. The rest of details are the same as in Alt 1Z-10.

In Alt 1Z-14, the UCI part 2 bits (e.g. CSI bits or information bits or channel coding bits) are partitioned into M+1 parts, $Q_0, Q_1, \ldots, Q_M$, where M is the number of SBs, $Q_0$ corresponds to the most-significant (MSB) bits and $Q_M$ corresponds to the least significant (LSB) bits, or $Q_0$ corresponds to LSB bits and $Q_M$ corresponds to the MSB bits. In one example, $Q_0$ comprises WB CSI for all K CSI reports (e.g. CSI reports for K CCs or cells). For index, j=0, 2, . . . , $Q_j$ comprises SB CSI for even-numbered SB index j and for all K CSI reports; and $Q_{j+1}$ comprises SB CSI for odd-numbered SB index j+1 and for all K CSI reports. The rest of details are the same as in Alt 1Z-10.

In one embodiment of Alt 1Z-15, the UCI part 2 bits (e.g. CSI bits or information bits or channel coding bits) are partitioned into three parts, $Q_0, Q_1, Q_2$, where $Q_0$ corresponds to the most-significant (MSB) bits and $Q_2$ corresponds to the least significant (LSB) bits, or $Q_0$ corresponds to LSB bits and $Q_2$ corresponds to the MSB bits. In one example, $Q_0$ comprises WB CSI for all K CSI reports (e.g. CSI reports for K CCs or cells). In one example, $Q_1$ comprises SB CSI for all odd-numbered SBs (1, 3, . . . ) for the first (i=0) CSI report. In one example, $Q_2$ comprises the following two sub-parts: SB CSI for all even-numbered SBs (0, 2, . . . ) for the first (i=0) CSI report; and SB CSI for all SBs for remaining, i=1,2 . . . , K−1, CSI reports (e.g. CSI reports for K−1 CCs or cells). The priority rule or order for the transmission of these parts is as explained in Alt 1Z-1.

In a variation of this alternative (Alt 1Z-15), the priority order of odd-numbered SBs and even-numbered SBs for the first (i=0) CSI report is reversed, i.e., $Q_1$ and $Q_2$ are as follows. In one example, $Q_1$ comprises SB CSI for all even-numbered SBs (0, 2, . . . ) for the first (i=0) CSI report. In one example, $Q_2$ comprises the following two sub-parts: SB CSI for all odd-numbered SBs (1, 3, . . . ) for the first (i=0) CSI report; and SB CSI for all SBs for remaining, i=1, 2 . . . , K−1, CSI reports (e.g. CSI reports for K−1 CCs or cells).

In one embodiment of Alt 1Z-16, the UCI part 2 bits (e.g. CSI bits or information bits or channel coding bits) are partitioned into three parts, $Q_0, Q_1, Q_2$, where $Q_0$ corresponds to the most-significant (MSB) bits and $Q_2$ corresponds to the least significant (LSB) bits, or $Q_0$ corresponds to LSB bits and $Q_2$ corresponds to the MSB bits. In one example, $Q_0$ comprises WB CSI for all K CSI reports (e.g. CSI reports for K CCs or cells). In one example, $Q_1$ comprises SB CSI for all SBs of the first (i=0) CSI report. In one example, $Q_2$ comprises SB CSI for all SBs of remaining, i=1,2 . . . , K−1, CSI reports (e.g. CSI reports for K−1 CCs or cells). The priority rule or order for the transmission of these parts is as explained in Alt 1Z-1.

In a variation of this alternative, $Q_2$ is replaced with the following K−1 parts, i.e., UCI part 2 bits (e.g. CSI bits or information bits or channel coding bits) are partitioned into K+1 parts. For index, j=1, . . . , K−1, $Q_{j+1}$ comprises SB CSI for all SBs of the j-th CSI report.

In one embodiment of Alt 1Z-17, the UCI part 2 bits (e.g. CSI bits or information bits or channel coding bits) are partitioned into three parts, $Q_0, Q_1, Q_2$, where $Q_0$ corresponds to the most-significant (MSB) bits and $Q_2$ corresponds to the least significant (LSB) bits, or $Q_0$ corresponds to LSB bits and $Q_2$ corresponds to the MSB bits. In one example, $Q_0$ comprises the following two sub-parts: WB CSI for all K CSI reports (e.g. CSI reports for K CCs or cells); and SB CSI for all odd-numbered SBs (1, 3, . . . ) for the first (i=0) CSI report. In one example, $Q_1$ comprises SB CSI for all even-numbered SBs (0, 2, . . . ) for the first (i=0) CSI report. In one example, $Q_2$ comprises SB CSI for all SBs for remaining, i=1,2 . . . , K−1, CSI reports (e.g. CSI reports for K−1 CCs or cells). The priority rule or order for the transmission of these parts is as explained in Alt 1Z-1.

In a variation of this alternative (Alt 1Z-17), the priority order of odd-numbered SBs and even-numbered SBs for the first (i=0) CSI report is reversed, i.e., $Q_0$ and $Q_1$ are as follows. In one example, $Q_0$ comprises the following two sub-parts: WB CSI for all K CSI reports (e.g. CSI reports for K CCs or cells); and SB CSI for all even-numbered SBs (0, 2, . . . ) for the first (i=0) CSI report. In one example, $Q_1$ comprises SB CSI for all odd-numbered SBs (1, 3, . . . ) for the first (i=0) CSI report.

In another variation of this alternative, $Q_2$ is replaced with the following K−1 parts, i.e., UCI part 2 bits (e.g. CSI bits or information bits or channel coding bits) are partitioned into K+1 parts. For index, j=1, . . . , K−1, $Q_{j+1}$ comprises SB CSI for all SBs of the j-th CSI report.

In one embodiment of Alt 1Z-18, the UCI part 2 bits (e.g. CSI bits or information bits or channel coding bits) are partitioned into two parts, $Q_0$, $Q_1$, where $Q_0$ corresponds to the most-significant (MSB) bits and $Q_1$ corresponds to the least significant (LSB) bits, or $Q_0$ corresponds to LSB bits and $Q_1$ corresponds to the MSB bits. In one example, $Q_0$ comprises the following two sub-parts: WB CSI for all K CSI reports (e.g. CSI reports for K CCs or cells); and SB CSI for all odd-numbered SBs (1, 3, . . . ) for the first (i=0) CSI report. In one example, $Q_1$ comprises the following two sub-parts: SB CSI for all even-numbered SBs (0, 2, . . . ) for the first (i=0) CSI report; and SB CSI for all SBs for remaining, i=1,2 . . . , K−1, CSI reports (e.g. CSI reports for K−1 CCs or cells). The priority rule or order for the transmission of these parts is as explained in Alt 1Z-8.

In a variation of this alternative (Alt 1Z-18), the priority order of odd-numbered SBs and even-numbered SBs for the first (i=0) CSI report is reversed, i.e., $Q_0$ and $Q_1$ are as follows. In one example, $Q_0$ comprises the following two sub-parts: WB CSI for all K CSI reports (e.g. CSI reports for K CCs or cells); and SB CSI for all even-numbered SBs (0, 2, . . . ) for the first (i=0) CSI report. In one example, $Q_1$ comprises the following two sub-parts: SB CSI for all odd-numbered SBs (1, 3, . . . ) for the first (i=0) CSI report; and SB CSI for all SBs for remaining, i=1,2 . . . , K−1, CSI reports (e.g. CSI reports for K−1 CCs or cells).

In one embodiment of Alt 1Z-19, the UCI part 2 bits (e.g. CSI bits or information bits or channel coding bits) are partitioned into two parts, $Q_0$, $Q_1$, where $Q_0$ corresponds to the most-significant (MSB) bits and $Q_1$ corresponds to the least significant (LSB) bits, or $Q_0$ corresponds to LSB bits and $Q_1$ corresponds to the MSB bits. In one example, $Q_0$ comprises the following two sub-parts: WB CSI for all K CSI reports (e.g. CSI reports for K CCs or cells); and SB CSI for all SBs of the first (i=0) CSI report. In one example, $Q_1$ comprises SB CSI for all SBs for remaining, i=1,2 . . . , K−1, CSI reports (e.g. CSI reports for K−1 CCs or cells). The priority rule or order for the transmission of these parts is as explained in Alt 1Z-8.

In a variation of this alternative, $Q_1$ is replaced with the following K−1 parts, i.e., UCI part 2 bits (e.g. CSI bits or information bits or channel coding bits) are partitioned into K parts. For index, j=1, . . . , K−1, $Q_j$ comprises SB CSI for all SBs of the j-th CSI report.

In one embodiment of Alt 1Z-20, the UCI part 2 bits (e.g. CSI bits or information bits or channel coding bits) are partitioned into two parts, $Q_0$, $Q_1$, where $Q_0$ corresponds to the most-significant (MSB) bits and $Q_1$ corresponds to the least significant (LSB) bits, or $Q_0$ corresponds to LSB bits and $Q_1$ corresponds to the MSB bits. In one example, $Q_0$ corresponds to the CSI of the first (i=0) CSI report, and comprises the following two sub-parts: WB CSI of the first (i=0) CSI report; and SB CSI for all SBs of the first (i=0) CSI report.

In one example, $Q_1$ corresponds to the CSI of the remaining, i=1,2 . . . , K−1, CSI reports (e.g. CSI reports for K−1 CCs or cells), and comprises the following two sub-parts: WB CSI of the remaining CSI reports; and SB CSI for all SBs of the remaining CSI reports. The priority rule or order for the transmission of these parts is as explained in Alt 1Z-8.

In a variation of this alternative, $Q_1$ is replaced with the following K−1 parts, i.e., UCI part 2 bits (e.g. CSI bits or information bits or channel coding bits) are partitioned into K parts. For index, j=1, . . . , K−1, $Q_{j+1}$ corresponds to the CSI for the j-th CSI report, and comprises the following two sub-parts: WB CSI of the j-th CSI report; and SB CSI for all SBs of the j-th CSI report.

In one embodiment of Alt 1Z-21, the UCI part 2 bits (e.g. CSI bits or information bits or channel coding bits) are partitioned into two parts, $Q_0$, $Q_1$, where $Q_0$ corresponds to the most-significant (MSB) bits and $Q_1$ corresponds to the least significant (LSB) bits, or $Q_0$ corresponds to LSB bits and $Q_1$ corresponds to the MSB bits.

In one example, $Q_0$ comprises the following two sub-parts: WB CSI of the first (i=0) CSI report; and SB CSI for all odd-numbered SBs (1, 3, . . . ) for the first (i=0) CSI report. In one example, $Q_1$ comprises the following three sub-parts: SB CSI for all even-numbered SBs (0, 2, . . . ) for the first (i=0) CSI report; WB CSI of the remaining (i=1, 2, . . . , K−1) CSI reports; and SB CSI for all SBs for remaining, i=1, 2 . . . , K−1, CSI reports (e.g. CSI reports for K−1 CCs or cells). The priority rule or order for the transmission of these parts is as explained in Alt 1Z-8.

In a variation of this alternative (Alt 1Z-21), the priority order of odd-numbered SBs and even-numbered SBs for the first (i=0) CSI report is reversed, i.e., $Q_0$ and $Q_1$ are as follows. In one example, $Q_0$ comprises WB CSI of the first (i=0) CSI report; and SB CSI for all even-numbered SBs (0, 2, . . . ) for the first (i=0) CSI report. In one example, $Q_1$ comprises SB CSI for all odd-numbered SBs (1, 3, . . . ) for the first (i=0) CSI report; WB CSI of the remaining (i=1, 2, . . . , K−1) CSI reports; and SB CSI for all SBs for remaining, i=1, 2 . . . , K−1, CSI reports (e.g. CSI reports for K−1 CCs or cells).

If the CSI part 2 comprises only SB components, then a variation of at least one of the alternatives (Alt 1Z-0 through Alt 1Z-21) is used for the partial transmission of the UCI part 2 for K CSI reports wherein the part(s) $Q_1$ of UCI part 2 that include(s) WB CSI is (are) either removed entirely (if the part comprises only WB CSI) or modified to includes only SB CSI (if the part comprises both WB and SB CSI).

In the aforementioned embodiments, Alt 1Z-0 through Alt 1Z-21, the K CSI reports (e.g. CSI reports for K CCs or cells) are sorted (numbered) according to at least one of the following alternatives.

In one embodiment of Alt 1Z-A, the K CSI reports are sorted (numbered) based on a pre-defined rule. For example, if the CSI reports correspond to K CCs or cells, then the CSI reports are numbered (sorted) in increasing order of CC or cell number, or, the CSI reports are numbered (sorted) in decreasing order of CC or cell number.

In one embodiment of Alt 1Z-B, the sorting (numbering) information is configured and/or indicated by the network or gNB. For example, the network or gNB can configure/indicate the network or gNB's preference/priority to receive multiple CSI reports if the UCI part 2 is transmitted partially. This configuration/indication is either via higher layer (e.g. RRC) signaling or MAC CE based signaling or dynamic DCI (UL-related or DL-related) based signaling.

In one embodiment of Alt 1Z-C, the UE reports the numbering (sorting) information, for example in UCI part 1.

Some alternatives for PMI part I and PMI part II included in codeword segment 1 and codeword segment 2, respectively, in Scheme 1/Scheme 1A/Scheme 1B above can be described as follows.

In a first sub-embodiment of Scheme 1, PMI part I comprises the PMI reporting parameters associated with the first layer whereas PMI part II comprises PMI reporting parameters associated with the second to the last layer (with RI=L, this layer corresponds to the $L^{th}$). This embodiment is relevant especially for Type II CSI when PMI can be defined per layer.

In a second sub-embodiment of Scheme 1, PMI part I comprises the PMI reporting parameters associated with the first or first stage (wideband) PMI parameter $i_1$, or $(i_{11}, i_{12})$ which is common for all the layers, whereas PMI part II comprises PMI reporting parameters associated with the second or second stage PMI parameter $i_2$ (which is RI-dependent). This embodiment is relevant for both Type I and Type II CSI when PMI payload depends on the value of RI. In one example use case of this sub-embodiment where PMI frequency granularity is per subband, RI and the first or first stage (wideband) PMI parameter $i_1$, or $(i_{11}, i_{12})$—one $i_1$ report per CSI reporting band regardless of PMI frequency granularity. The second or second stage PMI parameter $i_2$ (which is RI-dependent) can be reported per subband.

In a third sub-embodiment of Scheme 1, PMI part I comprises the PMI reporting parameters associated with the first or first stage (wideband) PMI parameter $i_1$, or $(i_{11}, i_{12})$ which is common for all the layers, as well as the second or second stage PMI parameter $i_2$ associated with the first layer. PMI part II comprises PMI reporting parameters associated with the second or second stage PMI parameter $i_2$ associated with the second to the last layer (with RI=L, this layer corresponds to the $L^{th}$). This embodiment is relevant especially for Type II CSI when PMI can be defined per layer.

In a fourth sub-embodiment of Scheme 1, when a UE is configured with CRI reporting (with or without CSI-RSRP), CRI or CRI+CSI-RSRP can be included in codeword segment 1, that is, jointly encoded with RI and at least one other CSI parameter whose payload size is independent of RI value.

In a fifth sub-embodiment of Scheme 1 which is applicable for Type II CSI reporting with rank 1-2, WB beam amplitude/power coefficients (WB amp 1 for layer 1) can be reported separately in addition to the first PMI (PMI part I) $i_1$ which indicates L beams (where L=2, 3, or 4). The PMI part I comprises RI, CQI, PMI part I and WB amp 1 (for layer 1), and the PMI part II comprises PMI part II, WB amp 2 (for layer 2 if RI=2), SB amp 1 (for layer 1), and SB amp 2 (for layer 2 if RI=2).

In a sixth sub-embodiment of Scheme 1 which is applicable for Type II CSI reporting with rank 1-2, WB beam amplitude/power coefficients (WB amp 1 for layer 1 and layer 2, if RI=2) can be reported separately in addition to the first PMI (PMI part I) $i_1$. The PMI part I comprises RI, CQI, PMI part I, WB amp 1 (for layer 1) and WB amp 2 (for layer 2 if RI=2), and the PMI part II comprises PMI part II, SB amp 1 (for layer 1), and SB amp 2 (for layer 2 if RI=2).

Component 2—Aperiodic CSI (A-CSI) Reporting in Three Parts

In one embodiment of the present disclosure (Scheme 2), the CSI parameters included in PMI are partitioned into three parts: PMI part I, PMI part II, PMI part III. When a UE is configured with RI reporting, RI, CQI, and PMI part I are jointly encoded to form a codeword segment 1. PMI part II is jointly encoded to form another codeword segment 2. PMI part III is jointly encoded to form another codeword segment 3.

For aperiodic CSI (A-CSI) reporting, gNB allocates resource (UL RBs) for UCI transmission (e.g. on PUSCH) without knowing what the UE reports for RI. For Type II, the payload difference between RI=1 and RI=2 is large, i.e., the payload for RI=2 is approximately 2 times of that for RI=1. The resource allocation is according to at least one of the following schemes.

In one embodiment of scheme 2A, the PMI part I corresponds to L (where L=2, 3, or 4) beams which are common for both RI=1 and RI=2, PMI part II corresponds to WB amp 1 for layer 1 and WB amp 2 for layer 2 (if RI=2 is reported), and PMI part III corresponds to SB amp 1 and SB phase 1 for layer 1 and SB amp 2 and SB phase 2 for layer 2 (if RI=2 is reported). The resource allocation for the codeword segment 1 (which includes PMI part I), codeword segment 2 (which includes PMI part II), codeword segment 3 (which includes PMI part III) are in three different slots (or subframes).

When A-CSI reporting is triggered, PUSCH resource is allocated according to the fixed payload size of codeword segment 1. Depending on the RI value (included in codeword segment 1) reported in the first CSI reporting instance, gNB determines RA to trigger another (second) A-CSI reporting for codeword segment 2. Depending on the RI value (included in codeword segment 1) reported in the first CSI reporting instance and WB amplitude (included in PMI part II), gNB determines RA to trigger another (third) A-CSI reporting for codeword segment 3.

In a variation of this scheme (2A-1), the resource allocation for the codeword segment 2 or/and 3 (regardless of the reported RI and WB amp 1 and WB amp 2) is fixed. So, there is no need for additional signaling for the resource location for codeword segment 2 and 3. For example, the resource allocation (UL RBs) can be fixed and correspond to maximum payload for each PMI part assuming RI=2.

In another variation of this scheme (2A-2), the resource allocation for the codeword segment 2 or/and 3 is configured (via DCI triggering or signaling). For example, the resource allocation (UL RBs) can be determined based on the beta offset (in LTE) with respect to the resource allocation for codeword segment 1.

In another variation of scheme 2A/2A-1/2A-2, the WB amp 1 is included in PMI part I. Note that in this case, PMI part II comprises WB amp 2 if RI=2, and PMI part II is not reported if RI=1.

In another variation of scheme 2A/2A-1/2A-2, PMI part I is included on PMI part II. Note that in this case, PMI part I comprises RI and CQI, and PMI part II comprises L beams, WB amp 1 and WB amp 2.

In this scheme and also in the rest of embodiments in the present disclosure, WB amp 1 and WB amp 2 respectively include the explicit indication of the strongest (out of 2L coefficients) coefficient for layer 1 and layer 2.

In scheme 2B, the PMI part I, PMI part II, and PMI part III are configured to be reported in a single slot or subframe according to at least one of the following variations of scheme 2B.

In one embodiment of Scheme 2B-0, the resource allocation (RA) scheme or signaling for UL-related DCI is used for the purpose of UCI transmission assuming a fixed value of RI if Type II CSI reporting is configured regardless of the reported value of RI. For example, the fixed value of RI for RA is RI=2.

In one embodiment of Scheme 2B-1, the resource allocation (RA) scheme or signaling for UL-related DCI is used for the purpose of UCI transmission. A UE (and later gNB upon receiving the A-CSI report) interprets the RA field differently depending on the value of RI and regardless of the reported value of WB amp 1 and WB amp 2. The UE assumes a default RA=X PRBs which corresponds to a fixed RI value. For example, when X PRBs correspond to RI=1, then the UE assumes that the number of PRBs=K*X when RI=2, where K is a constant.

In one example of Alt2.1, K is configurable either semi-statically (via RRC, higher layer signaling), or more dynamically (via MAC CE based or DCI signaling).

In one example of Alt2.2, K is pre-defined in the specification, e.g. K=1.5, or 2.

In one example of Alt2.3, K is determined implicitly depending on, e.g. frequency granularity ("wideband, or partial band, or subband" or "one report for all subbands or one report per subband") of CQI and/or PMI. TABLE 4 shows an example.

TABLE 4

K values

| Frequency granularity for PMI | K |
|---|---|
| Wideband | 1 |
| Partial band | 2 |
| Subband | 2 |

In one embodiment of Scheme 2B-2, the resource allocation (RA) scheme or signaling for UL-related DCI is used for the purpose of UCI transmission. UE (and later gNB upon receiving the A-CSI report) interprets the RA field differently depending on the value of RI and the reported value of WB amp 1 and WB amp 2. The UE assumes a default RA=X PRBs which corresponds to a fixed RI value and a fixed number of WB amp 1 and WB amp that are greater than 0. For example, when X PRBs correspond to RI=1 and 2L−1 WB amp 1 (assuming all of X PRBs are greater than 0), then the UE assumes that the number of PRBs=K*M*X when RI=2, where K and M are constant.

In one example of Alt2.4, K and M are configurable either semi-statically (via RRC, higher layer signaling), or more dynamically (via MAC CE based or DCI signaling).

In one example of Alt2.5 K and L are pre-defined in the specification, e.g. K=1.5, or 2, and M=1 or 2.

In one example of Alt2.6 K and L are determined implicitly depending on, e.g. frequency granularity ("wideband, or partial band, or subband" or "one report for all subbands or one report per subband") of CQI and/or PMI. TABLE 5 shows an example.

TABLE 5

K values

| Frequency granularity for PMI | K | L |
|---|---|---|
| Wideband | 1 | 1 |
| Partial band | 2 | 2 |
| Subband | 2 | 2 |

In one embodiment of Scheme 2B-3, in addition to the normal bit allocation for UCI transmission, additional bit(s) is (are) added in UL-related DCI to signal RA for both RI=1 and RI=2, or/and for both WB amp 1 and 2=0 and greater than 0 if Type II CSI reporting is configured. These additional bit(s) can be a part of at least one of or a combination of RA field or CSI request field, or other fields in the UL-related DCI. With these additional bits, the UL-related DCI signaling is expanded to indicate multiple hypotheses for two different RI values and multiple payload alternatives depending on number of WB amp 1 and 2=0 or greater than 0.

In one embodiment of Scheme 2B-4, the gNB triggers A-CSI for a certain value of RI or/and a certain number of WB amp 1 or/and 2 greater than 0, and specifies the value of RI or/and the value of number of WB amp 1 or/and 2 greater than 0 in the UL-related DCI. The RA is according to the configured value of RI and number of WB amp 1 or/and 2 greater than 0. Note that in this case even when the UE can support RI=2, the gNB may request only RI=1 CSI. RI reporting can be according to one of the following two options.

In one example of Alt1.4, a UE does not report RI and reports the CSI corresponding to the configured value of RI.

In one example of Alt1.5, a UE reports RI, which can be different from the RI configured by the gNB. For example, if the configured value of RI=2, UE can report RI=1 or RI=2.

In one embodiment of Scheme 2B-5, the scheme is the same as the aforementioned Scheme 1B-3. In one embodiment of Scheme 2B-6, the scheme is the same as the aforementioned Scheme 1B-4. In one embodiment, of Scheme 2B-7, the scheme is the same as Scheme 1B-5. In one embodiment of Scheme 2B-8, the scheme is the same as the aforementioned Scheme 1B-6. In one embodiment of Scheme 2B-9, the scheme is the same as the aforementioned Scheme 1B-7. In one embodiment of Scheme 2B-10, the scheme is the same as the aforementioned Scheme 1B-8. In one embodiment of Scheme 2B-11, the scheme is the same as the aforementioned Scheme 1B-9 wherein RM is performed on the second part and/or the third part if the UCI payload is smaller or exceeds that accommodated by the indicated RA/MCS.

Figure 14:
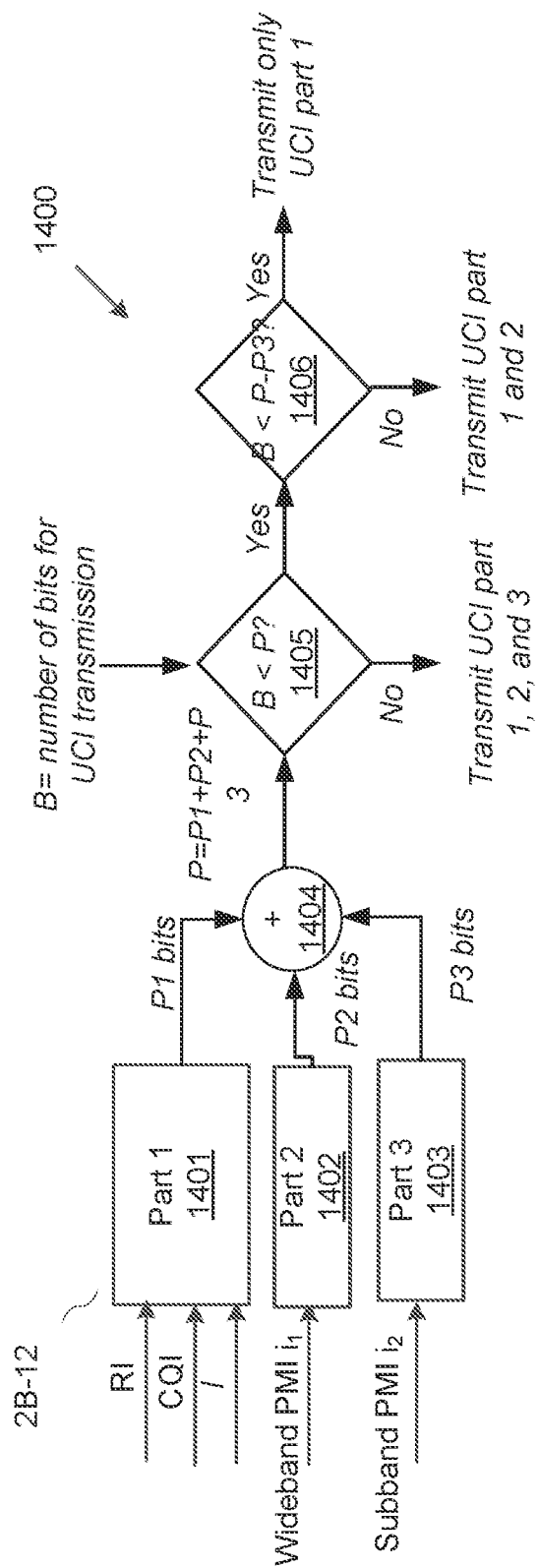
FIG. 14 illustrates an example three-part UCI design according to embodiments of the present disclosure.

FIG. 14 illustrates an example three-part UCI design 1400 according to embodiments of the present disclosure. The embodiment of the three-part UCI design 1400 illustrated in FIG. 14 is for illustration only. FIG. 14 does not limit the scope of this disclosure to any particular implementation. As shown in FIG. 14, RI, CQI, and I are combined as Part 1 (e.g., UCI part 1) in step 1401. Wideband PMI is transmitted as Part 2 (e.g., UCI part 2) in step 1402. Subband PMI is transmitted as Part 3 (e.g., UCI part 2) in step 1403. In step 1404, the number of bits (P1) in Part 1, the number of bits (P2) in Part 2, and the number of bits (P3) in Part 3 are added to each other. In step 1405, a total number of bits (P=P1+P2+P3) is compared with a number of bits B. If P is greater than B, P1+P2 is compared with B in step 1406. If P1+P2 is greater than B in step 1406, the UCI part 1 is only transmitted, otherwise, the UCI part 1 and part 2 are transmitted. In step 1405, if B is less than or equal to P, the UCI part 1, 2, and 3 are transmitted.

In one embodiment of scheme 2B-12, an example of which is illustrated in FIG. 14, for the three-part UCI design where the first part includes information such as RI, CQI, and, optionally, an indicator (I) about the WB amplitudes, if the UE finds that the total CSI payload (the number of UCI information bits associated with the CSI report) exceeds the number of bits that can be accommodated within the PUSCH resources for UCI transmission (either explicitly or implicitly allocated to the UE) or, optionally, exceeds a certain threshold (either fixed or configured), the UE does not transmit the third UCI part, otherwise the UE transmits all three parts. If the total CSI payload after the removal of the third part still exceeds the number of bits that can be accommodated within the PUSCH resources for UCI transmission (either explicitly or implicitly allocated to the UE), the UE transmits only the first part (and not the second and third parts), otherwise the UE transmits UCI part 1 and 2. The indicator (I) is according to at least one of the alternatives in Scheme 1B-10.

In a variation of scheme 2B-12, the first part does not include RI, and comprises CQI and the indicator I. RI is not reported explicitly, but derived using the indicator I.

Figure 15:
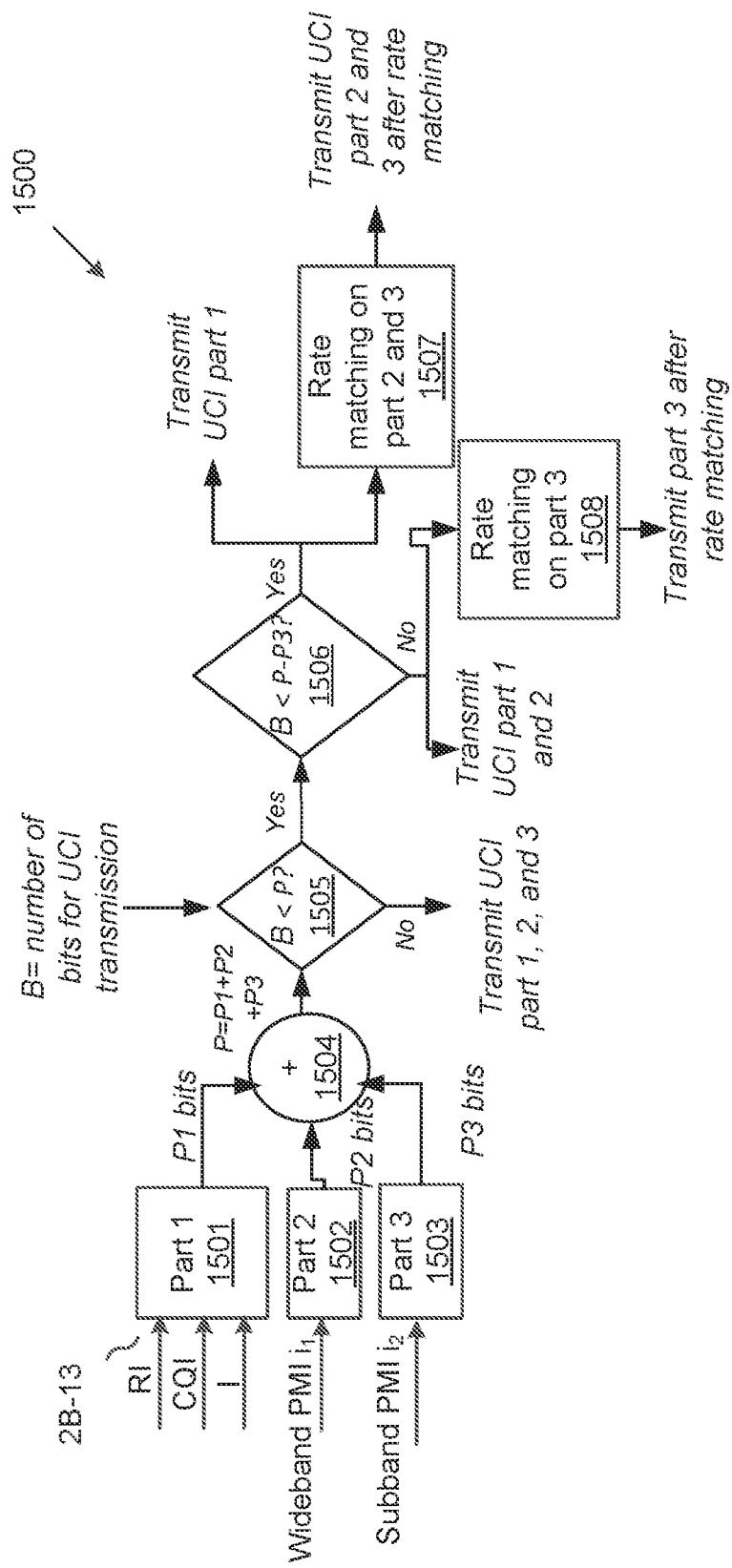
FIG. 15 illustrates another example three-part UCI design according to embodiments of the present disclosure.

FIG. 15 illustrates another example three-part UCI design 1500 according to embodiments of the present disclosure. The embodiment of the three-part UCI design 1500 illustrated in FIG. 15 is for illustration only. FIG. 15 does not limit the scope of this disclosure to any particular implementation. As shown in FIG. 15, RI, CQI, and I are combined as Part 1 (e.g., UCI part 1) in step 1501. Wideband PMI is transmitted as Part 2 (e.g., UCI part 2) in step 1502. Subband PMI is transmitted as Part 3 (e.g., UCI part 2) in step 1503. In step 1504, the number of bits (P1) in Part 1, the number of bits (P2) in Part 2, and the number of bits (P3) in Part 3 are added to each other. In step 1505, a total number of bits (P=P1+P2+P3) is compared with a number of bits B. If P is greater than B, P1+P2 is compared with B in step 1506. If P1+P2 is greater than B in step 1506, the UCI Part 1 is transmitted, and UCI Part 2 and 3 are rate-matched and then transmitted in step 1507. In step 1506, B is less than or equal to P1+P2, the UCI Part 1 and Part 2 are transmitted, and UCI Part 3 is rate-matched and then transmitted. In step 1505, B is less than or equal to P, the UCI part 1, 2, and 3 are transmitted.

In one embodiment of scheme 2B-13, an example of which is illustrated in FIG. 15, for three-part UCI design where the first part includes information such as RI, CQI, and, optionally, an indicator (I), if the UE finds that the total CSI payload (the number of UCI information bits associated with the CSI report) exceeds the number of bits (e.g. X) that can be accommodated within the PUSCH resources for UCI transmission (either explicitly or implicitly allocated to the UE) or, optionally, exceeds a certain threshold (either fixed or configured), but the CSI payload for part 1 and part 2 does not exceed B, then the UE transmits UCI part 1 and UCI part 2 as is.

In addition, the UE performs rate matching to the third UCI part. This can be done, for instance, by increasing the channel coding rate, or partially puncturing or selecting the output of the channel encoder (e.g. Polar encoder), or by adjusting the modulation-coding-scheme (MCS) and/or beta offset factor used by the second UCI part. This rate matching can include no transmission (complete puncturing) as a special case, if the payload associated with the third UCI part is too large compared to a certain threshold.

If the CSI payload for part 1 and part 2 exceeds B, then the UE transmits the UCI part 1 as is. In addition, the UE performs rate matching to the second and the third UCI parts. This can be done, for instance, by increasing the channel coding rate, or partially puncturing or selecting the output of the channel encoder (e.g. Polar encoder), or by adjusting the modulation-coding-scheme (MCS) and/or beta offset factor used by the second UCI part. This rate matching can include no transmission (complete puncturing) as a special case, if the payload associated with the second or/and third UCI parts is too large compared to a certain threshold. The indicator (I) is according to at least one of the alternatives in Scheme 1B-10.

In a variation of scheme 2B-13, the first part does not include RI, and comprises CQI and the indicator I. RI is not reported explicitly, but derived using the indicator I.

In one embodiment of scheme 2B-14, as an example of scheme 1B-12, the multiple encoded parts correspond to three parts, part 1, part 2, and part 3 (or first part or second part or third part) where part 1 corresponds to the highest priority part, part 2 corresponds to the medium priority part, and part 3 corresponds to the lowest priority part. The CSI content of three parts is according to Scheme 2B-12 or 2B-13, including the variation wherein the first part does not include RI, and comprises CQI and the indicator I; RI is not reported explicitly, but derived using the indicator I.

The lower priority part(s) (part 2 or/and part 3) is/are transmitted in full (i.e. all CSI components are transmitted for all SBs) when RI=1 is transmitted in the highest priority part (part 1), and can be transmitted partially (according to at least one of Alt 1B-12a, 12b, 12c, or 12d) or not transmitted when RI=2 is transmitted in the higher priority part (part 1). The CQI transmission in part 1 is according to at least one alternative in Scheme 1B-12. The information whether the lower priority part(s) (part 2 or/and part 3) is/are transmitted (A) fully for all SBs or (B) partially for a subset of SBs or (C) dropped (not reported) for all SBs is determined according to at least one of the alternatives in scheme 1B-12.

In one embodiment of 2X, scheme 2B-12 of embodiment 2 is extended to general three-part UCI design including the cases of single component carrier (CC) or multiple CCs when carrier aggregation (CA) is configured. In particular, the UCI comprises three parts, a first UCI part for a first CSI part, a second UCI part for a second CSI part, and a third UCI part for a third CSI part, where CSI corresponds to one CC or multiple CCs. If the UE finds that the total CSI payload (the number of UCI information bits associated with the CSI report) exceeds the number of bits that can be accommodated within the PUSCH resources for UCI transmission (either explicitly or implicitly allocated to the UE) or, optionally, exceeds a certain threshold (either fixed or configured), the UE does not transmit the third UCI part, otherwise the UE transmits all three parts.

If the total CSI payload after the removal of the third part still exceeds the number of bits that can be accommodated within the PUSCH resources for UCI transmission (either explicitly or implicitly allocated to the UE), the UE transmits only the first part (and not the second and third parts), otherwise the UE transmits UCI part 1 and 2.

In one embodiment of 2Y, scheme 2B-13 of embodiment 2 is extended to general three-part UCI design including the cases of single component carrier (CC) or multiple CCs when carrier aggregation (CA) is configured. In particular, the UCI comprises three parts, a first UCI part for a first CSI part, a second UCI part for a second CSI part, and a third UCI part for a third CSI part, where CSI corresponds to one CC or multiple CCs. If the UE finds that the total CSI payload (the number of UCI information bits associated with the CSI report) exceeds the number of bits (e.g. X) that can be accommodated within the PUSCH resources for UCI transmission (either explicitly or implicitly allocated to the UE) or, optionally, exceeds a certain threshold (either fixed or configured), but the CSI payload for part 1 and part 2 does not exceed B, then the UE transmits UCI part 1 and UCI part 2 as is.

In addition, the UE performs rate matching to the third UCI part. This can be done, for instance, by increasing the channel coding rate, or partially puncturing or selecting the output of the channel encoder (e.g. Polar encoder), or by adjusting the modulation-coding-scheme (MCS) and/or beta offset factor used by the second UCI part. This rate matching can include no transmission (complete puncturing) as a special case, if the payload associated with the third UCI part is too large compared to a certain threshold.

If the CSI payload for part 1 and part 2 exceeds B, then the UE transmits the UCI part 1 as is. In addition, the UE performs rate matching to the second and the third UCI parts. This can be done, for instance, by increasing the channel coding rate, or partially puncturing or selecting the output of the channel encoder (e.g. Polar encoder), or by adjusting the modulation-coding-scheme (MCS) and/or beta offset factor used by the second UCI part. This rate matching can include no transmission (complete puncturing) as a special case, if the payload associated with the second or/and third UCI parts is too large compared to a certain threshold.

In one embodiment 2Z, scheme 2B-14 of embodiment 2 is extended to general three-part UCI design including the cases of single component carrier (CC) or multiple CCs when carrier aggregation (CA) is configured. In particular, the UCI comprises three parts, a first UCI part for a first CSI part, a second UCI part for a second CSI part, and a third UCI part for a third CSI part, where CSI corresponds to one CC or multiple CCs. If the UE finds that the total CSI payload (the number of UCI information bits associated with the CSI report) exceeds the number of bits (e.g. X) that can be accommodated within the PUSCH resources for UCI transmission (either explicitly or implicitly allocated to the UE) or, optionally, exceeds a certain threshold (either fixed or configured), but the CSI payload for part 1 and part 2 does not exceed B, then the UE transmits UCI part 1 and UCI part 2 as is.

In addition, the UE transmits the third UCI part either partially or drops the third UCI part (does not transmit the third UCI part) (based on at least one of the alternatives in scheme 1B-12). The information whether the third UCI part is reported (A) fully for all SBs or (B) partially for a subset of SBs or (C) dropped (not reported) for all SBs is determined according to at least one of the alternatives in scheme 1B-12.

If the CSI payload for part 1 and part 2 exceeds B, then the UE transmits the UCI part 1 as is. In addition, the UE transmits at least one of the second and the third UCI parts either partially or drops the third UCI part (does not transmit the third UCI part) (based on at least one of the alternatives in scheme 1B-12). The information whether at least one of the second and the third UCI parts is reported (A) fully for all SBs or (B) partially for a subset of SBs or (C) dropped (not reported) for all SBs is determined according to at least one of the alternatives in scheme 1B-12.

In a variation of embodiment 2Z, the partial UCI part 2 or/and part 3 transmission in a three-part UCI design for K≥1 CSI reports (e.g. CSI reports for K CCs or cells) is according to an extension of at least one of the alternatives (Alt 1Z-0 through Alt 1Z-21) in embodiment 1Z.

Some alternatives for PMI part I, PMI part II, and PMI part III included in codeword segment 1, codebook segment 2, and codeword segment 3, respectively, in Scheme 2/Scheme 2A/Scheme 2B above can be described as follows.

In a first sub-embodiment of Scheme 2, the three-part UCI multiplexing is used wherein CQI, RI, and PMI part I (indicating L beams) are multiplexed and encoded together in part I, WB amp 1 and/or WB amp 2 (included only if RI=2, otherwise only WB amp 1 included) in part II. The remaining parameters (SB amp 1, SB amp 2, SB phase 1, and SB phase 2) are multiplexed in part III.

In a second sub-embodiment of Scheme 2, the three-part UCI multiplexing is used wherein CQI, RI, PMI part I (indicating L beams), and WB amp 1 are multiplexed and encoded together in part I, WB amp 2 (included only if RI=2, otherwise nothing is included) in part II. The remaining parameters (SB amp 1, SB amp 2, SB phase 1, and SB phase 2) are multiplexed in part III.

In a third sub-embodiment of Scheme 2, the three-part UCI multiplexing is used wherein CQI and RI are multiplexed and encoded together in part I, PMI part I (indicating L beams), WB amp 1 and/or WB amp 2 (included only if RI=2, otherwise only WB amp 1 included) in part II. The remaining parameters (SB amp 1, SB amp 2, SB phase 1, and SB phase 2) are multiplexed in part III.

In a fourth sub-embodiment of Scheme 2, the three-part UCI multiplexing is used wherein CQI and RI, and WB amp 1 are multiplexed and encoded together in part I, PMI part I (indicating L beams) and WB amp 2 (included only if RI=2, otherwise nothing is included) in part II. The remaining parameters (SB amp 1, SB amp 2, SB phase 1, and SB phase 2) are multiplexed in part III.

In the aforementioned embodiments on Type II CSI reporting, the PMI part I ($i_1$) indicates L beams which comprises the following two components: the rotation factor ($q_1$, $q_2$) where $q_1$, $q_2 \in \{0,1,2,3\}$, which corresponds to 16 combinations (hence requires 4-bits reporting); and the selection of L orthogonal beams, which is either joint, $\lceil \log_2 \binom{N_1 N_2}{L} \rceil$ bits, or independent per beam, $L \lceil \log_2(N_1 N_2) \rceil$ bits. The two components are reported either jointly or separately as two components of PMI part I.

In the above embodiments on Type II CSI reporting, the WB amp 1 and WB amp 2 can also be referred to as $RPI_0$ and $RPI_1$ where RPI stands for relative power indicator, and $RPI_0$ indicates the strongest/leading coefficient for the first layer and WB amplitudes $p_{0,0}^{(WB)}, \ldots, p_{0,2L-2}^{(WB)}$ of remaining 2L−1 coefficients for the first layer, and $RPI_1$ indicates the strongest/leading coefficient for the second layer and WB amplitudes $p_{1,0}^{(WB)}, \ldots, p_{1,2L-2}^{(WB)}$ of remaining 2L−1 coefficients for the second layer.

The strongest/leading coefficients for the first layer and second layer can also refer to as $SCI_0$ and $SCI_1$, SCI stands for strongest coefficient indicator. In a variation, $SCI_0$ and $SCI_1$ can also be reported separately from WB amplitudes for the two layers. In this case, $RPI_0$ and $RPI_1$ indicate the WB amplitude of the remaining 2L−1 coefficients for the two layers.

In the aforementioned embodiments on Type II CSI reporting, the SB amp 1 and SB amp 2 can also be referred to as $SRPI_0$ and $SRPI_1$ where SRPI stands for subband relative power indicator, and $SRPI_0$ indicates the SB amplitudes $p_{0,0}^{(SB)}, \ldots, p_{0,2L-2}^{(SB)}$ of remaining 2L−1 coefficients for the first layer, and $SRPI_1$ indicates the SB amplitudes $p_{1,0}^{(SB)}, \ldots, p_{1,2L-2}^{(SB)}$ of remaining 2L−1 coefficients for the second layer.

Component 3—Wideband CSI on PUSCH

In embodiment 3, a wideband or partial-band CSI (one CSI for all the subbands in the CSI reporting band) is reported on PUSCH according to at least one of the following two alternatives.

In one example of Alt 3A, the WB or partial-band CSI is reported such that the information payload remains the same irrespective of the reported RI/CRI in a given slot (to avoid blind decoding by the UE). Note that the size of information payload can be different according to the largest number of CSI-RS ports of the CSI-RS resources configured within a CSI-RS resource set. Two examples to ensure the same payload size are as follows: when PMI and CQI payload size varies with RI/CRI, padding bits are added to RI/CRI/PMI/CQI prior to encoding to equalize the payload associated with different RI/CRI values; and RI/CRI/PMI/CQI, along with padding bits when necessary, is jointly encoded.

In one example of Alt 3B, the two-part UCI design according to some of the embodiments of the present disclosure is still used. As an example, the WB CQI is reported in UCI part 1 and WB or SB PMI is reported in UCI part 2.

In one example of Alt 3C, the three-part UCI design according to some of the embodiments of the present disclosure is still used. As an example, the WB CQI is reported in UCI part 1 and WB or SB PMI is reported in UCI part 2 and part 3.

In one embodiment 4, which is a variation of embodiment 3, when a UE is scheduled to transmit UL data using PUSCH in a slot n, and UCI carrying wideband or partial band CSI is also scheduled to be transmitted using (short or long) PUCCH in the same slot (n), then the UE piggybacks/reports UCI carrying wideband or partial band CSI on PUSCH (not on PUCCH). This can be used, for instance, when simultaneous/concurrent reception of PUSCH and PUCCH is not configured. At least one of the following alternatives is used to piggyback/report UCI on PUSCH.

In one example of Alt 4-0, UCI is transmitted as a single UCI without any padding (for example, zero padding) bits to maintain the number of CSI (CRI/RI/PMI/CQI) information bits to a fixed value, and therefore, the CSI information bits piggybacked on PUSCH can potentially change, for example, depending on the reported CRI/RI value. In addition, if PUSCH resource allocation is such that the PUSCH resource allocation can accommodate two-part UCI transmission (UCI part 1 and UCI part 2, as explained in some embodiments of the present disclosure), then at least one of the following sub-alternatives is used.

In one example of Alt 4-0-0, the wideband or partial band CSI is transmitted using UCI part 1, and UCI part 2 is not used to transmit any CSI.

In one example of Alt 4-0-1, the wideband or partial band CSI is transmitted using UCI part 2, and UCI part 1 is not used to transmit any CSI.

In a variation of this alternative (Alt 4-0A), all of the reported wideband or partial band CSI parameters are jointly encoded into one codeword. This codeword, after code block (CB) CRC insertion (or potentially CB segmentation), is an input to a channel coding block. In another variation (Alt 4-0B), a CRC is not added when the codeword segment is short (e.g. less than a fixed number of bits).

In Alt 4-1, UCI is transmitted as a single UCI with padding (for example, zero padding) bits to maintain the number of CSI (CRI/RI/PMI/CQI) information bits to a fixed value. At least one of the following alternatives is used to insert padding (for example, zero padding) bits with the CSI bits.

In one example of Alt 4-1-0, padding (for example, zero padding) bits is inserted in between the bits for CRI/RI and PMI/CQI. For example, CRI bits is followed by RI bits, which is followed by padding (for example, zero padding) bits, which is followed by PMI bits, which in turn is followed by CQI bits, i.e., CRI→RI→padding bits→PMI→CQI, where CRI bits correspond to either least significant bits (LSBs) or most significant bits (MSBs).

In one example of Alt 4-1-1, padding (for example, zero padding) bits is inserted in the end. For example, CRI bits is followed by RI bits, which is followed by PMI bits, which in turn is followed by CQI bits, which is followed by padding (for example, zero padding) bits, i.e., CRI→RI→PMI→CQI→padding bits, where CRI bits correspond to either least significant bits (LSBs) or most significant bits (MSBs).

In one example of Alt 4-1-2, padding (for example, zero padding) bits is inserted in the beginning. For example, zero padding bits is followed by CRI, which is followed by RI bits, which is followed by PMI bits, which in turn is followed by CQI bits, i.e., padding bits→CRI→RI→PMI→CQI, where padding bits correspond to either least significant bits (LSBs) or most significant bits (MSBs)

In addition, if PUSCH resource allocation is such that the PUSCH resource allocation can accommodate two-part UCI transmission (UCI part 1 and UCI part 2, as explained in some embodiments of the present disclosure), then at least one of the following sub-alternatives is used.

In one example of Alt 4-1-3, the wideband or partial band CSI is transmitted using UCI part 1, and UCI part 2 is not used to transmit any CSI.

In one example of Alt 4-1-4, the wideband or partial band CSI is transmitted using UCI part 2, and UCI part 1 is not used to transmit any CSI.

In a variation of this alternative (Alt 4-1A), all of the reported wideband or partial band CSI parameters (including the padding bits) are jointly encoded into one codeword. This codeword, after code block (CB) CRC insertion (or potentially CB segmentation), is an input to a channel coding block. In another variation (Alt 4-1B), a CRC is not added when the codeword segment is short (e.g. less than a fixed number of bits).

In Alt 4-2, wideband or partial band CSI is partitioned into two parts (CSI part 1 and CSI part 2) and UCI part 1 and UCI part 2 are used to transmit CSI part 1 and CSI part 2, respectively. The CSI part 1 and CSI part 2 are determined according to at least one embodiment of the present disclosure. For example, CSI part 1 comprises CRI, RI, $1^{st}$ CQI; and CSI part 2 comprises PMI, $2^{nd}$ CQI (if RI>4 is reported).

In a variation of this alternative (Alt 4-2A), all of the reported wideband or partial band CSI parameters for CSI part 1 are jointly encoded into one codeword (e.g. codeword segment 1), and all of the reported wideband or partial band CSI parameters for CSI part 2 are jointly encoded into another codeword (e.g. codeword segment 2). Either the codeword segment 1, after code block (CB) CRC insertion (or potentially CB segmentation), is an input to a channel coding block, or the codeword segment 2, after code block (CB) CRC insertion (or potentially CB segmentation), is an input to a channel coding block, or both the codeword segment 1 and codeword segment 2, after code block (CB) CRC insertion (or potentially CB segmentation), are inputs to the respective channel coding blocks. In another variation (Alt 4-2B), a CRC is not added when at least one of the codeword segment 1 or codeword segment 2 is short (e.g. less than a fixed number of bits).

If the wideband or partial band CSI includes the strongest layer indicator (LI), then embodiment 4 and example alternatives (Alt 4-0, 4-1, or/and 4-2) can be extended to include LI in addition to other CSI parameters (CRI/RI/PMI/CQI). In particular, LI bits can be in the beginning, hence, followed by CRI bits (e.g. LI→CRI→RI→ . . . ). Or, LI bits can be in the end, hence, followed by CQI (e.g. . . . →PMI→CQI→LI). Or, LI bits can be in between RI and PMI bits (e.g. . . . →RI→LI→PMI→ . . . ).

Component 4—Aperiodic Beam Reporting on PUSCH

Figure 16:
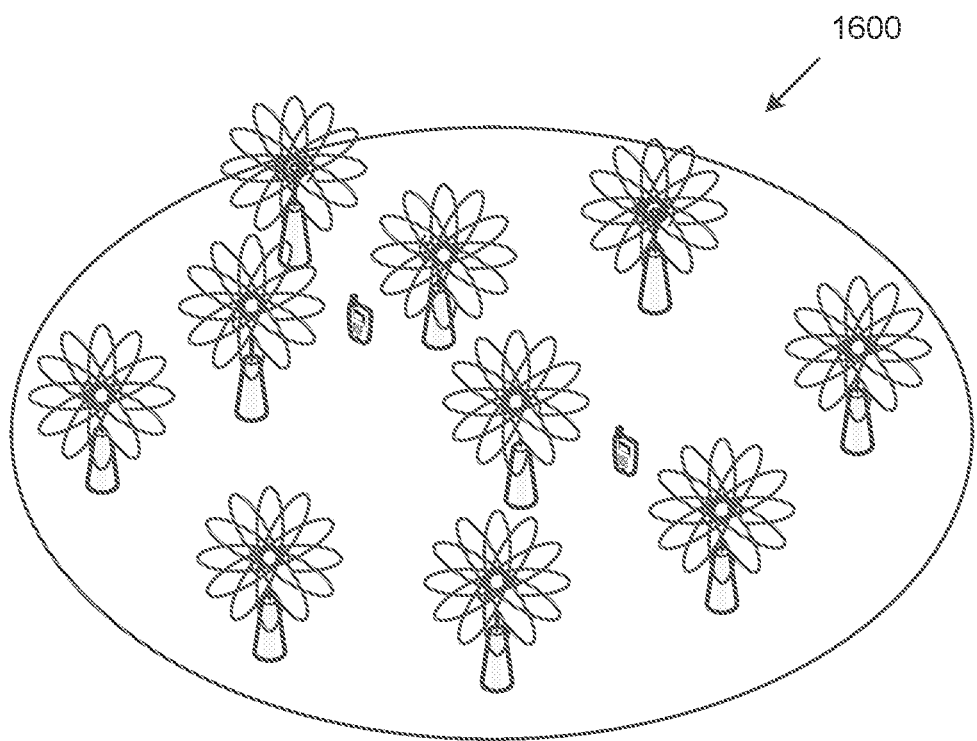
FIG. 16 illustrates an example multi-beam based system according to embodiments of the present disclosure.

FIG. 16 illustrates an example multi-beam based system 1600 according to embodiments of the present disclosure. The embodiment of the multi-beam based system 1600 illustrated in FIG. 16 is for illustration only. FIG. 16 does not limit the scope of this disclosure to any particular implementation.

The future cellular systems (such as 5G) are expected to be a multi-beam based system. In such a system, multiple beams are used to cover one coverage area. An example for illustration is shown in FIG. 16. As shown, one gNB has one or more TRPs. Each TRP uses one or more analog or radio frequency (RF) beams to cover some area. To cover one UE in one particular area, the gNB uses one or more analog beams to transmit and receive the signal to and from that UE. The gNB and the UE need to determine the beam(s) used for their connection. When the UE moves within one cell coverage area, the beam(s) used for this UE may be changed and switched. The operation of managing those beams are radio access network layer 1 (L1) and layer 2 (L2) operation.

For instance, the following L1/L2 beam management procedures are used. In one example of P-1, the L1/L2 beam management procedures are used to enable UE measurement on different TRP TX beams to support selection of TRP TX beams/UE Rx beam(s). In such example, for beamforming at TRP, the L1/L2 beam management procedures typically include an intra/inter-TRP TX beam sweep from a set of different beams. For beamforming at UE, the L1/L2 beam management procedures typically include a UE Rx beam sweep from a set of different beams.

In one example of P-2, the L1/L2 beam management procedures are used to enable UE measurement on different TRP TX beams to possibly change inter/intra-TRP TX beam(s). In such example, from a possibly smaller set of beams for beam refinement than in P-1. Note that P-2 can be a special case of P-1.

In one example of P-3, the L1/L2 beam management procedures are used to enable UE measurement on the same TRP TX beam to change UE Rx beam in the case UE uses beamforming.

In the present disclosure, a "beam" can correspond to an RS resource, whether the beam is a sounding reference signal (SRS), CSI-RS, beam RS, measurement RS, or any other type of RS.

In high frequency band system (e.g., >6 GHz system), the TRP and the UE can be deployed with large number of antennas to relay on the high gain beamforming to defeat the large path loss and signal blockage. A general system configuration is that the TRP and UE have large number antennas but only one or a few TXRUs. So hybrid beamforming mechanism is utilized wherein both analog (RF) and digital (baseband) beamforming are utilized for transmission. Analog beams with different direction can be formulated on the antenna array that is connected to one TXRU.

To get the best link quality and coverage distance, the TRP and UE need to align the analog beam directions for each particular downlink and uplink transmission. An example mechanism to align analog beams (e.g. for DL) includes multiple RS transmission from the gNB where each RS corresponds to an analog beam, and at least one RS reporting from the UE. In one example, the RS corresponds to CSI-RS, and the UE reports one or more CRI to indicate analog beam(s) selection. In another example, the RS corresponds to SS/PBCH, and the UE reports one of more SSB resource indicator or SS/PBCH block resource indicator (SSBRI). In addition to the resource indicator (CRI or SSBRI), the UE also reports the quality of the reported beams in the form of layer 1 reference signal received power (L1-RSRP). If multiple (N>1) CRI or SSBRI are reported, then the corresponding L1-RSRP can be reported differentially wherein B1 bits are used to report one L1-RSRP and B2 bits are used to report each of the remaining (N−1) differential L1-RSRPs. An example of B1 is 7. An example of B2 is 4.

In the present disclosure, the schemes of beam reporting, i.e., CRI or SSBRIS together with L1-RSRP, are provided. In particular, aperiodic beam reporting on PUSCH is considered.

In CSI configuration framework, the UE can be configured with higher layer parameter ReportQuantity set to be "CRI/RSRP" or "SSBRI/RSRP". When the UE is configured with "CRI/RSRP", the UE can be requested to report N different CRIs and their corresponding L1-RSRP based one measuring K configured CSI-RS resources. An example of K value is 16, 32 or 64. When the UE is configured with "SSBRI/RSRP", the UE can be requested to report N different SSBRIs and their corresponding L1-RSRP values. The example of N can be 1, 2, 3, and 4

For aperiodic CRI/RSRP and SSBRI/RSRP reporting, UL channel PUSCH can be used, or, optionally, UL channel long PUCCH or short PUCCH can be used. In short PUCCH channel, PUCCH format 2 can be used for aperiodic CRI/RSRP and SSBRI/RSRP reporting. In long PUCCH channel, PUCCH format 3 and 4 can be used for aperiodic CRI/RSRP and SSBRI/RSRP reporting.

In one embodiment 4, the aperiodic beam reporting is triggered and/or configured for a UE according to at least one of the following reporting schemes. If multiple schemes are supported in the specification, then one of the multiple scheme is configured to the UE (e.g. via higher layer RRC or MAC CE based or DCI based signaling).

In one embodiment of scheme 4A, the UE is triggered to transmit/report aperiodic beam report comprising N reported CRIs or SSBRIs and their corresponding N L1-RSRP and differential L1-RSRPs on PUSCH (or short PUCCH or long PUCCH) in one part (using a single UCI segment) regardless of the value of N. The UE can determine the bit size of beam report payload size for a given value of N.

If the bit size of beam report payload is less than or equal to that can be accommodated in a single UCI (based on RA), the UE can transmit/report the whole beam report with N selected CRIs or SSBRIs and their corresponding N L1-RSRP and differential L1-RSRPs in one part using a single UCI segment.

Otherwise, (or If the bit size of beam report payload is larger than that can be accommodated in a single UCI), the UE can report only a subset of the beam report with N selected CRIs or SSBRIs and their corresponding N L1-RSRP and differential L1-RSRP. The subset the UE can report can be one of the following.

In one example of Alt 4.1, the M CRIs or SSBRIs of N CRIs or SSBRIs with the largest L1-RSRP. M can be the largest number of that the bit size of report with M CRIs or SSBRIs and M L1-RSRP/differential L1-RSRP is no more than that can be accommodated in one part (of the single UCI segment).

In one example of Alt 4.2, the subset (M out of N) is reported by the UE, The UE can also report which subset is reported. In one example, an additional signaling with $\lceil \log_2 \binom{N}{M} \rceil$ bits can be signaled from the UE to indicate which subset is reported.

In one example of Alt 4.3, the subset is configured to the UE, for example, via higher layer (RRC) or more dynamic MAC CE based or DCI based signaling.

In a variation of scheme 4A, the UE determines the transmission behavior based on achieved code rate that is calculated by assuming the whole beam report payload with N CRIs/SSBRIs is sent in one part using a single UCI. If the achieved code rate is less than (or equal to) some threshold, the UE can transmit and report the whole beam report with N CRIs or SSBRIs and their corresponding N L1-RSRP/differential L1-RSRP in one part (using a single UCI segment). If the achieved code rate is larger than some threshold, the UE can only transmit a subset of the beam report with those N selected CRIs/SSBRIs and their corresponding L1-RSRP/differential L1-RSRP. The selection of a subset can be according one of the alternatives described above. In an example, the threshold is determined based on the coding rate ($c_{MCS}$) and the beta_offset ($\beta_{offset}$) configured for the UCI transmission, e.g.

$$c_T = \frac{c_{MCS}}{\beta_{offset}}.$$

In one embodiment of scheme 4B, the UE is triggered to transmit/report aperiodic beam report comprising N reported CRIs or SSBRIs and their corresponding N L1-RSRP and differential L1-RSRPs on PUSCH (or short PUCCH or long PUCCH) in 1 or 2 parts (using 1 or 2 UCI segments). The UE determines whether to transmit one beam report in one or two parts based on the information of bit size of beam report payload size. If the bit size of beam report payload is large, the UE partitions the beam report contents into two parts and transmit these two parts using two UCI segments. If the bit size of beam report payload is small, the UE transmits the whole content of one beam report instance with N reported CRIs or SSBRIs and their corresponding N L1-RSRPs in one part using one UCI segment.

Alternatively, the UE determines whether to transmit one beam report in one or two parts based on the value N. If N>A, where A is a fixed value (e.g. A=2), the UE partitions the beam report contents into two parts and transmit these two parts using two UCI segments. If N<=A, the UE transmits the whole content of one beam report instance with N reported CRIs or SSBRIs and their corresponding N L1-RSRPs in one part using one UCI segment. Alternatively, the UE determines whether to transmit one beam report in one or two parts based on the achieved code rate, for example, by comparing the code rate with a fixed threshold as explained in scheme 4A.

In one embodiment of scheme 4C, the UE is triggered to transmit/report aperiodic beam report comprising N reported CRIs or SSBRIs and their corresponding N L1-RSRP and differential L1-RSRPs on PUSCH (or short PUCCH or long PUCCH) in 1, 2, ..., or, M parts (using 1, 2, ..., or M UCI segments), where the value M is fixed and is determined based on a fixed condition such as the value N, bit size of the beam report, achieved code rate etc. as explained in scheme 4B.

In one example of Definition of Collision, a beam report and a CSI report or two CSI reports are said to collide if the time occupancy of the physical channels scheduled to carry the CSI reports overlap in at least one OFDM symbol and are transmitted on the same carrier.

In one embodiment 5, when aperiodic beam report (according to schemes of embodiment 4) collides with aperiodic CSI report (according to schemes in embodiments 1/2/3), then at least one of the following reporting schemes is used. If multiple schemes are supported in the specification, then one of the multiple schemes is configured to the UE (e.g. via higher layer RRC or MAC CE based or DCI based signaling).

In one embodiment of scheme 5A, at least one of the aperiodic beam report or aperiodic CSI report, either fully or partially, is dropped (not reported) whenever collide. At least one of the following alternatives is use for dropping.

In one example of Alt 5A-0, the aperiodic CSI report is dropped.

In one example of Alt 5A-1, the aperiodic beam report is dropped.

In one example of Alt 5A-2, this is configured (via higher later RRC or MAC CE based or DCI based signaling) with which of the two (aperiodic beam report or aperiodic CSI report) is dropped.

In one example of Alt 5A-3, when CSI is expected to be reported in two parts (CSI part 1 and CSI part 2) using two UCI segments (if the CSI does not collide with beam report) and beam is reported in one part, then at least one of the following sub-alternatives is used.

In one example of Alt 5A-3-0, CSI part 1 and beam report are reported in two parts using UCI segment 1 and 2, respectively, and CSI part 2 is dropped.

In one example of Alt 5A-3-1, CSI part 2 and beam report are reported in two parts using UCI segment 1 and 2, respectively, and CSI part 1 is dropped.

In one example of Alt 5A-3-2, CSI part 1 and CSI part 2 are reported in two parts using UCI segment 1 and 2, respectively, and beam report is dropped.

In one example of Alt 5A-4, when beam is expected to be reported in two parts (beam report part 1 and beam report part 2) using two UCI segments (if the beam did not collide with CSI report), then at least one of the following sub-alternatives is used.

In one example of Alt 5A-4-0, beam report part 1 and CSI report are reported in two parts using UCI segment 1 and 2, respectively, and beam report part 2 is dropped.

In one example of Alt 5A-4-1, beam report part 2 and CSI report are reported in two parts using UCI segment 1 and 2, respectively, and beam report part 1 is dropped.

In one example of Alt 5A-4-2, beam report part 1 and beam report part 2 are reported in two parts using UCI segment 1 and 2, respectively, and CSI report is dropped.

In one example of Alt 5A-5, when CSI is expected to be reported in two parts (CSI part 1 and CSI part 2) using two UCI segments (if the CSI did not collide with beam report), and beam is expected to be reported in two parts (beam report part 1 and beam report part 2) using two UCI segments (if the beam did not collide with CSI report), then at least one of the following sub-alternatives is used.

In one example of Alt 5A-5-0, CSI part 1 and beam report part 1 are reported in two parts using UCI segment 1 and 2, respectively, and CSI part 2 and beam report part 2 are dropped.

In one example of Alt 5A-5-1, CSI part 1 and CSI part 2 are reported in two parts using UCI segment 1 and 2, respectively, and beam report part 1 and beam report part 2 are dropped.

In one example of Alt 5A-5-2, beam report part 1 and beam report part 2 are reported in two parts using UCI segment 1 and 2, respectively, and CSI part 1 and CSI part 2 are dropped. When CSI part 2 is transmitted partially, (according to some embodiment of the present disclosure), then alternatives in scheme 5A can be extended to include partial transmission of CSI part 2.

In one embodiment of scheme 5B, both aperiodic beam report and aperiodic CSI report are multiplexed and reported according to at least one of the following alternatives.

In one example of Alt 5B-0, both CSI report and beam report are multiplexed and reported in one part as a single UCI segment.

In one example of Alt 5B-1, CSI report is reported in one part as UCI segment 1 and beam report is reported in one part as UCI segment 2. Note that when CSI and beam report do not collide, then each one of the CSI and beam report is reported in one part as a single UCI segment. In other words, CSI report and beam report are reported using two UCI segments only when the CSI report and beam report collide, otherwise the CSI report and beam report are reported using one UCI segment. Also, the presence of UCI segment 2 can be indicated in UCI segment 1 by using 1-bit signaling or via higher layer (e.g. RRC) or dynamic DCI based signaling.

In one example of Alt 5B-2, same as Alt 5B-1 except that CSI report is reported in one part as UCI segment 2 and beam report is reported in one part as UCI segment 1.

In one example of Alt 5B-3, when CSI is expected to be reported in two parts (CSI part 1 and CSI part 2) using two UCI segments (if the CSI did not collide with beam report) and beam is reported in one part, then at least one of the following sub-alternatives is used.

In one example of Alt 5B-3-0, CSI part 1 and beam report are multiplexed and reported in one part using UCI segment 1, and CSI part 2 is reported in one part using UCI segment 2.

Figure 17:
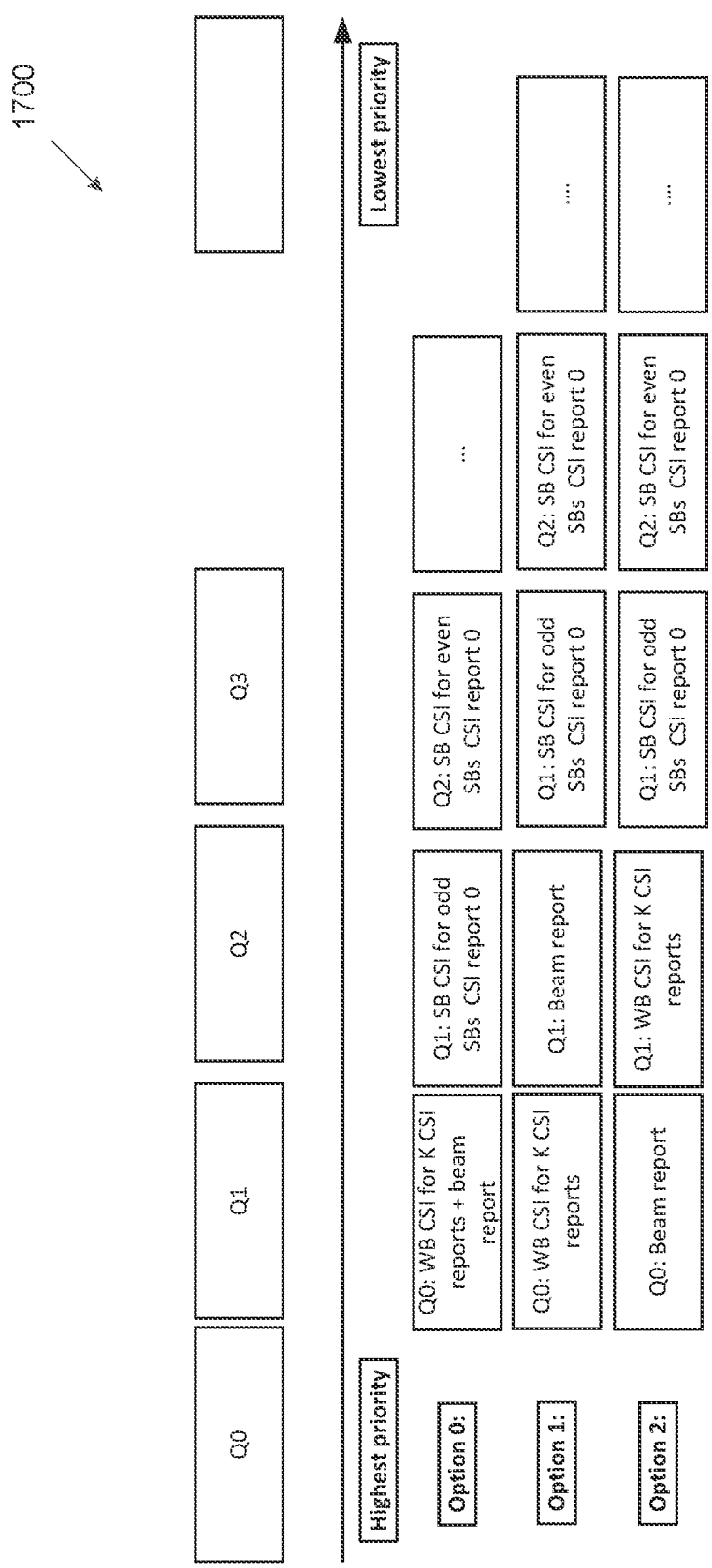
FIG. 17 illustrates an example beam report according to embodiments of the present disclosure.

FIG. 17 illustrates an example beam report 1700 according to embodiments of the present disclosure. The embodiment of the beam report 1700 illustrated in FIG. 17 is for illustration only. FIG. 17 does not limit the scope of this disclosure to any particular implementation.

In one example of Alt 5B-3-1, CSI part 2 and beam report are multiplexed and reported in one part using UCI segment 2, and CSI part 1 is reported in one part using UCI segment 1. For the case when CSI part 2 can be transmitted partially based on a priority order (cf. FIG. 13) by partitioning CSI part 2 bits into multiple segments, the beam report can be included (Option 0) in the highest priority segment (Q0 for WB CSI) as shown in FIG. 17. Alternatively, the beam report is included separately either before or after (Option 1 and 2). An illustration is shown in FIG. 17.

In one example of Alt 5B-4, when beam is expected to be reported in two parts (beam report part 1 and beam report part 2) using two UCI segments (if the beam did not collide with beam report) and CSI report is reported in one part, then at least one of the following sub-alternatives is used.

In one example of Alt 5B-4-0, beam report part 1 and CSI report are multiplexed and reported in one part using UCI segment 1, and beam report part 2 is reported in one part using UCI segment 2.

In one example of Alt 5B-4-1, beam report part 2 and CSI report are multiplexed and reported in one part using UCI segment 2, and beam report part 1 is reported in one part using UCI segment 1.

In one example of Alt 5B-5, when CSI is expected to be reported in two parts (CSI part 1 and CSI part 2) using two UCI segments (if the CSI did not collide with beam report), and beam is expected to be reported in two parts (beam report part 1 and beam report part 2) using two UCI segments (if the beam did not collide with CSI report), then at least one of the following sub-alternatives is used.

In one example of Alt 5B-5-0, CSI part 1 and beam report part 1 are multiplexed and reported in one part using UCI segment 1, and CSI part 2 and beam report part 2 are multiplexed and reported in one part using UCI segment 2. For the case when CSI part 2 can be transmitted partially based on a priority order (cf. FIG. 13) by partitioning CSI part 2 bits into multiple segments, at least one of Option 0 — 2 in FIG. 17 can be used.

In one example of Alt 5B-5-1, CSI part 2 and beam report part 2 are multiplexed and reported in one part using UCI segment 1, and CSI part 1 and beam report part 1 are multiplexed and reported in one part using UCI segment 2. For the case when CSI part 2 can be transmitted partially based on a priority order (cf. FIG. 13) by partitioning CSI part 2 bits into multiple segments, at least one of Option 0-2 in FIG. 17 can be used.

Component 5—Multiplexing Periodic/Semi-Persistent Beam Reporting and A-CSI

In one embodiment 6, when a periodic beam report collides with an aperiodic CSI report, then at least one of the following alternatives is used.

In one example of Alt 6-0, the periodic beam report is dropped.

In one example of Alt 6-1, the periodic beam report is multiplexed and reported with the aperiodic CSI reported. For example, at least one of the schemes or/and alternatives of embodiment 5 can be used.

In one embodiment 7, when semi-persistent beam report collides with an aperiodic CSI report, then at least one of the following alternatives is used.

In one example of Alt 7-0, the semi-persistent beam report is dropped.

In one example of Alt 7-1, the semi-persistent beam report is multiplexed and reported with the aperiodic CSI reported. For example, at least one of the schemes or/and alternatives of the aforementioned embodiment 5 can be used.

In semi-persistent beam reporting, the UE can receive an activation message or selection message from higher layer and then the UE would begin the report beam reporting with N beams (N beam IDs and their corresponding L1-RSRP or differential L1-RSRP). The UE can continue reporting periodically until an inactivation message is received from higher layer. A semi-persistent beam reporting can be transmitted on PUSCH, long PUCCH and short PUCCH.

Component 6: Beam Reporting for MIMO.

In some embodiments, a UE can be configured with N sets of CSI-RS resources and there can be one or multiple CSI-RS resources in each set. The UE can be requested to measure the transmission of those N sets of CSI-RS resource and then report at least one CSI-RS resource index selected from every configured set and the corresponding rank indicator, CQI and/or CSI-RSRP measurement.

CSI-RS resource is used for exemplary explanation. It can be any RS type. The CSI-RS resource can be replaced with SS block without changing any method in this disclosure.

In one embodiment, a UE can be configured with N (>1) CSI-RS resource sets. The set n (=1, 2, . . . , N) has $K_n$ CSI-RS resources. The CSI-RS resources in the set n are $\{c_{n,1}, c_{n,2}, \ldots, c_{n,K_n}\}$.

The UE can be requested to report the following information. In one example, the UE can be requested to report one CSI-RS resource index selected from each configured set of n=1, 2, . . . , N: $\{c_{1,i_1}, c_{2,i_2}, \ldots, c_{n,i_n}\}$, where $c_{1,i_1}$ is one CSI-RS resource index selected from CSI-RS resource set 1, $c_{2,i_2}$ is one CSI-RS resource index selected from CSI-RS resource set 2, $c_{n,i_n}$ is one CSI-RS resource index selected from CSI-RS resource set n for n=1,2, . . . , N.

In one example, the UE can be requested to report a rank indicator, $R_0$, corresponding to the reported CSI-RS resource indices $\{c_{1,i_1}, c_{2,i_2}, \ldots, c_{n,i_n}\}$. The UE can be requested to calculate $R_0$ by assuming the CSI-RS resources $\{c_{1,i_1}, c_{2,i_2}, \ldots, c_{n,i_n}\}$ are transmitted through N different TXRUs from the gNB and the UE uses the same Rx beam to receive.

In one example, the UE can be requested to report a CQI value corresponding to the reported CSI-RS resource indices $\{c_{1,i_1}, c_{2,i_2}, \ldots, c_{n,i_n}\}$. The UE can be requested to calculate the CQI value by assuming the CSI-RS resources $\{c_{1,i_1}, c_{2,i_2}, \ldots, c_{n,i_n}\}$ are transmitted through N different TXRUs from the gNB.

In one example, the UE can be requested to report the sum of the CSI-RSRP of CSI-RS resources $\{c_{1,i_1}, c_{2,i_2}, \ldots, c_{n,i_n}\}$.

In one embodiment, a UE can be configured with N (>1) CSI-RS resource sets. The set n (=1, 2, ..., N) has $K_n$ CSI-RS resources. The CSI-RS resources in the set n are $\{c_{n,1}, c_{n,2}, \ldots, c_{n,K_n}\}$. The UE can be also configured with MIMO transmission mode that the UE may use as criterion to select CSI-RS index. The MIMO transmission mode configuration information can be indication of a rank indicator $R_1$. The UE can be requested to report.

In one example, the UE can be requested to report one CSI-RS resource index selected from each configured set of n=1,2, ..., N: $\{c_{1,i_1}, c_{2,i_2}, \ldots, c_{n,i_n}\}$, where $c_{1,i_1}$ is one CSI-RS resource index selected from CSI-RS resource set 1, $c_{2,i_2}$ is one CSI-RS resource index selected from CSI-RS resource set 2, $c_{n,i_n}$ is one CSI-RS resource index selected from CSI-RS resource set n for n=1,2, ..., N. The rank indicator that the UE calculate based on reported CSI-RS resource indices $\{c_{1,i_1}, c_{2,i_2}, \ldots, c_{n,i_n}\}$ maybe not less than configured rand indicator $R_1$. The UE can be requested to calculate rank indicator by assuming the CSI-RS resources $\{c_{1,i_1}, c_{2,i_2}, \ldots, c_{n,i_n}\}$ are transmitted through N different TXRUs from the gNB.

In one example, the UE can be requested to report a CQI value corresponding to the reported CSI-RS resource indices $\{c_{1,i_1}, c_{2,i_2}, \ldots, c_{n,i_n}\}$ and assuming $R_1$ data streams would be transmitted. The UE can be requested to calculate the CQI value by assuming the CSI-RS resources $\{c_{1,i_1}, c_{2,i_2}, \ldots, c_{n,i_n}\}$ are transmitted through N different TXRUs from the gNB.

In one example, the UE can be requested to report the sum of the CSI-RSRP of CSI-RS resources $\{c_{1,i_1}, c_{2,i_2}, \ldots, c_{n,i_n}\}$.

Component 7: Beam Reporting for MU-MIMO.

In some embodiments, a UE can be configured with N sets of CSI-RS resources and there can be one or multiple CSI-RS resources in each set. A first group of those N CSI-RS sets can be configured as serving set and a second group of those N CSI-RS sets can be configured as interference set. The UE can be requested to measure the transmission of those N sets of CSI-RS resource and then report at least one CSI-RS resource index selected from every configured set and the corresponding rank indicator, CQI and/or CSI-RSRP measurement by measuring the CSI from CSI-RS resources in the sets in a first group and measuring interference from CSI-RS resources in the sets in a second group.

There can be one or more CSI-RS resource set in a first group. There can be one or more CSI-RS resource sets in a second group. The UE can be requested to measure those CSI-RS resources by assuming that any CSI-RS resource in a first group of sets may be used for CSI measurement and that any CSI-RS resource in a second group of sets may be used for interference measurement. The UE can be requested to report at least one CSI-RS resource selected from each CSI-RS resource set and a corresponding RI, CQI and/or RSRP, where the RI and CQI may be calculated by assuming to use the reported CSI-RS resource selected from a first group of sets as CSI measurement and the reported CSI-RS resources selected from a second group of sets as interference measurement. The UE can be configured with one or more of the following configurations: N sets of CSI-RS resources. Each set can have one or more CSI-RS resources.

The feature definition of each set. It indicates whether the TX beams carried by the CSI-RS resources in one set is used as serving beam and the UE can be requested to measure beam quality on the CSI-RS resources. It indicates whether the TX beams carried by the CSI-RS resources in one set are used as interference beam and the UE can be requested to measure if the TX beams can cause interference to the UE. It can indicate whether the TX beams carried by the CSI-RS resources in one set can be used as serving beam or interference beam and the UE can be requested to measure both beam quality by assuming both beam are serving beam and also interference level by assuming both beam are interference beam.

The measurement method: the UE can be configured to measure the beam quality (e.g., RI, CQI and/or RSRP) of some combination of CSI-RS resources selected from different set. And in the beam quality metric calculation, the UE can be configured to assume some CSI-RS resources as serving beam and some other CSI-RS resources as interference beams The UE can be configured to report one or more of the following information. In one example, the UE can be configured to report one or more CSI-RS resource combinations. In each CSI-RS resource combination, there are multiple CSI-RS resources which are selected from different sets. In one example, the UE can be configured to report some information to indicate in each combination, which CSI-RS resources are selected as serving beam and which CSI-RS resources are selected interference beams. In one example, the UE can be configured to report the beam quality measurement metric measured on each reported CSI-RS resource combination. The beam quality measurement metric can be RI, CQI and/or L1-RSRP.

In one embodiment, a UE can be configured with N=2 CSI-RS resource sets. A first CSI-RS set $C_1$ can have $K_1$ CSI-RS resources, for example $C_1=\{c_{1,1}, c_{1,2}, \ldots, c_{1,K_1}\}$. A second CSI-RS set $C_2$ can have $K_2$ CSI-RS resources, for example $C_2=\{c_{2,1}, c_{2,2}, \ldots, c_{2,K_2}\}$. A first CSI-RS set can be configured as serving set and a second CSI-RS set can be configured as interference set. The UE can be requested to take any CSI-RS resource in a first CSI-RS set $C_1$ as serving beam or CSI measurement but take any CSI-RS resource in a second CSO-RS set $C_2$ as the interference beam or interference measurement when the UE does beam measurement on those CSI-RS resources. And then the UE can be requested to select one CSI-RS resource index from a first CSI-RS set $C_1$ and a second CSI-RS set $C_2$ and then report the CSI-RS resource index back to the gNB. The UE can be requested to report the RI, CQI and/or RSRP measured on the reported CSI-RS resources.

The UE can be requested to one or more than one of the following information sets. In one example, the UE can be configured to report two CSI-RS resource indices $\{c_{1,i}, c_{2,j}\}$, where $c_{1,i}$ is selected from a first CSI-RS set $C_1$ and $C_{2,j}$ is selected from a second CSI-RS set $C_2$. In one example, the UE can be configured to report an RI that is calculated from the reported CSI-RS resource $\{c_{1,i}, c_{2,j}\}$ with using $c_{1,i}$ as serving beam for CSI measurement and using $c_{2,j}$ as interference beam for interference measurement.

The UE can first receive the configuration of two CSI-RS resource sets and the measurement setting. Then the UE can pick a first CSI-RS resource from a first set and pick a second CSI-RS resource from a second set. The UE receives the first and second CSI-RS resources with the same Rx-side beamforming (if the UE supports multiple Rx beam). The UE can calculate the RI, CQI and/or RSRP by using a first CSI-RS resource as serving beam and a second CSI-RS as interference beam. The UE can repeat this procedure on different CSI-RS resource selection. The UE then select one or more pair of CSI-RS resources and report the selection back to the NW. The UE can calculate the RI, CQI and/or RSRP by using a first CSI-RS resource as CSI measurement and a second CSI-RS as interference measurement. The UE can repeat this procedure on different CSI-RS resource selection. The UE then select one or more pair of CSI-RS resources and report the selection back to the NW.

In one embodiment, a UE can be configured with N=2 CSI-RS resource sets. A first CSI-RS set $C_1$ can have $K_1$ CSI-RS resources, for example $C_1=\{c_{1,1}, c_{1,2}, \ldots, c_{1,K_1}\}$. A second CSI-RS set $C_2$ can have $K_2$ CSI-RS resources, for example $C_2=\{c_{2,1}, c_{2,2}, \ldots, c_{2,K_2}\}$. The UE can be requested to report one or more than one of the following information sets.

In one example, the UE can be configured to report two CSI-RS resource indices $\{c_{1,i}, c_{2,j}\}$, where $c_{1,i}$ is selected from a first CSI-RS set $C_1$ and $c_{2,j}$ is selected from a second CSI-RS set $C_2$.

In one example, the UE can be configured to report a first indicator to indicate which one of $\{c_{1,i}, c_{2,j}\}$ is selected as interference measurement and the other one is selected as CSI measurement. In other words, a first indicator to indicate which one of $\{c_{1,i}, c_{2,j}\}$ is selected as interference beam and the other one is selected as serving beam. In one example, 1-bit field can be used to indicate that. The value of 1-bit field being 0 can indicate $c_{1,i}$ is selected as interference measurement while the value of 1-bit field being 1 can indicate $c_{2,j}$ is selected as interference measurement. In one example, 1-bit field can be used to indicate that. The value of 1-bit field being 0 can indicate $c_{1,i}$ is selected as interference beam while the value of 1-bit field being 1 can indicate $c_{2,j}$ is selected as interference beam.

In one example, the UE can be configured to report an RI, CQI and L1-RSRP that are calculated from the reported CSI-RS resource $\{c_{1,i}, c_{2,j}\}$ with the interference measurement selection indicated by a first indicator. In other word, the beam quality metric calculated based on the reported CSI-RS resource $\{c_{1,i}, c_{2,j}\}$ with the serving beam and interference beam indication as indicated by a first indicator The UE can first receive the configuration of two CSI-RS resource sets and the measurement setting. Then the UE can pick a first CSI-RS resource from a first set and pick a second CSI-RS resource from a second set. The UE receives the first and second CSI-RS resources with the same Rx-side beamforming (if the UE supports multiple Rx beam). The UE can calculate the RI, CQI and/or RSRP by using a first CSI-RS resource as CSI measurement and a second CSI-RS as interference measurement. The UE can calculate the RI, CQI and/or RSRO by using a first CSI-RS resource as interference measurement and a second CSI-RS resource as CSI measurement. The UE can repeat this procedure on different CSI-RS resource selection. The UE then select one or more pair of CSI-RS resources and also their CSI measurement/interference measurement assignment and report the selection back to the NW.

The UE can calculate the RI, CQI and/or RSRP by assuming a first CSI-RS resource as the serving beam and a second CSI-RS as interference beam. The UE can calculate the RI, CQI and/or RSRO by using a first CSI-RS resource as interference beam and a second CSI-RS resource as the serving beam. The UE can repeat this procedure on different CSI-RS resource selection. The UE then select one or more pair of CSI-RS resources and also their serving beam and interference beam assignment and report the selection back to the NW.

In one embodiment, a UE can be configured with N=4 CSI-RS resource sets. A first CSI-RS set $C_1$ can have $K_1$ CSI-RS resources, for example $C_1=\{c_{1,1}, c_{1,2}, \ldots, c_{1,K_1}\}$. A second CSI-RS set $C_2$ can have $K_2$ CSI-RS resources, for example $C_2=\{c_{2,1}, c_{2,2}, \ldots, c_{2,K_2}\}$. A third CSI-RS set $C_3$ can have $K_3$ CSI-RS resources, for example $C_3=\{c_{3,1}, c_{3,2}, \ldots, c_{3,K_3}\}$. A fourth CSI-RS set $C_4$ can have $K_4$ CSI-RS resources, for example $C_4=\{c_{4,1}, c_{4,2}, \ldots, c_{4,K_4}\}$.

A first set and a second set are configured as serving beam set and a third set and a fourth set are configured as interference beam set. The UE can be requested to take any CSI-RS resource in a first CSI-RS set $C_1$ and any CSI-RS resource in a second CSI-RS set $C_2$ as serving beam or CSI measurement but take any CSI-RS resource in a third CSI-RS set $C_3$ and any CSI-RS resource in a fourth set $C_4$ as the interference beam or interference measurement when the UE does beam measurement on those CSI-RS resources. And then the UE can be requested to select one CSI-RS resource index from a first CSI-RS set $C_1$, a second CSI-RS set $C_2$, a third CSI-RS set $C_3$, and a fourth CSI-RS set $C_4$ and then report the first, second, third, and fourth CSI-RS back to the gNB. The UE can be requested to report the RI, CQI and/or RSRP measured on the reported CSI-RS resources. The UE can be requested to one or more than one of the following information sets.

In one example, the UE can be configured to report four CSI-RS resource indices $\{c_{1,i}, c_{2,j}, c_{3,m}, c_{4,n}\}$, where $c_{1,i}$ is selected from a first CSI-RS set $C_1$ and $C_{2,j}$ is selected from a second CSI-RS set $C_2$, $c_{3,m}$ is selected from a third CSI-RS set $C_3$ and $c_{4,n}$ is selected from a fourth CSI-RS set $C_4$.

In one example, the UE can be configured to report an RI that is calculated from the reported CSI-RS resource $\{c_{1,i}, c_{2,j}, c_{3,m}, c_{4,n}\}$ with using $c_{1,i}$ and $c_{2,j}$ as serving beam for CSI measurement and using $c_{3,m}$ and $c_{4,n}$ as interference beam for interference measurement.

The UE can first receive the configuration of four CSI-RS resource sets and the measurement setting. Then the UE can pick a first CSI-RS resource from a first set, a second CSI-RS resource from a second set, a third CSI-RS resource from a third set and a fourth CSI-RS resource from a fourth set. The UE receive the first, second, third, and fourth CSI-RS resources with the same Rx-side beamforming (if the UE supports multiple Rx beam). The UE can calculate the RI, CQI and/or RSRP by using a first CSI-RS resource and a second CSI-RS resource as serving beam and a third CSI-RS resource and a fourth CSI-RS resource as interference beam. The UE can repeat this procedure on different CSI-RS resource selection. The UE then select one or more combinations of CSI-RS resources and report the selection back to the NW. The UE can calculate the RI, CQI and/or RSRP by using a first CSI-RS resource as CSI measurement and a second CSI-RS as interference measurement. The UE can repeat this procedure on different CSI-RS resource selection. The UE then select one or more combinations of CSI-RS resources and report the selection back to the NW.

Component 8: Non-Coherent Beam Reporting.

In some embodiment, a UE can be configured with N sets of CSI-RS resources and there can be one or multiple CSI-RS resources in each set. The UE can measure the CSI-RS resources in those N sets and then report back at least one CSI-RS resource index selected from every configured set. The UE can be requested to one or more beam combinations and in each combination, there are N CSI-RS resource indices and each of CSI-RS resource is selected from different CSI-RS resource sets. The UE can be requested to divide all his TXRUs or receive chains into multiple subsets. The UE can measure the L1-RSRP of each CSI-RS resource on each subset of TXRU or receive chain. Then the UE can be requested to select CSI-RS resources from N sets based on the L1-RSRP measured from multiple subsets of TXRU or receive chains.

In one embodiment, a UE can be configured with N=2 CSI-RS resource sets. A first CSI-RS set $C_1$ can have $K_1$ CSI-RS resources, for example $C_1=\{c_{1,1}, c_{1,2}, \ldots, c_{1,K_1}\}$. A second CSI-RS set $C_2$ can have $K_2$ CSI-RS resources, for example, $C_2=\{c_{2,1}, c_{2,2}, \ldots, c_{2,K_2}\}$. The UE can be requested to report one or more of the following information set.

In one example, the UE can be configured to report two CSI-RS resource indices $\{c_{1,i}, c_{2,j}\}$, where $c_{1,i}$ is selected from a first CSI-RS set $C_1$ and $c_{2,j}$ is selected from a second CSI-RS set $C_2$.

In one example, the UE can be configured to report the L1-RSRP of $c_{1,i}$ measured from a first subset of UE's TXRUs or receive chains and the L1-RSRP of $c_{1,i}$ measured from a second subset of UE's TXRUs or receive chains.

In one example, the UE can be configured to report the L1-RSRP of $c_{2,j}$ measured from a first subset of UE's TXRUs or receive chains and the L1-RSRP of $c_{2,j}$ measured from a second subset of UE's TXRUs or receive chains.

In one example, the UE can be configured to report the L1-RSRP measurement of these two CSI-RS resources may be based on the same TRXU subset partition or receiver chain subset partition.

In one example, the UE can be configured to report the selection of CSI-RS resource indices $\{c_{1,i}, c_{2,j}\}$ may meet the condition that: the L1-RSRP of $c_{1,i}$—the L1-RSRP of $c_{2,j}$ measured from a first subset of TXRU or receive chain is largest or larger than some threshold; and the L1-RSRP of $c_{2,j}$—the L1-RSRP of $c_{1,i}$ measured from a second subset of TXRU or receive chain is largest or larger than some threshold.

Although the present disclosure has been described with an exemplary embodiment, various changes and modifications may be suggested to one skilled in the art. It is intended that the present disclosure encompass such changes and modifications as fall within the scope of the appended claims.

None of the description in this application may be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method performed by a terminal in a wireless communication system, the method comprising:
   identifying a portion of second part of channel state information (CSI) (CSI part 2) to be transmitted based on a priority of each of a plurality of CSIs in the CSI part 2;
   mapping first part of the CSI (CSI part 1) and the identified portion of the CSI part 2 to bits of uplink control information (UCI); and
   transmitting, to a base station, the mapped UCI bits on a physical uplink shared channel (PUSCH),
   wherein the CSI part 1 includes a rank indicator (RI) and a channel quality indicator (CQI), and
   wherein the CSI part 2 includes precoding matrix index (PMI),
   wherein a priority of each of one or more subband CSI in the CSI part 2 is determined based on a serving cell index of a CSI report, and
   wherein a subband CSI corresponding to a CSI report with a larger serving cell index corresponds to a lower priority.

2. The method of claim 1,
   wherein the plurality of CSIs comprise a wideband CSI and a plurality of subband CSIs,
   wherein the wideband CSI has a higher priority than the plurality of subband CSIs, and
   wherein a wideband CSI of the CSI part 2 has a highest priority.

3. The method of claim 1, wherein for the CSI report corresponding to each of the one or more subband CSI, a priority of subband CSI of even-numbered subbands for the CSI report is higher than a priority of subband CSI of odd-numbered subbands for the CSI report.

4. The method of claim 2, wherein a number of different priorities for the wideband CSI and the plurality of subband CSIs in the CSI part 2 is 2N+1, and
   wherein N is a number of CSI reports configured to be transmitted on the PUSCH.

5. The method of claim 1, wherein the transmitting of the mapped UCI bits on PUSCH comprises:
   transmitting the mapped UCI bits on the PUSCH, even in case that CSI reports are configured for physical uplink control channel (PUCCH).

6. The method of claim 1,
   wherein a number of UCI symbols is determined based on a number of UCI symbols of the CSI part 2 identified from a modulation and coding scheme (MCS) field indicated by a down link control information (DCI) and a beta offset.

7. The method of claim 1,
   wherein the portion of the CSI part 2 is determined, in case that a number of UCI symbols associated with the CSI part 2 exceeds a number of available UCI symbols associated with the CSI part 2.

8. A terminal in a wireless communication system comprising, the terminal comprising:
   a transceiver; and
   at least one processor configured to:
      identify a portion of second part of channel state information (CSI) (CSI part 2) to be transmitted based on a priority of each of a plurality of CSIs in the CSI part 2,
      map first part of the CSI (CSI part 1) and the identified portion of the CSI part 2 to bits of uplink control information (UCI), and
      transmit, to a base station, the mapped UCI bits on a physical uplink shared channel (PUSCH),
   wherein the CSI part 1 includes a rank indicator (RI) and a channel quality indicator (CQI), and
   wherein the CSI part 2 includes precoding matrix index (PMI),
   wherein a priority of each of one or more subband CSI in the CSI part 2 is determined based on a serving cell index of a CSI report, and
   wherein a subband CSI corresponding to a CSI report with a larger serving cell index corresponds to a lower priority.

9. The terminal of claim 8,
wherein the plurality of CSIs comprise a wideband CSI and a plurality of subband CSIs,
wherein the wideband CSI has a higher priority than the plurality of subband CSIs, and
wherein a wideband CSI of the CSI part 2 has a highest priority.

10. The terminal of claim 8, wherein for the CSI report corresponding to each of the one or more subband CSI, a priority of subband CSI of even-numbered subbands for the CSI report is higher than a priority of subband CSI of odd-numbered subbands for the CSI report.

11. The terminal of claim 9, wherein a number of different priorities for the wideband CSI and the plurality of subband CSIs in the CSI part 2 is 2N+1, and
wherein N is a number of CSI reports configured to be transmitted on the PUSCH.

12. The terminal of claim 8, wherein the at least one processor is further configured to transmit, to the base station, the mapped UCI bits on the PUSCH, even in case that CSI reports are configured for physical uplink control channel (PUCCH).

13. The terminal of claim 8,
wherein a number of UCI symbols is determined based on a number of UCI symbols of the CSI part 2 identified from a modulation and coding scheme (MCS) field indicated by a down link control information (DCI) and a beta offset.

14. The terminal of claim 8,
wherein the portion of the CSI part 2 is determined, in case that a number of UCI symbols associated with the CSI part 2 exceeds a number of available UCI symbols associated with the CSI part 2.

15. A method performed by a base station in a wireless communication system, the method comprising:
receiving, from a terminal, uplink control information (UCI) via a physical uplink shared channel (PUSCH),
wherein the UCI includes a channel state information (CSI) part 1 and a portion of CSI part 2, and the portion of a CSI part 2 is based on a priority of each of a plurality of CSIs in the CSI part 2,
wherein the CSI part 1 includes a rank indicator (RI) and a channel quality indicator (CQI),
wherein the CSI part 2 includes precoding matrix index (PMI),
wherein a priority of each of one or more subband CSI in the CSI part 2 is based on a serving cell index of a CSI report, and
wherein a subband CSI corresponding to a CSI report with a larger serving cell index corresponds to a lower priority.

16. The method of claim 15,
wherein the plurality of CSIs comprise a wideband CSI and a plurality of subband CSIs,
wherein the wideband CSI has a higher priority than the plurality of subband CSIs, and
wherein a wideband CSI of the CSI part 2 has a highest priority.

17. The method of claim 15, wherein for the CSI report corresponding to each of the one or more subband CSI, a priority of subband CSI of even-numbered subbands for the CSI report is higher than a priority of subband CSI of odd-numbered subbands for the CSI report.

18. The method of claim 17, wherein a number of different priorities for the wideband CSI and the plurality of subband CSIs in the CSI part 2 is 2N+1, and
wherein N is a number of CSI reports configured to be transmitted on the PUSCH.

19. The method of claim 15, wherein the receiving of UCI on a PUSCH comprises:
receiving the UCI on the PUSCH, even in case that CSI reports are configured for physical uplink control channel (PUCCH).

20. The method of claim 15,
wherein a number of UCI symbols is determined based on a number of UCI symbols of the CSI part 2 identified from a modulation and coding scheme (MCS) field indicated by a down link control information (DCI) and a beta offset.

* * * * *